US012106623B2

(12) United States Patent
Morris et al.

(10) Patent No.: US 12,106,623 B2
(45) Date of Patent: Oct. 1, 2024

(54) SYSTEM AND METHOD FOR FACILITATING ACCESS TO A SECURED AREA

(71) Applicant: The Chamberlain Group LLC, Oak Brook, IL (US)

(72) Inventors: David R. Morris, Glenview, IL (US); James Scott Murray, West Chicago, IL (US); Adam Joshua Schrems, Highland Park, IL (US)

(73) Assignee: THE CHAMBERLAIN GROUP LLC, Oak Brook, IL (US)

(*) Notice: Subject to any disclaimer, the term of this patent is extended or adjusted under 35 U.S.C. 154(b) by 7 days.

(21) Appl. No.: 17/992,691

(22) Filed: Nov. 22, 2022

(65) Prior Publication Data

US 2023/0090303 A1    Mar. 23, 2023

Related U.S. Application Data

(60) Continuation of application No. 17/323,196, filed on May 18, 2021, now Pat. No. 11,562,610, which is a
(Continued)

(51) Int. Cl.
*G07C 9/20* (2020.01)
*G07C 9/00* (2020.01)

(52) U.S. Cl.
CPC .......... *G07C 9/20* (2020.01); *G07C 9/00182* (2013.01); *G07C 2009/00928* (2013.01)

(58) Field of Classification Search
None
See application file for complete search history.

(56) References Cited

U.S. PATENT DOCUMENTS

| 4,881,148 A | 11/1989 | Lambropoulos |
| 5,285,205 A | 2/1994 | White |

(Continued)

FOREIGN PATENT DOCUMENTS

| AT | 501039 | 5/2006 |
| AT | 008482 | 8/2006 |

(Continued)

OTHER PUBLICATIONS

USPTO; U.S. Appl. No. 18/104,689; Non-Final Rejection mailed Jun. 20, 2023; (pp. 1-5).

(Continued)

*Primary Examiner* — Muhammad Adnan
(74) *Attorney, Agent, or Firm* — Dority & Manning, P.A.

(57) ABSTRACT

In one aspect, a portable electronic device is provided for accessing a secured area to deliver a package therein. The portable electronic device includes a sensor configured to detect an indicium of the package and communication circuitry configured to communicate a message to a server computer associated with the package upon the sensor detecting the indicium. The communication circuitry is further configured to receive delivery information from the server computer, the delivery information including at least a location of the secured area. The portable electronic device further includes a processor operatively coupled to the sensor and the communication circuitry. The processor is configured to cause, via the communication circuitry, the movable barrier operator to open a movable barrier associated with the secured area.

36 Claims, 20 Drawing Sheets

Related U.S. Application Data division of application No. 16/383,093, filed on Apr. 12, 2019, now Pat. No. 11,055,942, which is a continuation-in-part of application No. 16/050,923, filed on Jul. 31, 2018, now Pat. No. 10,713,869.

(60) Provisional application No. 62/659,535, filed on Apr. 18, 2018, provisional application No. 62/540,047, filed on Aug. 1, 2017.

(56) References Cited

U.S. PATENT DOCUMENTS

| | | | |
|---|---|---|---|
| 5,428,388 A | 6/1995 | Von Bauer |
| 5,506,905 A | 4/1996 | Markowski |
| 5,751,224 A | 5/1998 | Fitzgibbon |
| 5,767,784 A | 6/1998 | Khamharn |
| 5,774,053 A | 6/1998 | Porter |
| 5,872,513 A | 2/1999 | Fitzgibbon |
| 5,910,163 A | 6/1999 | Schlamp |
| 5,987,892 A | 11/1999 | Watanabe |
| 6,037,858 A | 3/2000 | Seki |
| 6,046,680 A | 4/2000 | Soenen |
| 6,049,598 A | 4/2000 | Peters |
| 6,085,172 A | 7/2000 | Junger |
| 6,134,593 A | 10/2000 | Alexander |
| 6,140,938 A | 10/2000 | Flick |
| 6,204,763 B1 | 3/2001 | Sone |
| 6,292,575 B1 | 9/2001 | Bortolussi |
| 6,300,873 B1 | 10/2001 | Kucharczyk |
| 6,323,782 B1 | 11/2001 | Stephens |
| 6,344,796 B1 | 2/2002 | Ogilvie |
| 6,404,337 B1 | 6/2002 | Van Till et al. |
| 6,414,587 B1 | 7/2002 | Fitzgibbon |
| 6,466,261 B1 | 10/2002 | Nakamura |
| 6,483,433 B2 | 11/2002 | Moskowitz |
| 6,529,949 B1 | 3/2003 | Getsin |
| 6,536,659 B1 | 3/2003 | Hauser |
| 6,563,431 B1 | 5/2003 | Miller, Jr. |
| 6,570,488 B2 | 5/2003 | Kucharczyk |
| 6,574,455 B2 | 6/2003 | Jakobsson |
| 6,611,205 B2 | 8/2003 | Guthrie |
| 6,696,918 B2 | 2/2004 | Kucharczyk |
| 6,748,295 B2 | 6/2004 | Tilles |
| 6,778,064 B1 | 8/2004 | Yamasaki |
| 6,778,084 B2 | 8/2004 | Chang |
| 6,793,253 B2 | 9/2004 | Bruwer |
| 6,853,853 B1 | 2/2005 | Van Wiemeersch |
| 6,882,269 B2 | 4/2005 | Moreno |
| 6,909,356 B2 | 6/2005 | Brown |
| 6,950,725 B2 | 9/2005 | Von Kannewurff |
| 6,952,181 B2 | 10/2005 | Karr |
| 6,957,197 B1 | 10/2005 | Altendahl |
| 6,965,294 B1 | 11/2005 | Elliott |
| 6,967,562 B2 | 11/2005 | Menard |
| 6,967,575 B1 | 11/2005 | Dohrmann |
| 6,975,937 B1 | 12/2005 | Kantarjiev |
| 6,987,452 B2 | 1/2006 | Yang |
| 7,015,943 B2 | 3/2006 | Chiang |
| 7,015,946 B2 | 3/2006 | Suzuki |
| 7,028,339 B2 | 4/2006 | Stevens |
| 7,035,916 B1 | 4/2006 | Backman |
| 7,042,492 B2 | 5/2006 | Spinelli |
| 7,076,449 B2 | 7/2006 | Tsunenari |
| 7,120,697 B2 | 10/2006 | Aiken, Jr. |
| 7,133,743 B2 | 11/2006 | Tilles |
| 7,149,959 B1 | 12/2006 | Jones |
| 7,151,434 B2 | 12/2006 | Mayer |
| 7,154,531 B2 | 12/2006 | Laird |
| 7,158,941 B1 | 1/2007 | Thompson |
| 7,170,998 B2 | 1/2007 | McLintock |
| 7,193,644 B2 | 3/2007 | Carter |
| 7,205,908 B2 | 4/2007 | Tsui |
| 7,207,142 B2 | 4/2007 | Mullet |
| 7,212,889 B2 | 5/2007 | Mann |
| 7,237,013 B2 | 6/2007 | Winkeler |
| 7,242,279 B2 | 7/2007 | Wolfe |
| 7,260,835 B2 | 8/2007 | Bajikar |
| 7,269,634 B2 | 9/2007 | Getsin |
| 7,345,574 B2 | 3/2008 | Fitzgibbon |
| 7,353,042 B2 | 4/2008 | Yamagishi |
| 7,355,505 B2 | 4/2008 | Bonner |
| 7,376,572 B2 | 5/2008 | Siegel |
| 7,379,805 B2 | 5/2008 | Olsen, III |
| 7,385,499 B2 | 6/2008 | Horton |
| 7,429,910 B2 | 9/2008 | Domenz |
| 7,441,264 B2 | 10/2008 | Himmel |
| 7,468,663 B1 | 12/2008 | Rufolo, Jr. |
| 7,468,676 B2 | 12/2008 | Styers |
| 7,471,189 B2 | 12/2008 | Vastad |
| 7,484,088 B2 | 1/2009 | Campbell |
| 7,518,485 B2 | 4/2009 | Shuster |
| 7,528,722 B2 | 5/2009 | Nelson |
| 7,532,709 B2 | 5/2009 | Styers |
| 7,553,173 B2 | 6/2009 | Kowalick |
| 7,558,743 B2 | 7/2009 | Razumov |
| 7,567,844 B2 | 7/2009 | Thomas |
| 7,583,191 B2 | 9/2009 | Zinser |
| 7,602,283 B2 | 10/2009 | John |
| 7,647,231 B2 | 1/2010 | Kuebert |
| 7,653,603 B1 | 1/2010 | Holtkamp, Jr. |
| 7,657,466 B2 | 2/2010 | Klingenberg |
| 7,677,243 B2 | 3/2010 | McClendon |
| 7,697,686 B2 | 4/2010 | Puiatti |
| 7,729,957 B2 | 6/2010 | Sadler |
| 7,735,732 B2 | 6/2010 | Linton |
| 7,742,928 B2 | 6/2010 | Reynolds |
| 7,746,223 B2 | 6/2010 | Howarter |
| 7,765,131 B2 | 7/2010 | Klingenberg |
| 7,786,891 B2 | 8/2010 | Owens |
| 7,788,221 B2 | 8/2010 | Tanaka |
| 7,792,712 B2 | 9/2010 | Kantarjiev |
| 7,815,112 B2 | 10/2010 | Volpe |
| 7,817,013 B2 | 10/2010 | Bazakos |
| 7,847,675 B1 | 12/2010 | Thyen |
| 7,869,582 B2 | 1/2011 | Styers |
| 7,885,821 B2 | 2/2011 | Tait |
| 7,904,391 B2 | 3/2011 | Sesek |
| 7,940,300 B2 | 5/2011 | Spinelli |
| 7,945,032 B2 | 5/2011 | Elberbaum |
| 7,962,422 B1 | 6/2011 | Melechko |
| 7,983,991 B2 | 7/2011 | Crussol |
| 8,018,329 B2 | 9/2011 | Morgan |
| 8,044,782 B2 | 10/2011 | Saban |
| 8,045,961 B2 | 10/2011 | Ayed |
| 8,054,340 B2 | 11/2011 | Miki |
| 8,077,034 B2 | 12/2011 | Borlez |
| 8,077,054 B1 | 12/2011 | Aarons |
| 8,093,986 B2 | 1/2012 | Harvey |
| 8,103,521 B2 | 1/2012 | Kuebert |
| 8,108,259 B2 | 1/2012 | Klingenberg |
| 8,108,914 B2 | 1/2012 | Hernoud |
| 8,120,459 B2 | 2/2012 | Kwak |
| 8,139,098 B2 | 3/2012 | Carter |
| 8,140,592 B2 | 3/2012 | Scott |
| 8,144,183 B2 | 3/2012 | Carter |
| 8,144,184 B2 | 3/2012 | Carter |
| 8,154,581 B2 | 4/2012 | Carter |
| 8,164,614 B2 | 4/2012 | Carter |
| 8,218,739 B2 | 7/2012 | Styers |
| 8,255,235 B2 | 8/2012 | Aldstadt |
| 8,265,947 B2 | 9/2012 | Kuebert |
| 8,326,001 B2 | 12/2012 | Free |
| 8,334,906 B2 | 12/2012 | Lipton |
| 8,378,988 B1 | 2/2013 | Artino |
| 8,410,930 B2 | 4/2013 | Karasek |
| 8,487,998 B2 | 7/2013 | Chen |
| 8,489,520 B2 | 7/2013 | Kuebert |
| 8,558,885 B2 | 10/2013 | Fitzgibbon |
| 8,558,887 B2 | 10/2013 | Plaster |
| 8,624,733 B2 | 1/2014 | Cusack, Jr. |
| 8,635,078 B2 | 1/2014 | Aldstadt |
| 8,666,907 B1 | 3/2014 | Wang |
| 8,675,066 B2 | 3/2014 | Trundle |
| 8,700,474 B2 | 4/2014 | Argue |

(56) References Cited

U.S. PATENT DOCUMENTS

| | | |
|---|---|---|
| 8,704,793 B1 | 4/2014 | Artino |
| 8,731,953 B2 | 5/2014 | Cook |
| 8,733,291 B2 | 5/2014 | Dunigan |
| 8,767,075 B2 | 7/2014 | Bianco |
| 8,769,632 B2 | 7/2014 | Cook |
| 8,775,329 B2 | 7/2014 | Kuebert |
| 8,780,201 B1 | 7/2014 | Scalisi |
| D714,514 S | 9/2014 | Pettit |
| 8,823,795 B1 | 9/2014 | Scalisi |
| 8,825,021 B2 | 9/2014 | Wang |
| 8,825,535 B2 | 9/2014 | Weik, III |
| 8,831,225 B2 | 9/2014 | Gilb |
| 8,842,180 B1 | 9/2014 | Kasmir |
| 8,844,010 B2 | 9/2014 | Brady |
| 8,844,811 B1 | 9/2014 | Rogers |
| 8,872,915 B1 | 10/2014 | Scalisi |
| 8,876,050 B2 | 11/2014 | Wentland |
| 8,881,252 B2 | 11/2014 | Van Till |
| 8,896,446 B2 | 11/2014 | Cusack, Jr. |
| 8,897,433 B2 | 11/2014 | Mota |
| 8,919,637 B2 | 12/2014 | Kim |
| 8,934,679 B2 | 1/2015 | Jeon |
| 8,941,736 B1 | 1/2015 | Scalisi |
| 8,947,530 B1 | 2/2015 | Scalisi |
| 8,976,025 B2 | 3/2015 | Somasundaram |
| 8,976,248 B2 | 3/2015 | Tanaka |
| 8,990,889 B2 | 3/2015 | Van Till |
| 9,003,196 B2 | 4/2015 | Hoyos |
| 9,013,575 B2 | 4/2015 | Scalisi |
| 9,053,622 B2 | 6/2015 | Scalisi |
| 9,055,202 B1 | 6/2015 | Scalisi |
| 9,058,738 B1 | 6/2015 | Scalisi |
| 9,060,103 B2 | 6/2015 | Scalisi |
| 9,060,104 B2 | 6/2015 | Scalisi |
| 9,065,987 B2 | 6/2015 | Kasmir |
| 9,068,375 B2 | 6/2015 | Hinkel |
| 9,109,378 B2 | 8/2015 | Scalisi |
| 9,118,819 B1 | 8/2015 | Scalisi |
| 9,122,254 B2 | 9/2015 | Cate |
| 9,147,117 B1 | 9/2015 | Madhu |
| 9,160,987 B1 | 10/2015 | Kasmir |
| 9,164,614 B2 | 10/2015 | Irie |
| 9,165,444 B2 | 10/2015 | Scalisi |
| 9,179,058 B1 | 11/2015 | Zeira |
| 9,179,109 B1 | 11/2015 | Kasmir |
| 9,195,950 B2 | 11/2015 | Schenken |
| 9,196,133 B2 | 11/2015 | Scalisi |
| 9,202,034 B2 | 12/2015 | Matsuoka |
| 9,208,629 B2 | 12/2015 | Saladin |
| 9,229,957 B2 | 1/2016 | Kwan |
| 9,230,158 B1 | 1/2016 | Ramaswamy |
| 9,230,230 B2 | 1/2016 | Gupta |
| 9,235,943 B2 | 1/2016 | Scalisi |
| 9,244,147 B1 | 1/2016 | Soundararajan |
| 9,245,398 B2 | 1/2016 | Plummer |
| 9,275,535 B1 | 3/2016 | Ho |
| 9,322,194 B2 | 4/2016 | Cheng |
| 9,322,201 B1 | 4/2016 | Cheng |
| 9,325,949 B2 | 4/2016 | Moriarty |
| 9,326,094 B2 | 4/2016 | Johnson |
| 9,350,918 B1 | 5/2016 | Baldwin |
| 9,359,794 B2 | 6/2016 | Cheng |
| 9,364,112 B2 | 6/2016 | Sundaresan |
| 9,382,739 B1 | 7/2016 | Johnson |
| 9,392,099 B2 | 7/2016 | Lim |
| 9,396,594 B1 | 7/2016 | Fujisaki |
| 9,414,030 B2 | 8/2016 | Carter |
| 9,418,350 B2 | 8/2016 | Matula |
| 9,426,432 B2 | 8/2016 | Scalisi |
| 9,426,720 B2 | 8/2016 | Cohn |
| 9,447,609 B2 | 9/2016 | Johnson |
| 9,453,758 B2 | 9/2016 | Motoyama |
| 9,459,772 B2 | 10/2016 | Nihal |
| 9,460,596 B1 | 10/2016 | Moses |
| 9,461,992 B2 | 10/2016 | Outwater |
| 9,467,656 B1 | 10/2016 | Leizerovich |
| 9,470,017 B1 | 10/2016 | Cheng |
| 9,470,018 B1 | 10/2016 | Cheng |
| 9,472,031 B2 | 10/2016 | Pouille |
| 9,472,032 B2 | 10/2016 | Litterer |
| 9,472,077 B2 | 10/2016 | Coviello |
| 9,473,636 B2 | 10/2016 | Lenzeder |
| 9,483,887 B1 | 11/2016 | Soleimani |
| 9,485,478 B2 | 11/2016 | Carter |
| 9,508,054 B2 | 11/2016 | Brady |
| 9,510,693 B2 | 12/2016 | Cordier |
| 9,514,584 B1 | 12/2016 | Burge |
| 9,514,586 B2 | 12/2016 | Rogers |
| 9,516,030 B2 | 12/2016 | Torgersrud |
| 9,516,284 B2 | 12/2016 | Carter |
| 9,530,262 B2 | 12/2016 | Johnson |
| 9,530,295 B2 | 12/2016 | Johnson |
| 9,536,216 B1 | 1/2017 | Lisso |
| 9,554,090 B1 | 1/2017 | Carter |
| 9,558,673 B2 | 1/2017 | Soundararajan |
| 9,563,904 B2 | 2/2017 | Mastierov |
| 9,563,915 B2 | 2/2017 | Brady |
| 9,584,336 B2 | 2/2017 | Dunn |
| 9,608,834 B2 | 3/2017 | Hall |
| 9,619,955 B2 | 4/2017 | Eichenblatt |
| 9,635,323 B2 | 4/2017 | Carter |
| 9,641,474 B2 | 5/2017 | Brady |
| 9,644,399 B2 | 5/2017 | Johnson |
| 9,647,996 B2 | 5/2017 | Johnson |
| 9,648,290 B2 | 5/2017 | Carter |
| 9,652,912 B2 | 5/2017 | Fadell |
| 9,652,913 B2 | 5/2017 | Drako |
| 9,652,917 B2 | 5/2017 | Johnson |
| 9,654,614 B1 | 5/2017 | Hall |
| 9,661,122 B1 | 5/2017 | Hall |
| 9,661,123 B1 | 5/2017 | Hall |
| 9,667,768 B1 | 5/2017 | Hall |
| 9,683,391 B2 | 6/2017 | Johnson |
| 9,692,738 B1 | 6/2017 | Wenneman |
| 9,697,548 B1 | 7/2017 | Jaff |
| 9,704,320 B2 | 7/2017 | Johnson |
| 9,706,178 B2 | 7/2017 | Carter |
| 9,712,335 B2 | 7/2017 | Hall |
| 9,727,328 B2 | 8/2017 | Johnson |
| 9,747,735 B1 | 8/2017 | Drako |
| 9,756,233 B2 | 9/2017 | Lee |
| 9,760,072 B2 | 9/2017 | Hall |
| 9,779,571 B2 | 10/2017 | Chong |
| 9,786,141 B2 | 10/2017 | Grabham |
| 9,798,999 B2 | 10/2017 | Schenken |
| 9,799,183 B2 | 10/2017 | Harrison |
| 9,811,798 B2 | 11/2017 | Lievens |
| 9,811,958 B1 | 11/2017 | Hall |
| 9,835,434 B1 | 12/2017 | Sloo |
| 9,846,902 B2 | 12/2017 | Brady |
| 9,861,221 B2 | 1/2018 | Jiang |
| 9,875,486 B2 | 1/2018 | Mastierov |
| 9,881,474 B2 | 1/2018 | Fadell |
| 9,892,384 B2 | 2/2018 | Mastierov |
| 9,898,711 B2 | 2/2018 | Neal |
| 9,916,557 B1 | 3/2018 | Gillen |
| 9,916,746 B2 | 3/2018 | Johnson |
| 9,922,513 B1 | 3/2018 | Hall |
| 9,928,749 B2 | 3/2018 | Gil |
| 9,953,388 B2 | 4/2018 | Jones |
| 9,977,547 B1 | 5/2018 | Sloo |
| 10,015,898 B2 | 7/2018 | Whitmire |
| 10,039,401 B1 | 8/2018 | Romanucci |
| 10,055,718 B2 | 8/2018 | Madura |
| 10,089,801 B1 | 10/2018 | Musabeyoglu |
| 10,089,809 B1 | 10/2018 | Daly |
| 10,096,189 B2 | 10/2018 | Siegesmund |
| 10,137,816 B2 | 11/2018 | Harper |
| 10,147,249 B1 | 12/2018 | Brady |
| 10,167,661 B2 | 1/2019 | Preus |
| 10,203,211 B1 | 2/2019 | Mishra |
| 10,222,119 B2 | 3/2019 | Rezayat |
| 10,255,737 B1 | 4/2019 | Eichenblatt |
| 10,300,157 B2 | 5/2019 | Jones |

(56) References Cited

U.S. PATENT DOCUMENTS

| | | | |
|---|---|---|---|
| D850,865 S | 6/2019 | Smith | |
| 10,332,383 B1 | 6/2019 | Giles | |
| 10,373,226 B1 | 8/2019 | Russell | |
| 10,382,608 B2 | 8/2019 | Gerhardt | |
| 10,388,092 B1 | 8/2019 | Solh | |
| D860,789 S | 9/2019 | Rayeski | |
| 10,443,918 B2 | 10/2019 | Li | |
| 10,467,835 B2 | 11/2019 | Jones | |
| 10,474,980 B1* | 11/2019 | McCalib, Jr. | E05B 19/26 |
| 10,488,081 B2 | 11/2019 | High | |
| 10,515,335 B2 | 12/2019 | Winkle | |
| 10,525,865 B2 | 1/2020 | Wilkinson | |
| 10,540,632 B2 | 1/2020 | Putcha et al. | |
| 10,540,884 B1 | 1/2020 | Lyman | |
| 10,600,100 B2 | 3/2020 | Mattingly | |
| 10,602,867 B2 | 3/2020 | Poss | |
| 10,604,254 B2 | 3/2020 | O'Brien | |
| 10,618,447 B2 | 4/2020 | Putcha et al. | |
| 10,621,811 B2 | 4/2020 | Tovey | |
| 10,624,484 B1 | 4/2020 | Mountford | |
| 10,627,244 B1 | 4/2020 | Lauka | |
| 10,628,786 B2 | 4/2020 | Millhouse | |
| 10,643,170 B2 | 5/2020 | Lee | |
| 10,657,383 B1 | 5/2020 | Solh | |
| 10,713,869 B2 | 7/2020 | Morris | |
| 10,772,450 B2 | 9/2020 | Waisanen | |
| 10,834,523 B1 | 11/2020 | Rao | |
| 10,860,115 B1 | 12/2020 | Tran | |
| 10,874,240 B2 | 12/2020 | Lewis | |
| 10,977,660 B2 | 4/2021 | Thomas | |
| 11,037,146 B2 | 6/2021 | Payne | |
| 11,055,942 B2 | 7/2021 | Coates | |
| 11,087,602 B2 | 8/2021 | Lark | |
| 11,151,679 B2 | 10/2021 | Millhouse | |
| 11,157,865 B2 | 10/2021 | Millhouse | |
| 11,166,580 B2 | 11/2021 | Waisanen | |
| 11,187,573 B1* | 11/2021 | Slavin | G01G 19/005 |
| 11,275,196 B2 | 3/2022 | Bratton | |
| 11,521,444 B1 | 12/2022 | Badik | |
| 11,562,610 B2 | 1/2023 | Alamin | |
| 11,574,512 B2 | 2/2023 | Morris | |
| 2001/0013762 A1 | 8/2001 | Roman | |
| 2001/0024094 A1 | 9/2001 | Fitzgibbon | |
| 2001/0024095 A1 | 9/2001 | Fitzgibbon | |
| 2001/0029483 A1 | 10/2001 | Schultz | |
| 2001/0037509 A1 | 11/2001 | Kligman | |
| 2001/0038272 A1 | 11/2001 | Fitzgibbon | |
| 2001/0040422 A1 | 11/2001 | Gramlich | |
| 2001/0045449 A1 | 11/2001 | Shannon | |
| 2002/0013744 A1 | 1/2002 | Tsunenari | |
| 2002/0014953 A1 | 2/2002 | Stephens | |
| 2002/0014954 A1 | 2/2002 | Fitzgibbon | |
| 2002/0032572 A1 | 3/2002 | Ikemori | |
| 2002/0032612 A1 | 3/2002 | Williams | |
| 2002/0033683 A1 | 3/2002 | Fitzgibbon | |
| 2002/0034319 A1 | 3/2002 | Tumey | |
| 2002/0035515 A1 | 3/2002 | Moreno | |
| 2002/0035857 A1 | 3/2002 | Stein | |
| 2002/0050147 A1 | 5/2002 | Mai | |
| 2002/0053975 A1 | 5/2002 | Fitzgibbon | |
| 2002/0065565 A1 | 5/2002 | Okamura | |
| 2002/0087375 A1 | 7/2002 | Griffin | |
| 2002/0087429 A1 | 7/2002 | Shuster | |
| 2002/0088854 A1 | 7/2002 | Jo | |
| 2002/0097145 A1 | 7/2002 | Tumey | |
| 2002/0099945 A1 | 7/2002 | McLintock | |
| 2002/0103653 A1 | 8/2002 | Huxter | |
| 2002/0103724 A1 | 8/2002 | Huxter | |
| 2002/0110242 A1 | 8/2002 | Bruwer | |
| 2002/0147919 A1 | 10/2002 | Gentry | |
| 2002/0152390 A1 | 10/2002 | Furuyama | |
| 2002/0153854 A1 | 10/2002 | Reed | |
| 2002/0156645 A1 | 10/2002 | Hansen | |
| 2002/0177460 A1 | 11/2002 | Beasley | |
| 2002/0180580 A1 | 12/2002 | Gotfried | |
| 2002/0180582 A1 | 12/2002 | Nielsen | |
| 2002/0186130 A1 | 12/2002 | Guthrie | |
| 2003/0007851 A1 | 1/2003 | Heigl | |
| 2003/0029579 A1 | 2/2003 | Mays | |
| 2003/0037009 A1 | 2/2003 | Tobin | |
| 2003/0071590 A1 | 4/2003 | Roman | |
| 2003/0076062 A1 | 4/2003 | Mullet | |
| 2003/0083807 A1 | 5/2003 | Kuroda | |
| 2003/0114206 A1 | 6/2003 | Timothy | |
| 2003/0155488 A1 | 8/2003 | Olson | |
| 2003/0169337 A1 | 9/2003 | Wilson | |
| 2003/0205980 A1 | 11/2003 | Fitzgibbon | |
| 2003/0234719 A1 | 12/2003 | Denison | |
| 2004/0012483 A1 | 1/2004 | Mays | |
| 2004/0015393 A1 | 1/2004 | Fong | |
| 2004/0057567 A1 | 3/2004 | Lee | |
| 2004/0066328 A1 | 4/2004 | Galley | |
| 2004/0122780 A1 | 6/2004 | Devar | |
| 2004/0133446 A1 | 7/2004 | Myrick | |
| 2004/0164847 A1 | 8/2004 | Hale | |
| 2004/0168083 A1 | 8/2004 | Gasparini | |
| 2004/0177279 A1 | 9/2004 | Domenz | |
| 2004/0210327 A1 | 10/2004 | Robb | |
| 2004/0216379 A1 | 11/2004 | Gioia | |
| 2004/0252017 A1 | 12/2004 | Holding | |
| 2005/0006908 A1 | 1/2005 | Bruwer | |
| 2005/0007451 A1 | 1/2005 | Chiang | |
| 2005/0060063 A1 | 3/2005 | Reichelt | |
| 2005/0080898 A1 | 4/2005 | Block | |
| 2005/0104716 A1 | 5/2005 | Simms | |
| 2005/0131774 A1 | 6/2005 | Huxter | |
| 2005/0137990 A1 | 6/2005 | Mayer | |
| 2005/0140321 A1 | 6/2005 | Wojciak, Jr. | |
| 2005/0149741 A1 | 7/2005 | Humbel | |
| 2005/0172462 A1 | 8/2005 | Rudduck | |
| 2005/0173937 A1 | 8/2005 | Yoshida | |
| 2005/0174080 A1 | 8/2005 | Beckerman | |
| 2005/0176400 A1 | 8/2005 | Mullet | |
| 2005/0199019 A1 | 9/2005 | Marcelle | |
| 2005/0204787 A1 | 9/2005 | Ernst | |
| 2005/0206498 A1 | 9/2005 | Tsui | |
| 2005/0206519 A1 | 9/2005 | Tsui | |
| 2005/0207616 A1 | 9/2005 | Brad | |
| 2005/0218854 A1 | 10/2005 | Gioia | |
| 2005/0232747 A1 | 10/2005 | Brackmann | |
| 2006/0012325 A1 | 1/2006 | Robb | |
| 2006/0055511 A1 | 3/2006 | Rodriguez | |
| 2006/0058012 A1 | 3/2006 | Caspi | |
| 2006/0170533 A1 | 8/2006 | Chioiu | |
| 2006/0176016 A1 | 8/2006 | Kok | |
| 2006/0186844 A1 | 8/2006 | Fitzgibbon | |
| 2006/0186991 A1 | 8/2006 | Jankovsky | |
| 2006/0190419 A1 | 8/2006 | Bunn | |
| 2006/0197481 A1 | 9/2006 | Hotto | |
| 2006/0202815 A1 | 9/2006 | John | |
| 2006/0254729 A1 | 11/2006 | Mays | |
| 2006/0255912 A1 | 11/2006 | Simms | |
| 2006/0282277 A1 | 12/2006 | Ng | |
| 2007/0005452 A1 | 1/2007 | Klingenberg | |
| 2007/0008142 A1 | 1/2007 | Crowe | |
| 2007/0022438 A1 | 1/2007 | Arseneau | |
| 2007/0024421 A1 | 2/2007 | Hale | |
| 2007/0046231 A1 | 3/2007 | Mullet | |
| 2007/0046232 A1 | 3/2007 | Mullet | |
| 2007/0126873 A1* | 6/2007 | Xu | G08B 13/19636 |
| | | | 348/E7.086 |
| 2007/0150375 A1 | 6/2007 | Yang | |
| 2007/0172155 A1 | 7/2007 | Guckenberger | |
| 2007/0188120 A1 | 8/2007 | Mullet | |
| 2007/0193834 A1 | 8/2007 | Pai | |
| 2007/0268145 A1 | 11/2007 | Bazakos | |
| 2007/0268365 A1 | 11/2007 | Lee | |
| 2007/0285510 A1 | 12/2007 | Lipton | |
| 2008/0012515 A1 | 1/2008 | Murray | |
| 2008/0061926 A1 | 3/2008 | Strait | |
| 2008/0061957 A1 | 3/2008 | Nguyen | |
| 2008/0072170 A1 | 3/2008 | Simons | |
| 2008/0087797 A1 | 4/2008 | Turnbull | |
| 2008/0088410 A1 | 4/2008 | Mullet | |

(56) References Cited

U.S. PATENT DOCUMENTS

| | | |
|---|---|---|
| 2008/0094175 A1 | 4/2008 | Mullet |
| 2008/0121682 A1 | 5/2008 | Grim |
| 2008/0133209 A1 | 6/2008 | Bar-Or |
| 2008/0136628 A1 | 6/2008 | Ishii |
| 2008/0168271 A1 | 7/2008 | Sherburne |
| 2008/0215766 A1 | 9/2008 | Stobbe |
| 2008/0224859 A1 | 9/2008 | Li |
| 2008/0239072 A1 | 10/2008 | Cheng |
| 2008/0247345 A1 | 10/2008 | Bahar |
| 2008/0298230 A1 | 12/2008 | Luft |
| 2009/0012802 A1 | 1/2009 | Pinney |
| 2009/0037217 A1 | 2/2009 | Naik |
| 2009/0041311 A1 | 2/2009 | Hundley |
| 2009/0051528 A1 | 2/2009 | Graichen |
| 2009/0059001 A1 | 3/2009 | Wang |
| 2009/0115570 A1 | 5/2009 | Cusack, Jr. |
| 2009/0166403 A1 | 7/2009 | Volpe |
| 2009/0209829 A1 | 8/2009 | Yanagidaira |
| 2009/0231093 A1 | 9/2009 | Keller, Jr. |
| 2009/0231121 A1 | 9/2009 | Daniel-Wayman |
| 2009/0231427 A1 | 9/2009 | Fitzgibbon |
| 2009/0251560 A1 | 10/2009 | Azar |
| 2009/0278683 A1 | 11/2009 | Carter |
| 2009/0284595 A1 | 11/2009 | Carter |
| 2010/0045429 A1 | 2/2010 | Mullet |
| 2010/0075655 A1 | 3/2010 | Howarter |
| 2010/0100497 A1 | 4/2010 | Kuebert |
| 2010/0141381 A1 | 6/2010 | Bliding |
| 2010/0171588 A1 | 7/2010 | Chutorash |
| 2010/0176919 A1 | 7/2010 | Myers |
| 2010/0190480 A1 | 7/2010 | Zheng |
| 2010/0201536 A1 | 8/2010 | Robertson |
| 2010/0237984 A1 | 9/2010 | Zenaty |
| 2010/0250021 A1 | 9/2010 | Cook |
| 2010/0250929 A1 | 9/2010 | Schultz |
| 2010/0283560 A1 | 11/2010 | Sommer |
| 2010/0283580 A1 | 11/2010 | Sheng |
| 2010/0289661 A1 | 11/2010 | Styers |
| 2010/0306549 A1 | 12/2010 | Ullmann |
| 2011/0000140 A1 | 1/2011 | Mays |
| 2011/0007156 A1 | 1/2011 | Sankaranarayanan |
| 2011/0013812 A1 | 1/2011 | Shin |
| 2011/0060480 A1 | 3/2011 | Mottla |
| 2011/0074570 A1 | 3/2011 | Feldstein |
| 2011/0106329 A1 | 5/2011 | Donnelly |
| 2011/0162058 A1 | 6/2011 | Powell |
| 2011/0165896 A1 | 7/2011 | Stromberg |
| 2011/0166700 A1 | 7/2011 | Dunn |
| 2011/0187497 A1 | 8/2011 | Chin |
| 2011/0193700 A1 | 8/2011 | Fitzgibbon |
| 2011/0205014 A1 | 8/2011 | Fitzgibbon |
| 2011/0227712 A1 | 9/2011 | Atteck |
| 2011/0228083 A1 | 9/2011 | Su |
| 2011/0231914 A1 | 9/2011 | Hung |
| 2011/0252843 A1 | 10/2011 | Sumcad |
| 2011/0254680 A1 | 10/2011 | Perkinson |
| 2011/0254681 A1 | 10/2011 | Perkinson |
| 2011/0254955 A1 | 10/2011 | Shen |
| 2011/0282611 A1 | 11/2011 | Reed |
| 2011/0292214 A1 | 12/2011 | Plaster |
| 2011/0311052 A1 | 12/2011 | Myers |
| 2011/0317872 A1 | 12/2011 | Free |
| 2012/0005297 A1 | 1/2012 | Robles Gil Daellenbach et al. |
| 2012/0007735 A1 | 1/2012 | Rhyins |
| 2012/0019659 A1 | 1/2012 | Warzelhan |
| 2012/0027268 A1 | 2/2012 | Kwan |
| 2012/0036141 A1 | 2/2012 | Kim |
| 2012/0050006 A1 | 3/2012 | Deblaey |
| 2012/0089532 A1 | 4/2012 | Kuebert |
| 2012/0092124 A1 | 4/2012 | Fitzgibbon |
| 2012/0092125 A1 | 4/2012 | Farber |
| 2012/0113253 A1 | 5/2012 | Slater |
| 2012/0126939 A1 | 5/2012 | Chang |
| 2012/0147179 A1 | 6/2012 | Kim |
| 2012/0169880 A1 | 7/2012 | Williamson |
| 2012/0174143 A1 | 7/2012 | Yang |
| 2012/0188346 A1 | 7/2012 | Schnabl |
| 2012/0249289 A1 | 10/2012 | Freese |
| 2012/0280783 A1 | 11/2012 | Gerhardt |
| 2012/0280789 A1 | 11/2012 | Gerhardt |
| 2012/0280790 A1 | 11/2012 | Gerhardt |
| 2012/0288023 A1 | 11/2012 | Karabinis |
| 2013/0006885 A1 | 1/2013 | Kuebert |
| 2013/0024525 A1 | 1/2013 | Brady |
| 2013/0024924 A1 | 1/2013 | Brady |
| 2013/0027212 A1 | 1/2013 | King |
| 2013/0066744 A1 | 3/2013 | Higgins |
| 2013/0100230 A1 | 4/2013 | Carter |
| 2013/0114188 A1 | 5/2013 | Fitzgibbon |
| 2013/0147601 A1 | 6/2013 | Fitzgibbon |
| 2013/0147623 A1 | 6/2013 | Somasundaram |
| 2013/0163833 A1 | 6/2013 | Wang |
| 2013/0167212 A1 | 6/2013 | Azar |
| 2013/0169801 A1 | 7/2013 | Martin |
| 2013/0176437 A1 | 7/2013 | Tseng |
| 2013/0204803 A1 | 8/2013 | Chalmers |
| 2013/0223696 A1 | 8/2013 | Azar |
| 2013/0227886 A1 | 9/2013 | Kurth |
| 2013/0262276 A1 | 10/2013 | Wan |
| 2013/0271261 A1 | 10/2013 | Ribas |
| 2013/0275326 A1 | 10/2013 | Klingenberg |
| 2013/0297047 A1 | 11/2013 | Sullivan |
| 2013/0300866 A1 | 11/2013 | Kildevaeld, III |
| 2013/0314542 A1 | 11/2013 | Jackson |
| 2013/0328663 A1 | 12/2013 | Ordaz |
| 2014/0009609 A1 | 1/2014 | Webster |
| 2014/0014008 A1 | 1/2014 | Tompkins |
| 2014/0015978 A1 | 1/2014 | Smith |
| 2014/0016837 A1 | 1/2014 | Nechyba |
| 2014/0020635 A1 | 1/2014 | Sayers |
| 2014/0037155 A1 | 2/2014 | Oliveira |
| 2014/0049371 A1 | 2/2014 | Tung |
| 2014/0063191 A1 | 3/2014 | Bataller |
| 2014/0075528 A1 | 3/2014 | Matsuoka |
| 2014/0077927 A1 | 3/2014 | Mattern |
| 2014/0078303 A1 | 3/2014 | Mattern |
| 2014/0098227 A1 | 4/2014 | Chen |
| 2014/0104429 A1 | 4/2014 | Ward |
| 2014/0125499 A1 | 5/2014 | Cate |
| 2014/0129606 A1 | 5/2014 | Cate |
| 2014/0139316 A1 | 5/2014 | Fitzgibbon |
| 2014/0139678 A1 | 5/2014 | Moriarty |
| 2014/0180959 A1 | 6/2014 | Gillen |
| 2014/0192197 A1 | 7/2014 | Hanko |
| 2014/0195952 A1 | 7/2014 | Champagne |
| 2014/0225713 A1 | 8/2014 | McIntyre |
| 2014/0247347 A1 | 9/2014 | McNeill |
| 2014/0254896 A1 | 9/2014 | Zhou |
| 2014/0266573 A1 | 9/2014 | Sullivan |
| 2014/0266589 A1 | 9/2014 | Wilder |
| 2014/0266593 A1 | 9/2014 | Nye |
| 2014/0267716 A1 | 9/2014 | Child |
| 2014/0293046 A1 | 10/2014 | Ni |
| 2014/0334684 A1 | 11/2014 | Strimling |
| 2014/0341443 A1 | 11/2014 | Cao |
| 2014/0358814 A1 | 12/2014 | Brady |
| 2014/0361869 A1 | 12/2014 | Prasad |
| 2014/0365773 A1 | 12/2014 | Gerhardt |
| 2014/0368646 A1 | 12/2014 | Traff |
| 2015/0028165 A1 | 1/2015 | Deng |
| 2015/0029008 A1 | 1/2015 | Scalisi |
| 2015/0029334 A1 | 1/2015 | Scalisi |
| 2015/0049191 A1 | 2/2015 | Scalisi |
| 2015/0062337 A1 | 3/2015 | Scalisi |
| 2015/0062343 A1 | 3/2015 | Hwang |
| 2015/0077219 A1 | 3/2015 | Keller, Jr. |
| 2015/0084779 A1 | 3/2015 | Saladin |
| 2015/0088781 A1 | 3/2015 | Gillen |
| 2015/0097949 A1 | 4/2015 | Ure |
| 2015/0100513 A1 | 4/2015 | Parris |
| 2015/0102906 A1 | 4/2015 | Gerhardt |
| 2015/0106295 A1* | 4/2015 | Robinson ............. G06F 21/62 705/339 |
| 2015/0120015 A1 | 4/2015 | Fadell |

(56) References Cited

U.S. PATENT DOCUMENTS

| | | |
|---|---|---|
| 2015/0138353 A1 | 5/2015 | Yang |
| 2015/0145643 A1 | 5/2015 | Fadell |
| 2015/0145993 A1 | 5/2015 | Scalisi |
| 2015/0154461 A1 | 6/2015 | Kitaura |
| 2015/0156465 A1 | 6/2015 | Tanaka |
| 2015/0158599 A1 | 6/2015 | Sisko |
| 2015/0161434 A1 | 6/2015 | Ross |
| 2015/0163463 A1 | 6/2015 | Hwang |
| 2015/0179011 A1 | 6/2015 | Kramer |
| 2015/0181014 A1 | 6/2015 | Gerhardt |
| 2015/0181169 A1 | 6/2015 | Kim |
| 2015/0186840 A1 | 7/2015 | Torres |
| 2015/0221147 A1 | 8/2015 | Daniel-Wayman |
| 2015/0235166 A1 | 8/2015 | Brady |
| 2015/0235172 A1 | 8/2015 | Hall |
| 2015/0235173 A1 | 8/2015 | Hall |
| 2015/0235174 A1 | 8/2015 | Hall |
| 2015/0235175 A1 | 8/2015 | Hall |
| 2015/0235301 A1 | 8/2015 | Brady |
| 2015/0235490 A1 | 8/2015 | Hall |
| 2015/0235493 A1 | 8/2015 | Hall |
| 2015/0235495 A1 | 8/2015 | Hall |
| 2015/0248754 A1 | 9/2015 | Graner |
| 2015/0248798 A1 | 9/2015 | Howe |
| 2015/0262443 A1 | 9/2015 | Chong |
| 2015/0275564 A1 | 10/2015 | Rosenthal |
| 2015/0281268 A1 | 10/2015 | Satish |
| 2015/0281658 A1 | 10/2015 | Lee |
| 2015/0296183 A1 | 10/2015 | Cho |
| 2015/0310381 A1 | 10/2015 | Lyman |
| 2015/0310713 A1 | 10/2015 | Kellermann |
| 2015/0312531 A1 | 10/2015 | Samad |
| 2015/0317841 A1 | 11/2015 | Karsch |
| 2015/0317853 A1 | 11/2015 | Reymann |
| 2015/0324571 A1 | 11/2015 | Hernoud |
| 2015/0356802 A1 | 12/2015 | Cho |
| 2015/0358359 A1 | 12/2015 | Ghai |
| 2015/0371469 A1 | 12/2015 | Scalisi |
| 2015/0381949 A1 | 12/2015 | Renkis |
| 2016/0004229 A1 | 1/2016 | Hall |
| 2016/0004230 A1 | 1/2016 | Hall |
| 2016/0005281 A1 | 1/2016 | Laska |
| 2016/0010382 A1 | 1/2016 | Cate |
| 2016/0016664 A1 | 1/2016 | Basuni |
| 2016/0035198 A1 | 2/2016 | Coviello |
| 2016/0042333 A1 | 2/2016 | Ho |
| 2016/0050082 A1 | 2/2016 | Hall |
| 2016/0050121 A1 | 2/2016 | Hall |
| 2016/0055692 A1 | 2/2016 | Trani |
| 2016/0058181 A1 | 3/2016 | Han |
| 2016/0085949 A1 | 3/2016 | Peterson |
| 2016/0086403 A1 | 3/2016 | Litterer |
| 2016/0087991 A1 | 3/2016 | Matsuoka |
| 2016/0093180 A1 | 3/2016 | Fitzgibbon |
| 2016/0094815 A1 | 3/2016 | Scalisi |
| 2016/0096508 A1 | 4/2016 | Oz |
| 2016/0098670 A1 | 4/2016 | Oz |
| 2016/0098871 A1 | 4/2016 | Oz |
| 2016/0098876 A1 | 4/2016 | Oz |
| 2016/0099927 A1 | 4/2016 | Oz |
| 2016/0110762 A1 | 4/2016 | Mastierov |
| 2016/0110763 A1 | 4/2016 | Mastierov |
| 2016/0123619 A1 | 5/2016 | Hester |
| 2016/0125357 A1 | 5/2016 | Hall |
| 2016/0148154 A1 | 5/2016 | Tibbs |
| 2016/0180156 A1 | 6/2016 | Marcheselli |
| 2016/0180618 A1 | 6/2016 | Ho |
| 2016/0180667 A1* | 6/2016 | Bunker ............ H04N 7/186 382/103 |
| 2016/0185466 A1 | 6/2016 | Dreano, Jr. |
| 2016/0189502 A1 | 6/2016 | Johnson |
| 2016/0194912 A1 | 7/2016 | Fitzgibbon |
| 2016/0196702 A1 | 7/2016 | Wilson |
| 2016/0196703 A1 | 7/2016 | Jean |
| 2016/0196704 A1 | 7/2016 | Devin |
| 2016/0205096 A1 | 7/2016 | Hoyos |
| 2016/0210454 A1 | 7/2016 | Chou |
| 2016/0217632 A1 | 7/2016 | Ille |
| 2016/0217636 A1 | 7/2016 | Lai |
| 2016/0217638 A1 | 7/2016 | Child |
| 2016/0219254 A1 | 7/2016 | Hu |
| 2016/0225208 A1 | 8/2016 | Chou |
| 2016/0247027 A1 | 8/2016 | Tsoi |
| 2016/0247344 A1 | 8/2016 | Eichenblatt |
| 2016/0258777 A1 | 9/2016 | Bodake |
| 2016/0265253 A1 | 9/2016 | Hild |
| 2016/0292942 A1 | 10/2016 | Ranchod |
| 2016/0300187 A1 | 10/2016 | Kashi |
| 2016/0300415 A1 | 10/2016 | Deneen |
| 2016/0300463 A1 | 10/2016 | Mahar |
| 2016/0307380 A1 | 10/2016 | Ho |
| 2016/0308859 A1 | 10/2016 | Barry |
| 2016/0316178 A1 | 10/2016 | Hoeffner |
| 2016/0316322 A1 | 10/2016 | Gillen |
| 2016/0328894 A1 | 11/2016 | Zhang |
| 2016/0328898 A1 | 11/2016 | Robinson |
| 2016/0328903 A1 | 11/2016 | Roberts |
| 2016/0343187 A1 | 11/2016 | Trani |
| 2016/0343192 A1 | 11/2016 | Grow |
| 2016/0343220 A1 | 11/2016 | Grabham |
| 2016/0360163 A1 | 12/2016 | Carter |
| 2016/0360181 A1 | 12/2016 | Drako |
| 2016/0371642 A1 | 12/2016 | Wilkinson |
| 2017/0019413 A1 | 1/2017 | Dailly |
| 2017/0019765 A1 | 1/2017 | Hoyer |
| 2017/0024691 A1 | 1/2017 | O'Brien |
| 2017/0034485 A1 | 2/2017 | Scalisi |
| 2017/0039515 A1 | 2/2017 | Wilkinson |
| 2017/0041745 A1 | 2/2017 | Lott |
| 2017/0048489 A1 | 2/2017 | Carter |
| 2017/0048497 A1 | 2/2017 | Carter |
| 2017/0055751 A1 | 3/2017 | Sundaresan |
| 2017/0099295 A1 | 4/2017 | Ricci |
| 2017/0109952 A1 | 4/2017 | Johnson |
| 2017/0116572 A1 | 4/2017 | Natarajan |
| 2017/0116835 A1 | 4/2017 | Child |
| 2017/0124510 A1 | 5/2017 | Caterino |
| 2017/0126900 A1 | 5/2017 | Quady |
| 2017/0131888 A1 | 5/2017 | Hall |
| 2017/0134244 A1 | 5/2017 | Hall |
| 2017/0134245 A1 | 5/2017 | Hall |
| 2017/0134557 A1 | 5/2017 | Hall |
| 2017/0134558 A1 | 5/2017 | Hall |
| 2017/0134559 A1 | 5/2017 | Hall |
| 2017/0142377 A1 | 5/2017 | Tanaka |
| 2017/0142544 A1 | 5/2017 | Hall |
| 2017/0143146 A1 | 5/2017 | Charbeneau |
| 2017/0144757 A1 | 5/2017 | Hall |
| 2017/0147979 A1 | 5/2017 | Brady |
| 2017/0147994 A1 | 5/2017 | Mastierov |
| 2017/0149623 A1 | 5/2017 | Hall |
| 2017/0161674 A1 | 6/2017 | Jones |
| 2017/0175433 A1 | 6/2017 | Kang |
| 2017/0187841 A1 | 6/2017 | Hall |
| 2017/0193465 A1 | 7/2017 | Madura |
| 2017/0195625 A1 | 7/2017 | Mahar |
| 2017/0195636 A1 | 7/2017 | Child |
| 2017/0198516 A1 | 7/2017 | Dey |
| 2017/0220872 A1 | 8/2017 | Child |
| 2017/0236193 A1 | 8/2017 | Zundel |
| 2017/0286905 A1 | 10/2017 | Richardson |
| 2017/0293916 A1 | 10/2017 | Humphrys |
| 2017/0301166 A1 | 10/2017 | Earles |
| 2017/0307278 A1 | 10/2017 | Chandran |
| 2017/0323502 A1 | 11/2017 | Hall |
| 2017/0323545 A1 | 11/2017 | Gillen |
| 2017/0350635 A1 | 12/2017 | Thirumurugavel |
| 2017/0355076 A1 | 12/2017 | Gordon-Carroll |
| 2018/0005169 A1 | 1/2018 | High |
| 2018/0040216 A1 | 2/2018 | Scalisi |
| 2018/0041493 A1 | 2/2018 | Wilkinson |
| 2018/0047227 A1 | 2/2018 | Beavers |
| 2018/0053365 A1 | 2/2018 | Bode |
| 2018/0061154 A1 | 3/2018 | Scalisi |

(56) References Cited

U.S. PATENT DOCUMENTS

| | | |
|---|---|---|
| 2018/0061164 A1 | 3/2018 | Scalisi |
| 2018/0075680 A1 | 3/2018 | Sommer |
| 2018/0075681 A1 | 3/2018 | Scalisi |
| 2018/0082249 A1 | 3/2018 | High |
| 2018/0137495 A1 | 5/2018 | Pandey |
| 2018/0180340 A1 | 6/2018 | Jones |
| 2018/0191889 A1 | 7/2018 | Gerhardt |
| 2018/0242768 A1 | 8/2018 | Lewis |
| 2018/0268633 A1 | 9/2018 | Kwon |
| 2018/0276613 A1 | 9/2018 | Hall |
| 2018/0285814 A1 | 10/2018 | Hall |
| 2018/0308048 A1 | 10/2018 | Nemati |
| 2018/0315013 A1 | 11/2018 | Wilkinson |
| 2018/0357847 A1 | 12/2018 | Shinar |
| 2018/0365644 A1 | 12/2018 | Smith |
| 2019/0003480 A1* | 1/2019 | Hall ............. F04D 27/00 |
| 2019/0005445 A1 | 1/2019 | Bahrainwala |
| 2019/0031146 A1 | 1/2019 | Etonye |
| 2019/0034859 A1 | 1/2019 | Kim |
| 2019/0035187 A1 | 1/2019 | Kim |
| 2019/0043290 A1 | 2/2019 | Morris |
| 2019/0077600 A1 | 3/2019 | Watts |
| 2019/0087775 A1 | 3/2019 | Buehre |
| 2019/0102730 A1 | 4/2019 | Giorgi |
| 2019/0108481 A1 | 4/2019 | Kashi |
| 2019/0130348 A1 | 5/2019 | Mellado |
| 2019/0147680 A1 | 5/2019 | Tehranchi |
| 2019/0166459 A1* | 5/2019 | Wootton .......... H04W 4/50 |
| 2019/0167025 A1 | 6/2019 | Cherry |
| 2019/0188775 A1 | 6/2019 | Rivoli |
| 2019/0196511 A1 | 6/2019 | Millhouse |
| 2019/0202557 A1 | 7/2019 | Meredith |
| 2019/0213817 A1 | 7/2019 | Wechsler |
| 2019/0220818 A1* | 7/2019 | Kanaoka ........ G06Q 10/08355 |
| 2019/0233103 A1 | 8/2019 | High |
| 2019/0241266 A1 | 8/2019 | Thompson |
| 2019/0244168 A1 | 8/2019 | High |
| 2019/0244448 A1 | 8/2019 | Alamin |
| 2019/0259232 A1 | 8/2019 | Gopal |
| 2019/0263521 A1 | 8/2019 | O'Brien |
| 2019/0265717 A1 | 8/2019 | McHale |
| 2019/0266819 A1 | 8/2019 | McHale |
| 2019/0282015 A1 | 9/2019 | High |
| 2019/0287063 A1 | 9/2019 | Skaaksrud |
| 2019/0300202 A1 | 10/2019 | High |
| 2019/0320834 A1 | 10/2019 | Tovey |
| 2019/0333302 A1 | 10/2019 | Kagnew |
| 2019/0342702 A1 | 11/2019 | Shinar |
| 2019/0375594 A1 | 12/2019 | Tovey |
| 2019/0378086 A1 | 12/2019 | Laye |
| 2020/0055596 A1 | 2/2020 | Millhouse |
| 2020/0077826 A1 | 3/2020 | Chenier |
| 2020/0116414 A1 | 4/2020 | Dade |
| 2020/0128991 A1 | 4/2020 | Jessie |
| 2020/0219340 A1 | 7/2020 | Geerlings |
| 2020/0273133 A1 | 8/2020 | Morris |
| 2020/0327754 A1 | 10/2020 | Morris |
| 2020/0356945 A1 | 11/2020 | Durkee |
| 2020/0390260 A1 | 12/2020 | Romanucci |
| 2020/0393854 A1 | 12/2020 | Romanucci |
| 2021/0065489 A1 | 3/2021 | Hass |
| 2021/0101745 A1 | 4/2021 | Cruz |
| 2021/0269255 A1 | 9/2021 | Montgomery, III |
| 2021/0272401 A1 | 9/2021 | Alamin |
| 2021/0287168 A1 | 9/2021 | Arora |
| 2021/0315404 A9 | 10/2021 | Waisanen |
| 2021/0319529 A1 | 10/2021 | High |
| 2022/0005303 A1 | 1/2022 | Kim |
| 2023/0070772 A1 | 3/2023 | Bingham |
| 2023/0177899 A1 | 6/2023 | Morris |
| 2023/0215232 A1* | 7/2023 | Gorkovenko ........ G06V 40/172 70/278.1 |

FOREIGN PATENT DOCUMENTS

| | | |
|---|---|---|
| CA | 3016902 A1 | 9/2017 |
| CA | 3027735 A1 | 12/2017 |
| CA | 3033213 A1 | 3/2018 |
| CA | 3038525 A1 | 4/2018 |
| CA | 3103822 A1 | 8/2019 |
| CA | 2959486 C | 10/2021 |
| CN | 101329779 | 12/2008 |
| CN | 101329779 A | 12/2008 |
| CN | 103635940 | 3/2014 |
| CN | 103635940 A | 3/2014 |
| EP | 1143835 A2 | 10/2001 |
| FR | 2818257 A1 | 6/2002 |
| FR | 3021733 A1 | 12/2015 |
| FR | 3082410 A1 | 12/2019 |
| FR | 3082411 A1 | 12/2019 |
| GB | 2355708 A | 5/2001 |
| JP | 2012247410 | 12/2012 |
| JP | 5317004 | 10/2013 |
| JP | 2013213680 | 10/2013 |
| KR | 20040035952 | 4/2004 |
| KR | 1020040035952 | 4/2004 |
| KR | 20050005150 | 1/2005 |
| KR | 20060035951 | 4/2006 |
| KR | 101535411 | 7/2015 |
| KR | 1020180049934 | 5/2018 |
| WO | 20010318272 | 5/2001 |
| WO | 2001097664 | 6/2001 |
| WO | 2001067344 | 9/2001 |
| WO | 0210040 | 2/2002 |
| WO | 02100040 | 12/2002 |
| WO | 02100040 A | 12/2002 |
| WO | 2006136662 | 12/2006 |
| WO | 2006136662 A | 12/2006 |
| WO | 2010144490 | 12/2010 |
| WO | 2010144490 A | 12/2010 |
| WO | 2012151290 | 11/2012 |
| WO | 2012151290 A | 11/2012 |
| WO | 2014151249 | 9/2014 |
| WO | 2015126965 | 8/2015 |
| WO | 2016064679 | 4/2016 |
| WO | 2017116769 | 7/2017 |
| WO | 2017190026 | 11/2017 |
| WO | 2017218914 | 12/2017 |
| WO | 20170218914 | 12/2017 |
| WO | 2019071347 | 4/2019 |

OTHER PUBLICATIONS

U.S. Appl. No. 18/104,869; Notice of Allowance and Fees mailed Oct. 5, 2023; 10 Pages.

"ASSA ABLOY trials remote hotel check-ins", © 2012 AOL Inc., [online]. Retrieved from the Internet: <URL: http://www.engadget.com/2010/11 /02/assa-abloy-trials-remote-hotel-check-ins-unlocking-your-room-wi/>, (Accessed Apr. 23, 2012), 2 pgs.

"Cell phone controlled door lock", Copyright © 2012, Hack a Day, [online]. Retrieved from the Internet: <URL: http:J/hackaday.com/2007/07/17/cell-phone-controlled-door-lock/>, Accessed Apr. 23, 2012), 11 pgs.

"Chinese Application Serial No. 201280032878.2, Office Action mailed May 11, 2015", w/English Translation, 14 pgs.

"Chinese Application Serial No. 201280032878.2, Office Action mailed Sep. 26, 2018", w/English Translation, 14 pgs.

"ECKey—Turn your phone into a KEY!", [online}. Retrieved from the Internet: <URL: http://www.eckev.com/>, (Accessed Apr. 23, 2012), 2 pgs.

"iDoor—iPhone Controlled Hydraulic Door", http://varenhor.st/ 2009 /07 /idoor-i phone-contro lied-hydraulic-door/, retrieved Apr. 23, 2012, 12 pages.

"iDoor—iPhone Controlled Hydraulic Door", Chris Varenhorst chris@localhost, [online]. Retrieved from the Internet: <URL: http://varenhor.st/2009/07/idoor-iphone-controlledhydraulic-door/>, (Accessed Apr. 23, 2012), 12 pgs.

"Keyless entry via SMS", Copyright © 2012, Hack a Day, [on line]. Retrieved from the Internet: <URL: http://hackaday.com/2011/ 01 /24/keyless-entry-via-sms/, (Accessed Apr. 23, 2012), 9 pgs.

(56) References Cited

OTHER PUBLICATIONS

"Knock detecting lock", Copyright © 2012, Hack a Day, [online]. Retrieved from the Internet: <URL: http://hackaday.com/2009/11/04/knock-detecting-lock/>, (Accessed Apr. 23, 2012), 10 pgs.
"Knock response automatic door opener", Copyright © 2012, Hack a Day, [on line]. Retrieved from the Internet: <URL: http://hackaday.com/2007/06/11/knock-responseautomatic-door-opener/>, (Accessed Apr. 23, 2012), 9 pgs.
"More cellphone controlled door locks", Copyright © 2012, Hack a Day, [online]. Retrieved from the Internet: <URL: http://hackaday.com/2010/02/23/more-cellphone-controlled-doorlocks/>, (Accessed Apr. 23, 2012), 10 pgs.
"Nexia Home Intelligence", Nexia™, [online]. Retrieved from the Internet: <URL: http://www.nexiahome.com/Products/ProductCatalog.aspx?catsel=5>, (Accessed Apr. 23, 2012), 2 pgs.
"Oliver Nash's Blog", [online]. Retrieved from the Internet: <URL: http://ocfnash.wordpress.com/2009/10/31/locked-out-at-2am/>, (Accessed Apr. 23, 2012), 18 pgs.
"Open Ways", OpenWays copyright 2011, [online]. Retrieved from the Internet: <URL: http://www.openways.com/>, (Accessed Apr. 20, 2012), 1 pg.
"Opening a door via text message", [online]. Retrieved from the Internet: <URL: http://anerroroccurredwhileprocessingthisdirective.com/2011/01/01/opening-a-door-via-textmessage/>, (Accessed Apr. 23, 2012), 8 pgs.
"Phantom Keyless Home Entry", Copyright © 2012 Phantom Smart Home, LLC, [online]. Retrieved from the Internet: <URL: http://phantomsmarthome.com/>, (Accessed Apr. 23, 2012), 1 pg.
"Remote entry via Android and Launchpad", Copyright © 2012, Hack a Day, [online]. Retrieved from the Internet: <URL: http://hackaday.com/2012/01/24/remote-entry-viaandroid-and-launchpad/>, (Accessed Apr. 23, 2012), 9 pgs.
"SimpliciKey Electronic Door Look Solutions", Copyright © 2011 SimpliciKey TM, [online]. Retrieved from the Internet: <URL: http://simplicikey.com/>, (Accessed Apr. 23, 2012), 1 pg.
"Unlock you door with Siri, SMS, or a secret knock", © 2010 laan labs, [online]. Retrieved from the Internet: <URL: http://labs.laan.com/wp/2011/10/unlock-your-door-with-siri-sms-ora-secret-knock/>, (Accessed Apr. 23, 2012), 11 pgs.
"USB Auth—Makers Local 256", Wiki pages, [online]. Retrieved from the Internet: <URL: https://256.makerslocal.ori:i/wiki/index.php/USB Auth>, (AccessedApr. 23, 2012), 9 pgs.
"Viper SmartStart", © Copyright 2012 Directed., [online]. Retrieved from the Internet: <URL: http://www.vioer.com/smartstartl>, (Accessed Apr. 23, 2012), 2 pgs.
"Yale demos NFC-enabled residential locks, germaphobes rejoice", © 2012 AOL Inc, onlinel. Retrieved from the Internet: <URL:, (Accessed Apr. 23, 2012), 4 pgs.
"Zwave Products", Copyrights © 2012—Zwave Products Inc, [online]. Retrieved from the Internet: <URL: http://www.zwaveoroducts.com/KWIKSET.html>, (Accessed Apr. 23, 2012), 3 pgs.
Amazon Help; How In-Home Delivery Works; https://www.amazon.com/gp/help/customer/display.html?nodeId=202104360; 2 pages; Known as early as Oct. 2017.
U.S. Appl. No. 13/462,669, Response filed Nov. 19, 2013 to Non Final Office Action mailed Aug. 26, 2013; 12 pgs.
U.S. Appl. No. 13/462,669, Examiner Interview Summary mailed Nov. 14, 2013, 3 pgs.
U.S. Appl. No. 13/462,669, Non Final Office Action mailed Aug. 26, 2013, 17 pgs.
U.S. Appl. No. 14/508,501, Non Final Office Action mailed Mar. 6, 2015, 15 pgs.
Author: Alarm.com; Title: MyQ Garage Universal Retrofit, Installation Guide; Date: 2004, Publisher: Alarm.com Pertinent Pages: Whole document (Year: 2014).
BenchSentry + Aladdin Connect; Protect any size delivery with the ultimate package theft solution; publicly available as early as Apr. 28, 2021; 9 pages; https://benchsentry.com.
Boxlock; Secure & Contactless Delivery Solutions | Package Security; The Supply Chain Access Control Platform; publicly available as early as Apr. 28, 2021; 6 pages; https://www.getboxlock.com.
Computer rendering of deadbolt lock publicly available before Aug. 1, 2017, 1 page.
Danby ParcelGuard; Stop Porch Pirates in Their Tracks With the World's Smallest Mailbox; publicly available as early as Apr. 28, 2021; 9 pages; https://www.danbyparcelguard.com/en-us/.
Dynosafe; Own the Porch—The original climate-controlled, smart home-enabled delivery lockbox; publicly available as early as Apr. 19, 2021; 10 pages; https://www.dynosafe.com.
HomeValet Launches Revolutionary Contactless Home Delivery System; The HomeValet-Powered SmartBox; publicly available as early as Apr. 28, 2021; 2 pages; https://www.perishablenews.com/retailfoodservice/homevalet-launches-revolutionary-contactless-home-delivery-system/.
Hot Stuff: [Morning Edition]; by Andre Mouchard: The Orange County Register; Publication Jul. 20, 1998; 3 pages, https://dialog.proquest.com/professional/printviewfile?accountid =. . . .
International Application Serial No. PCT/U2012/036141, International Search Report mailed Apr. 9, 2012, 5 pages.
International Application Serial No. PCT/US2012/036141, International Preliminary Report on Patentability mailed Nov. 5, 2013, 7 pgs.
International Application Serial No. PCT/US2012/036141, International Search Report mailed Sep. 4, 2012, 5 pgs.
International Application Serial No. PCT/US2012/036141, Written Opinion mailed Sep. 4, 2012, 6 pgs.
International Search Report and Written Opinion; Corresponding PCT Patent Application No. PCT/US2020/021329; Dated Sep. 23, 2020; 13 pages.
Inventors Devise New Mailboxes for Bulky E-Commerce Packages; The Wall Street Journal; By Robert Johnson—Staff Reporter of the Wall Street Journal; 4 pages, Updated Aug. 17, 1999.
Liviri Deliver Different; Liviri Reusable Insulated Boxes | Reimagine the Box; publicly available as early as Apr. 28, 2021; 11 pages; https://liviri.com.
Meet HomeValet; publicly available as early as Apr. 28, 2021; 5 pages; https://www.homevalet.co.
Non-Patent Literature document Description of STM Electronics FlightSense product; publicly available before May 12, 2021, 1 page.
PCT Patent Application No. PCT/US2018/044625; International Search Report and Written Opinion dated Nov. 18, 2018; 12 Pages.
PCT Patent Application No. PCT/US2019/027632; International Search Report and Written Opinion dated Aug. 4, 2019, 10 pages.
Phantom Smart Smart Home; Hands-Free Keyless Home Entry, https://web.archive.org/web/20110222072442/http:/www.phantomsmarthome.com/; 3 pages, copyright 2011.
Porchster; Smart Delivery Locker; Parcel Locker, Delivery Locker Mailbox; publicly available as early as Apr. 28, 2021; 5 pages; https://porchster.com.
RGJ.com website, https://www.rgj.com/story/life/food/2017/09/05/only-rgj-com-uber-eats-debuts-wednesday-reno/632015001/, dated Sep. 5, 2017, 4 pages.
Samsung SpaceMax Family Hub IOT Refrigerator; Published Oct. 23, 2020; https://www.youtube.com/watch?v=njsZJtEi5z4; 21 pages.
Samsung SpaceMax Family Hub; It's More than a Fridge; Published: Jul. 26, 2020; https://www.youtube.com/watch?v=hcMx9flBdCA; 7 pages.
Sorex_wirelessKey_2_0—Sorex Wayback site of Sep. 6, 2011, 2 pages.
Sorex_wirelessKey_Folder_2009, 2 pages.
The Verge website, https://www.theverge.com/2017/10/25/16538834/amazon-key-in-home-delivery-unlock-door-prime-cloud-cam-smart-lock, dated Oct. 25, 2017, 5 pages.
Todd Bishop; Creeped out by Amazon Key? How the In-Home Delivery Service Will Work; https://www.geekwire.com/author/todd/) on Oct. 26, 2017 at 7:26 am.
Two-Factor Authentication with Proximity Uses iBeacon Bluetooth Low Energy (BLE) to Authenticate Users Instantly, https://saaspass.com/technologies/proximity-instant-login-two-factor-authentication-beacon.html, 5 pages, Known as early as Nov. 6, 2017.

(56) References Cited

OTHER PUBLICATIONS

Two-Factor Authentication with Proximity Uses iBeacon Low Energy (BLE) to Authenticate Users Instantly, https//saaspass.com/technologies/proximity-instant-login-two-factor-authentication-beacon.html, 5 pages, Known as early as Nov. 6, 2017.
U.S. Appl. No. 13/462,714, Non-Final Office Action Mailed Aug. 26, 2013, 17 pages.
U.S. Appl. No. 13/462,669, Final Office Action mailed Feb. 24, 2014, 22 pgs.
U.S. Appl. No. 13/462,669, Non Final Office Action mailed Aug. 26, 2013, 18 pgs.
U.S. Appl. No. 13/462,714, Examiner Interview Summary mailed Mar. 7, 2014, 3 pgs.
U.S. Appl. No. 13/462,714, Final Office Action mailed Apr. 7, 2014, 20 pgs.
U.S. Appl. No. 13/462,714, Non Final Office Action mailed Aug. 26, 2013, 17 pgs.
U.S. Appl. No. 13/462,714, Response filed Feb. 26, 2014 to Non Final Office Action mailed Aug. 26, 2013, 15 pgs.
U.S. Appl. No. 13/462,765, Non Final Office Action mailed Sep. 4, 2014, 11 pgs.
U.S. Appl. No. 14/468,114, Final Office Action mailed Mar. 15, 2016, 13 pgs.
U.S. Appl. No. 14/468,114, Non Final Office Action mailed Jul. 21, 2016, 11 pgs.
U.S. Appl. No. 14/468,114, Preliminary Amendment filed Aug. 27, 2014, 7 pgs.
U.S. Appl. No. 14/638,828, Examiner Interview Summary mailed Mar. 4, 2016, 3 pgs.
U.S. Appl. No. 14/638,828, Final Office Action mailed May 16, 2016, 15 pgs.
U.S. Appl. No. 14/638,828, Non Final Office Action mailed Jan. 11, 2017, 13 pgs.
U.S. Appl. No. 14/638,828, Non Final Office Action mailed Oct. 26, 2015, 11 pgs.
U.S. Appl. No. 14/638,828, Response filed Feb. 26, 2016 to Non Final Office Action mailed Oct. 26, 2015, 12 pgs.
U.S. Appl. No. 14/638,828, Response Filed Nov. 16, 16 to Final Office Action mailed May 16, 2016, 12 pgs.
U.S. Appl. No. 17/741,620, filed May 11, 2022, titled Product Delivery System and Method.
U.S. Appl. No. 18/082,310, filed Dec. 15, 2022; 61 pages.
U.S. Appl. No. 16/050,923, filed Jul. 31, 2019; 32 pages.
U.S. Appl. No. 16/050,923; Office Action Dated Apr. 10, 2019; 47 Pages.
U.S. Appl. No. 16/383,093, filed Apr. 12, 2019; 64 pages.
U.S. Appl. No. 17/323,196; Notice of Allowance Dated Jul. 25, 2022; 39 Pages.
U.S. Appl. No. 17/992,691, filed Nov. 22, 2022; 63 pages.
U.S. Appl. No. 17/992,691, filed Nov. 22, 2022; 65 pages.
U.S. Appl. No. 63/187,815, filed May 12, 2021.
U.S. Appl. No. 63/188,853, filed May 14, 2021.
U.S. Appl. No. 16/912,104; Office Action Dated Jun. 16, 2022; 46 pages.
U.S. Appl. No. 63/295,217 dated Dec. 30, 2021; 48 pages.
USPTO; U.S. Appl. No. 16/050,923; Notice of Allowance mailed Mar. 4, 2020; (pp. 1-10).
USPTO; U.S. Appl. No. 16/050,923; Office Action mailed Nov. 27, 2019; (pp. 1-27).
USPTO; U.S. Appl. No. 16/383,093; Corrected Notice of Allowability mailed Mar. 22, 2021; (pp. 1-2).
USPTO; U.S. Appl. No. 16/383,093; Notice of Allowance mailed Feb. 16, 2021; (pp. 1-20).
USPTO; U.S. Appl. No. 16/383,093; Office Action mailed Sep. 17, 2020; (pp. 1-13).
USPTO; U.S. Appl. No. 16/912,104; Non-Final Rejection mailed Jun. 17, 2022; (pp. 1-16).
USPTO; U.S. Appl. No. 16/912,104; Notice of Allowance and Fees Due (PTOL-85) mailed Oct. 4, 2022; (pp. 1-15).
USPTO; U.S. Appl. No. 16/912,104; Office Action (Non-Final Rejection) Aug. 12, 2021; (pp. 1-19).
USPTO; U.S. Appl. No. 17/323,196; Non-Final Rejection Oct. 6, 2021; (pp. 1-13).
USPTO; U.S. Appl. No. 17/323,196; Non-Final Rejection mailed Apr. 12, 2022; (pp. 1-12).
USPTO; U.S. Appl. No. 17/323,196; Notice of Allowance and Fees Due (PTOL-85) mailed Jul. 25, 2022; (pp. 1-8).
USPTO; U.S. Appl. No. 17/323,196; Notice of Allowance and Fees Due (PTOL-85) mailed Nov. 7, 2022; (pp. 1-2).
Wayback Machine capture of https://about.ubereats.com/, capture dated Jun. 3, 2017, 7 pages.
Wayback Machine capture of https://en.wikipedia.org/wiki/Sally_port, capture dated Nov. 11, 2016, 3 pages.
WirelessKey Hardware Deutsch 1.1 Sep. 6, 2011 Wayback Machine, (with Google Machine Translation) 34 pages.
Yale; Smart Delivery Box; Copyright © Yale, Assa Abloy Residential Group; publicly available as early as Apr. 28, 2021; 3 Pages; https://us.yalehome.com/en/yalhome-products/yale-smart-storage1/yale-smart-storage/smart-delivery-box/.
YouTube Video entitled Bluetooth Sorex Wirelss Key, dated Mar. 5, 2009, 5 pages.
YouTube Video entitled Bluetooth SorexLoXX Entrance System, dated Mar. 5, 2009, 9 pages.
YouTube Video entitled Bluetooth-Sorex LoXX dated Feb. 5, 2009, 8 pages.

\* cited by examiner

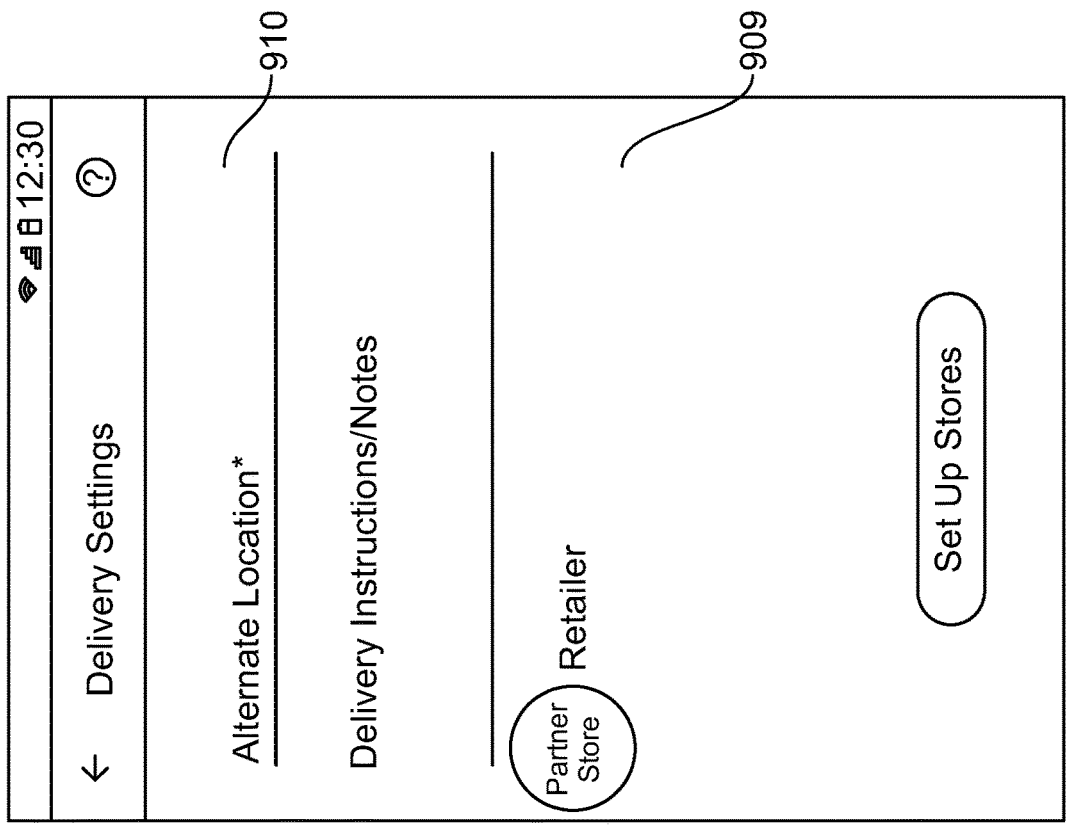
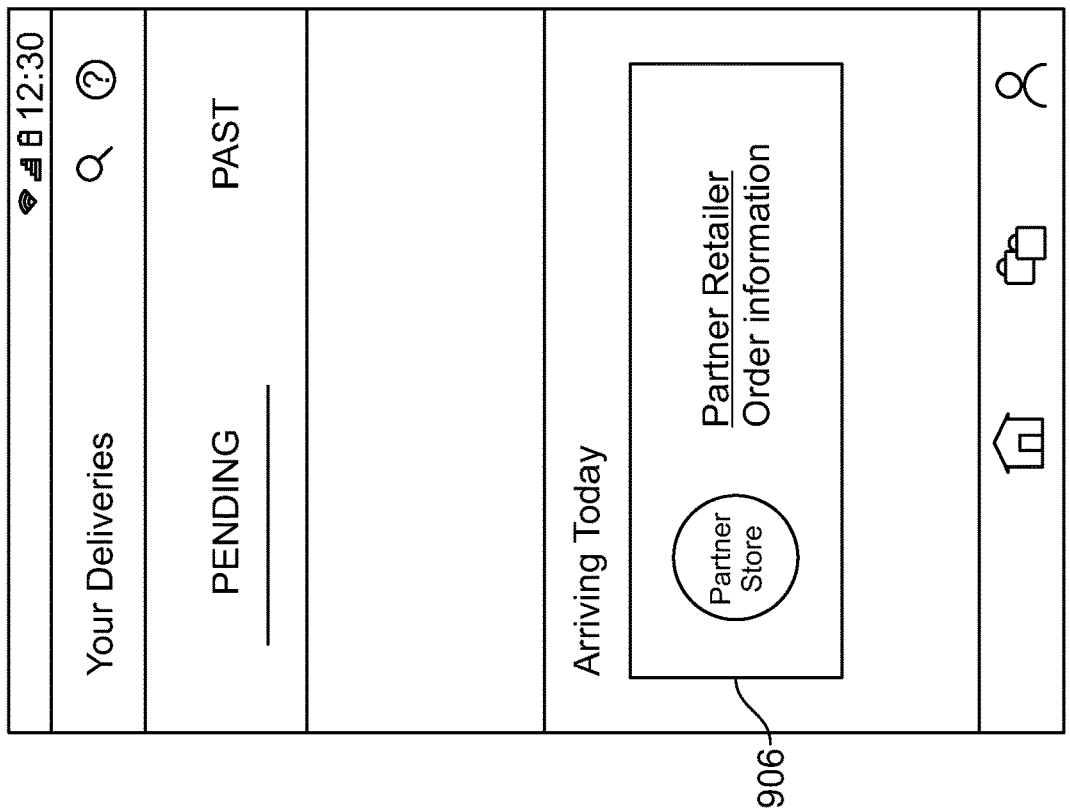
FIG. 11D
FIG. 11C

FIG. 12H

FIG. 12G

SYSTEM AND METHOD FOR FACILITATING ACCESS TO A SECURED AREA

CROSS-REFERENCE TO RELATED APPLICATIONS

This application is a continuation of U.S. application Ser. No. 17/323,196, filed May 18, 2021, which is a divisional of U.S. application Ser. No. 16/383,093 filed Apr. 12, 2019, now U.S. Pat. No. 11,055,942, issued on Jul. 6, 2021, which is a continuation-in-part of U.S. application Ser. No. 16/050,923 filed Jul. 31, 2018, now U.S. Pat. No. 10,713,869, issued on Jul. 14, 2020, and claims the benefit of U.S. Provisional Patent App. No. 62/659,535, filed Apr. 18, 2018 and U.S. Provisional Patent App. No. 62/540,047, filed Aug. 1, 2017, which are hereby incorporated by reference herein in their entireties.

FIELD

This disclosure relates to movable barrier operators and, more specifically, to a system and method for facilitating a grant of conditional, temporary authorization to operate a movable barrier operator associated with a secured area.

BACKGROUND

Movable barrier operators, such as garage door openers, secure areas and move barriers in response to received signals from transmitters. Different kinds of transmitters, such as portable transmitters or stationary transmitters, may be used to operate moveable barrier operators. One type of a stationary transmitter is a keypad mounted near the movable barrier.

In one prior system, a user orders a product online and a delivery service is able to open a user's garage door to complete an unattended delivery of the ordered product because a computer of the delivery service can communicate with a home automation system associated with the garage door opener. Temporary or one-time access can be granted to the delivery person or associate by establishing and providing a temporary or one-time use entry code. The delivery person enters the one-time use entry code into an outdoor, stationary keypad near the garage door, and the code is communicated to the garage door opener such that the garage door opener opens the garage door. The one-time use entry code differs from the code used by the residents to operate the moveable barrier operator. Temporary or one-time access may be given to other types of guests besides delivery associates, such as contractors or visitors.

While temporary or one-time use codes limit the number of times and/or amount of time during which a guest can open the barrier, temporary or one-time use codes do not limit access to the secured area once the guest is beyond the moveable barrier. For example, access to an attached garage provides access to a passageway door of the garage which leads to an interior of the associated house or multi-tenant building. In some instances, a resident or a home owner may wish to give a guest access to the garage without permitting the guest to open the passageway door. Accordingly, the passageway door should be kept locked, necessitating the resident to carry a key, fob, keycard, or the like. Additionally, if multiple guests are granted temporary or one-time entry codes, some may have to be given keys to the passageway door if access to the house is necessary.

BRIEF DESCRIPTION OF THE DRAWINGS

FIGS. 11A-11G illustrate example screenshots of an application used by a homeowner or resident in the delivery services system of FIGS. 10A-10B;

FIGS. 12A-12H illustrate example screenshots of an application used by a delivery associate in the delivery services system of FIGS. 10A-10B;

DETAILED DESCRIPTION

Figure 1:
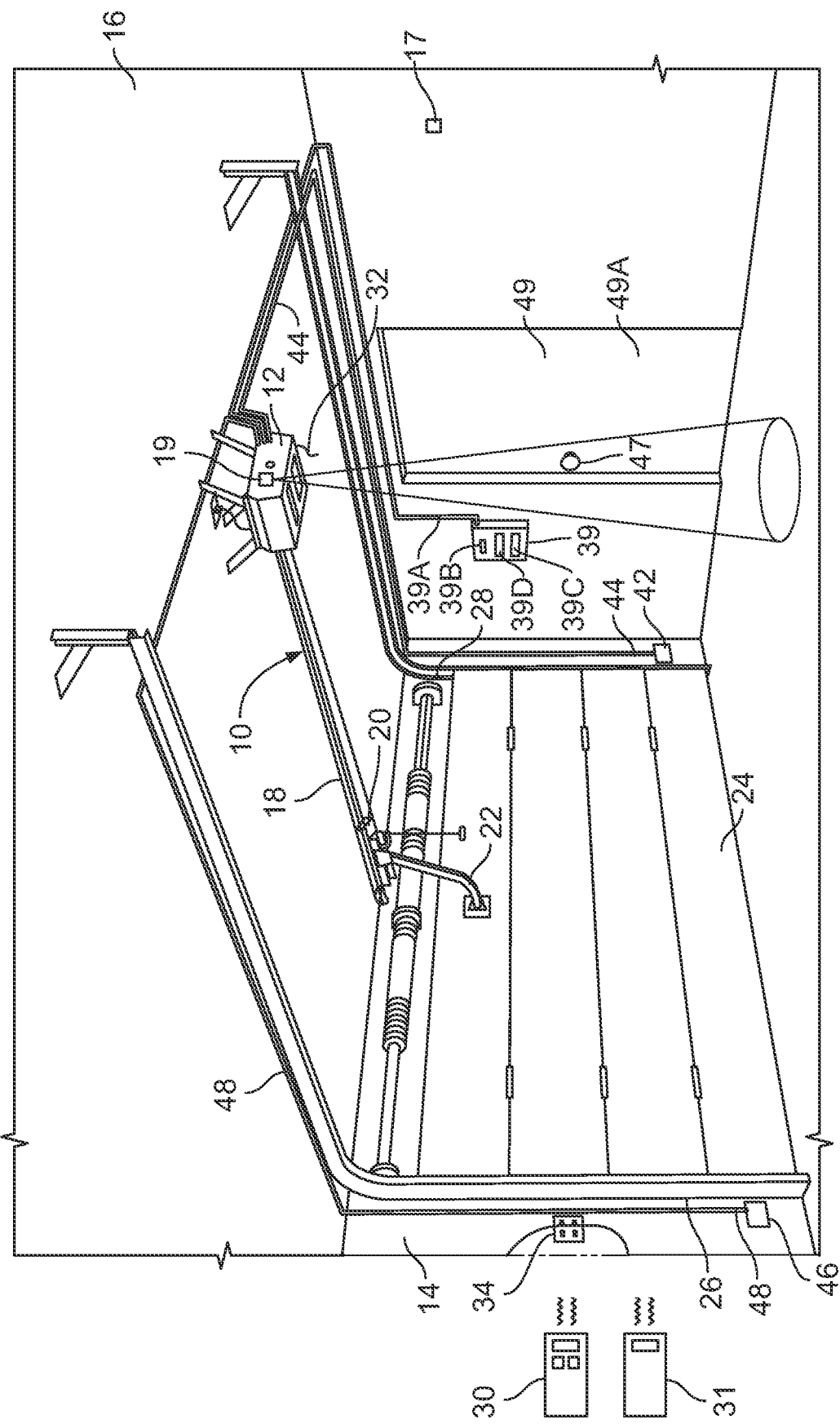
FIG. 1 is a perspective view of a garage having a movable barrier operator and a passageway door.

In accordance with one aspect of the present disclosure, a system is provided for controlling access to a secured area having a first barrier and a second barrier. The system includes a moveable barrier operator configured to control movement of the first barrier, such as a garage door, and a lock configured to secure the second barrier, such as a passageway door. In one form, the moveable barrier operator is a door operator (also known as a garage door opener, garage door operator, or GDO) and the passageway door is a door leading from the garage to an adjacent area or attached structure, such as a house. The system receives a control signal including a code from a remote control. The remote control may be a wireless transmitter such as a visor-mounted transmitter, a fixed transmitter, such as a keypad, or a portable electronic computing device, such as a smartphone. The system authenticates the signal to determine whether the received signal is a primary signal (associated with a resident) or a secondary signal (associated with a guest) based at least in part on the code (e.g., a fixed identification (ID) code that uniquely identifies the remote control or transmitter) of the signal. The primary signal is associated with a first level of access that permits a user to pass through both the garage door and the passageway door. The secondary signal is associated with a second level of access that permits a user to pass through the garage door but not the passageway door. As such, the system opens the garage door and unlocks the passageway door in response to a primary signal, and the system opens the garage door and locks the passageway door in response to a secondary signal. In some forms, the movable barrier operator moves the garage door a first distance (e.g., fully opens the garage door) in response to a primary signal and opens the garage door a second, shorter distance (e.g., just far enough to slide in a package for delivery) in response to a secondary signal. The secondary signal may include information regarding how far the movable barrier operator should open the garage door. Thus, the open position may be a fully open position or a partially open position according to the situation.

In some forms, the type of signal is determined by the movable barrier operator. The signal may be sent to the movable barrier operator directly from the remote control, such as if the remote control is a visor-mounted transmitter. Alternatively, the signal may be sent to the garage door operator indirectly such as if the remote control is a smartphone. For example, a user may use an application running on her smartphone to send a state change request to cause the movable barrier operator to open or close the garage door. The smartphone sends the state change request to a cloud-based computing device such as a server computer. The server computer determines whether the smartphone is associated with a resident or a guest, and sends either a primary signal or the secondary signal to the movable barrier operator.

If the movable barrier operator receives a primary signal, the movable barrier operator transmits a signal that causes a lock of the passageway door to unlock. In some forms, the movable barrier operator transmits a signal directly to the passageway door lock. Alternatively, the movable barrier operator and passageway door lock are both communicatively coupled to a common local communication hub. The operator transmits a signal to a server computer via the local communication hub and the server computer sends another signal through the local communication hub to the passageway door lock to control the passageway door lock.

If the movable barrier operator receives a secondary signal, the movable barrier operator transmits a signal that causes the passageway door lock to become locked. In one form, the passageway lock includes a sensor configured to determine if the lock is in a locked state or unlocked state. The state of the passageway lock may be transmitted directly or indirectly from the passageway lock to the movable barrier operator. The movable barrier operator analyzes the transmitted signal to check the state of the passageway lock and determine if the state of the passageway lock needs to be changed. The analysis of the transmitted signal may include decrypting the transmitted signal. The moveable barrier operator or the server computer transmits a lock or unlock command to the lock directly or indirectly if the lock is not in the desired state. Further, the state of the lock may be stored locally such as in a memory of the lock, the operator, or a local hub. In another embodiment, the state of the lock is stored on a remote server computer.

In alternative forms, the determination of whether a control signal is a primary signal or a secondary signal is made by a device other than the movable barrier operator, such as a remote server computer. For example, a smartphone transmits a control signal to the server computer. The server computer determines whether the signal is a primary signal or a secondary signal and sends actuation signals to the moveable barrier operator and passageway door lock as needed to effectuate the level of access associated with the control signal.

Referring now to FIG. 1, a garage 14 having a movable barrier operator system 10 is provided. The movable barrier operator system 10 includes a movable barrier operator 12, such as a garage door opener, mounted within a secured area, such as a garage 14. More specifically, the movable barrier operator 12 is mounted to a ceiling 16 of the garage 14 and includes a rail 18 extending therefrom with a releasable trolley 20 attached having an arm 22 extending to a multiple paneled garage door 24 positioned for movement along a pair of door tracks 26 and 28. The movable barrier operator 12 has a motor coupled to the door 24 by the trolley 20 and arm 22, by which the motor moves the door 24. The system 10 includes remote controls such as hand-held transmitter units 30, 31 configured to send signals for reception by communication circuitry through an antenna 32 of the movable barrier operator 12. The remote controls may also include an external control pad 34, with a button or buttons thereon, that is positioned on the outside of the garage 14. The external control pad 34 communicates signals via radio frequency transmission for reception by the antenna 32 of the movable barrier operator 12. A switch module 39 is mounted on a wall of the garage 14. The switch module 39 is connected to the movable barrier operator 12 by one or more wires 39A although the switch module 39 may alternatively communicate with the movable barrier operator wirelessly or via a combination of wired and wireless signals. The switch module 39 includes a light switch 39B, a lock switch 39C, and a command switch 39D. An optical emitter 42 is connected via a power and signal line 44 to the movable barrier operator 12. An optical detector 46 is connected via a wire 48 to the movable barrier operator 12. Alternatively, at least one of the optical emitter 42 and the optical detector 46 may communicate wirelessly with the movable barrier operator. Furthermore, the optical emitter 42 and the optical detector 46 may be combined as a single unit known in the art as a retroreflector.

The movable barrier operator system 10 includes a wired or wireless camera 17 situated to capture security data such as pictures, video, and/or audio within the garage 14. The camera 17 may be configured to continuously capture security data. Alternatively, the camera 17 captures security data at certain times. For example, the camera 17 may be configured to start capturing security data when the movable barrier operator system 10 opens or begins to open the garage door 24. The camera 17 continues capturing security data until the garage door 24 is closed or a predetermined amount of time after the garage door 24 is closed. In further examples, the camera 17 is configured to start capturing security data in response to the system 10 determining that a received control signal is a secondary control signal but not in response to a determination that a received control signal is a primary signal.

In some forms, the camera 17 is remotely movable such that a user viewing a video stream from the camera 17 via a wireless device, such as a smartphone, can adjust the camera 17 to change the field of view. The moveable barrier operator system 10 includes an adjustable indicator 19 for indicating a position within the garage 14. The indicator 19 may be integral with or independent from the moveable barrier operator 12. The indicator 19 projects light, such as a cone of light, to illuminate an area. For example, the indicator 19 may include one or more lightbulbs or LEDs directed to form a shape such as a cone, a pyramid, a circle, or a rectangle on a surface such as the floor of the garage 14.

Alternatively or additionally, the indicator 19 includes a laser to form one or more shapes on a surface such as a small circle, a rectangle, and/or an arrow on the floor of the garage 14. The indicator 19 may alternatively or additionally include a speaker and/or a display screen to indicate the desired drop-off location.

The indicator 19 may be used to assist in parking a vehicle within the garage 14. Further, the indicator 19 may be used to indicate a point or illuminated area in the garage 14 for delivery associates to drop or otherwise deposit or place packages or parcels. In some forms, the indicator 19 includes one or more servo motors and is remotely controllable such that the user can use, for example, an application running on the user's smartphone to adjust the indicator 19 in real-time to indicate a desired location for a package within the garage 14 to a delivery associate. The moveable barrier operator 12 may store programmed orientations for the indicator 19 and may adjust the orientation of the indicator 19 based on the operation of the movable barrier operator system 10. For example, the movable barrier operator 12 uses a first stored orientation of the indicator 19 when the user enters the garage 14 to aid in parking. The movable barrier operator 12 uses a second stored orientation of the indicator 19 when a delivery associate enters the garage 14 to indicate a delivery location. Once the delivery associate has delivered the package in the garage 14, the indicator 19 reverts back to the first orientation to assist in parking within the garage 14. In operation, the indicator 19 may be operated to indicate the stored desired location in response to a control signal being authenticated as a secondary signal, but not in response to a control signal being authenticated as a primary signal.

In another embodiment, the user may specify package delivery location by having the movable barrier operator 12 detect a specific action performed by the user. For example, the movable barrier operator 12 may include one or more microphones and the movable barrier operator 12 is configured to use the microphones for voice recognition and/or sound localization. As an example, the movable barrier operator 12 may be configured to detect the user speaking a trigger word or phrase when the user is within the garage 14 such as "deliver here!" followed by stomping her foot twice at a spot on a floor of the garage 14. The movable barrier operator 12 may detect the desired location using audio sensors (e.g., triangulating position using microphones) and/or using optical position sensors. The movable barrier operator 12 may then operate the indicator 19 to indicate the desired location when the delivery associate enters the garage 14. In some forms, the moveable barrier operator 12 further includes a speaker and/or a microphone such that verbal communications can be exchanged between a delivery associate within the garage 14 and a remote user.

Figure 2:
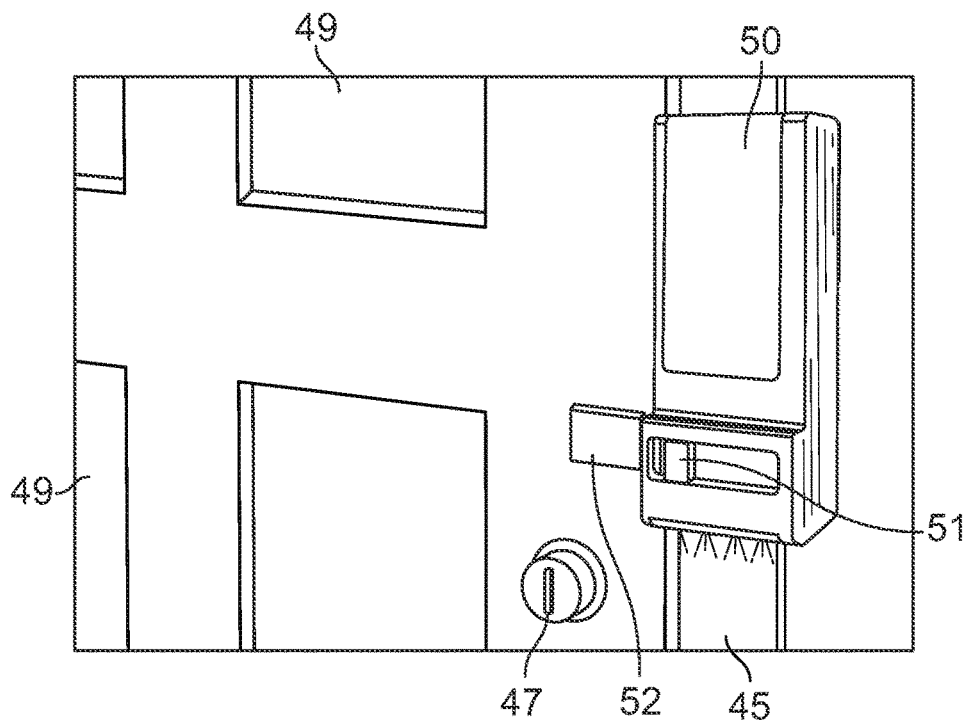
FIG. 2 is a perspective view of the passageway door of FIG. 1 having a passageway door lock on an interior side of the door.

The garage 14 includes a passageway door 49 having hardware 47, such as a doorknob and/or deadbolt. The door 49 separates the garage 14 from an adjacent area or attached structure, such as a house, that is desired to be secured in certain instances. The door 49 has an exterior surface 49A facing the garage 14 and an interior surface 49B facing the house. FIG. 2 is a perspective view of the interior side 49B of the door 49. A passageway door lock 50 is mounted adjacent the door 49 such that a bolt 52 of the lock 50 may obstruct the door 49 by inhibiting an inward swing of the door 49, thereby preventing the door 49 from being opened. The movable barrier operator 12 is in communication with the lock 50 and may cause automatic locking of the lock 50 in response to a guest such as a delivery associate opening the garage door 24. In one form, the lock 50 includes a manual actuator 51 enabling a user to manually shift the bolt 52 between unlocked and locked positions and open the door 49. The lock 50 is mounted to a door jamb 45 associated with the door 49 such that the bolt 52 extends along a portion of the door's interior surface 49B. In one form, neither the door 49 nor the jamb 45 need to be modified, such as by cutting mortises or cavities, to receive the bolt 52 or the lock 50.

Figure 3:
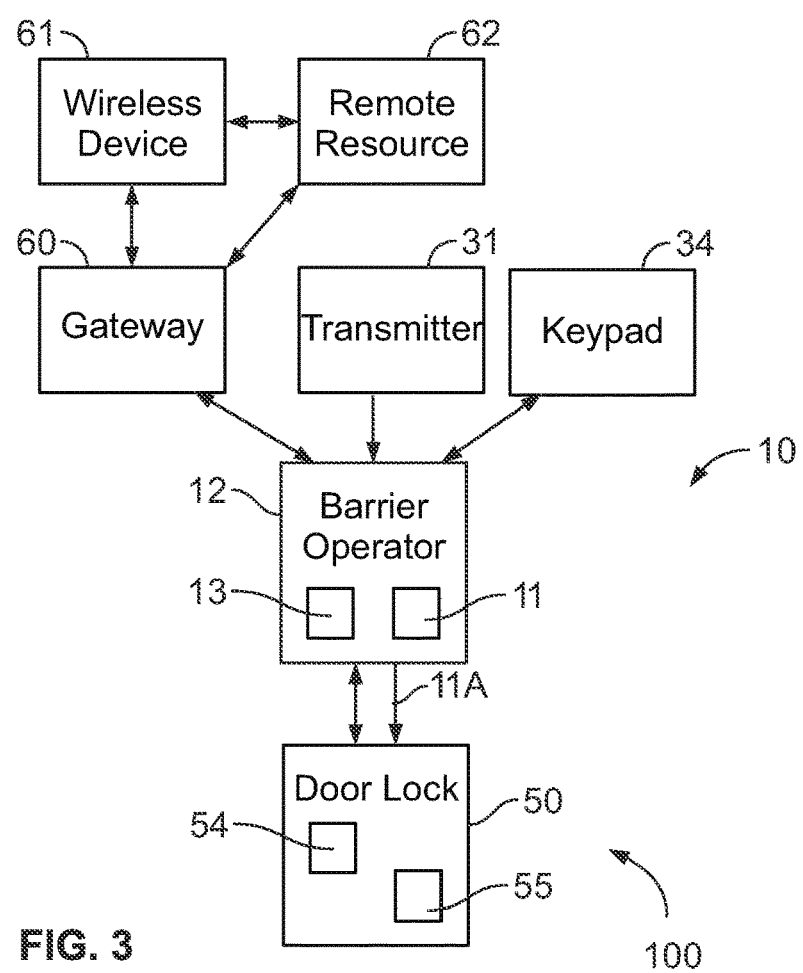
FIG. 3 is a block diagram of a system including the movable barrier operator and the passageway door lock of FIGS. 1 and 2.

A passageway lock system 100 is provided as a block diagram in FIG. 3 and includes the moveable barrier operator 12 and the lock 50. The moveable barrier operator 12 includes wireless communication circuitry 11, such as a receiver and transmitter or a transceiver. The moveable barrier operator 12 also includes a controller 13 that includes a processor and a non-transitory computer readable memory.

The wireless communication circuitry 11 may be configured to communicate over one or more frequencies, such as standard 300 MHz-400 MHz frequencies, and one or more protocols, such as Bluetooth®, Wi-Fi, ZigBee, or infrared (IR). In one form, the wireless communication circuitry 11 includes a transceiver (or a separate receiver and transceiver) for communicating via 300 MHz-400 MHz signals with a garage door opener transmitter, as well as a Bluetooth® and/or Wi-Fi transceiver (or a separate transmitter and receiver) for communicating with the lock 50 and/or a gateway 60. The gateway 60 may provide wireless access to an external network, such as the interne. The gateway 60 may be a router, access point or a "smart" house hub. Although the lock 50 is shown as communicating with the moveable barrier operator 12, the lock 50 may additionally or alternatively communicate with gateway 60. In an example, the lock 50 and the moveable barrier operator 12 communicate indirectly with each other via gateway 60 and/or a cloud (e.g., network-based service) that is instantiated or otherwise executed by a remote entity such as a network device or server computer.

In operation, the movable barrier operator 12 receives a signal. The signal can be transmitted from one of multiple remote controls, including the keypad 34, the portable transmitters 30, 31, or another remote control such as a wireless device 61. The wireless device 61 may be a smartphone or tablet communicatively coupled to the movable barrier operator 12 by the gateway 60. For example, a user may send open or close commands to the movable barrier operator 12 using an application running on the user's smartphone. The user's smartphone communicates with a remote resource 62, such as a server computer, via a cellular telephone system and the internet. In response to receiving the communication from the user's smartphone, the remote resource 62 sends a signal to the movable barrier operator 12 via the internet. The signal may include data representing the identity of the smartphone and/or user and a code associated with the moveable barrier operator 12. If the signal is sent using the keypad 34, the keypad 34 sends a code entered by a user to the moveable barrier operator 12. A controller 13 of the moveable barrier operator 12 parses and decrypts the signal to determine if the code(s) are valid, and determines the permissions associated with the identified remote control and/or user. Among the permissions determined by the moveable barrier operator 12 is whether to unlock the lock 50 to give access to the house.

If an identified user/remote control is permitted access to the garage 14 and the house, the moveable barrier operator 12 transmits a signal 11A to the door lock 50 containing a command to unlock the passageway door 49. The door lock 50 receives the command at communication circuitry 54, which may include a receiver and a transmitter, and actuates the bolt 52 (FIG. 2) into an unlocked or retracted position. In some forms, the signal 11A transmitted to the door lock 50 is encrypted, and the door lock 50 includes a controller 55 configured to decrypt the signal. The signal 11A may be sent via wired or wireless approaches.

If the identified user/remote control is permitted access to the garage 14 but is not permitted access to the house, the moveable barrier operator 12 transmits the signal 11A containing a lock command to the door lock 50. The door lock 50 receives the signal 11A at the communication circuitry 54 and in response, actuates the bolt 52 into a locked or extended position. The movable barrier operator 12 thereby causes the door lock 50 to secure the door 49 (FIGS. 1 and 2) before or concurrent with the movable barrier operator 12 starting to open the garage door 24. If the movable barrier operator 12 receives the signal 11A from a remote control that is unauthorized, the movable barrier operator 12 does not open the garage door 24.

Figure 4A:
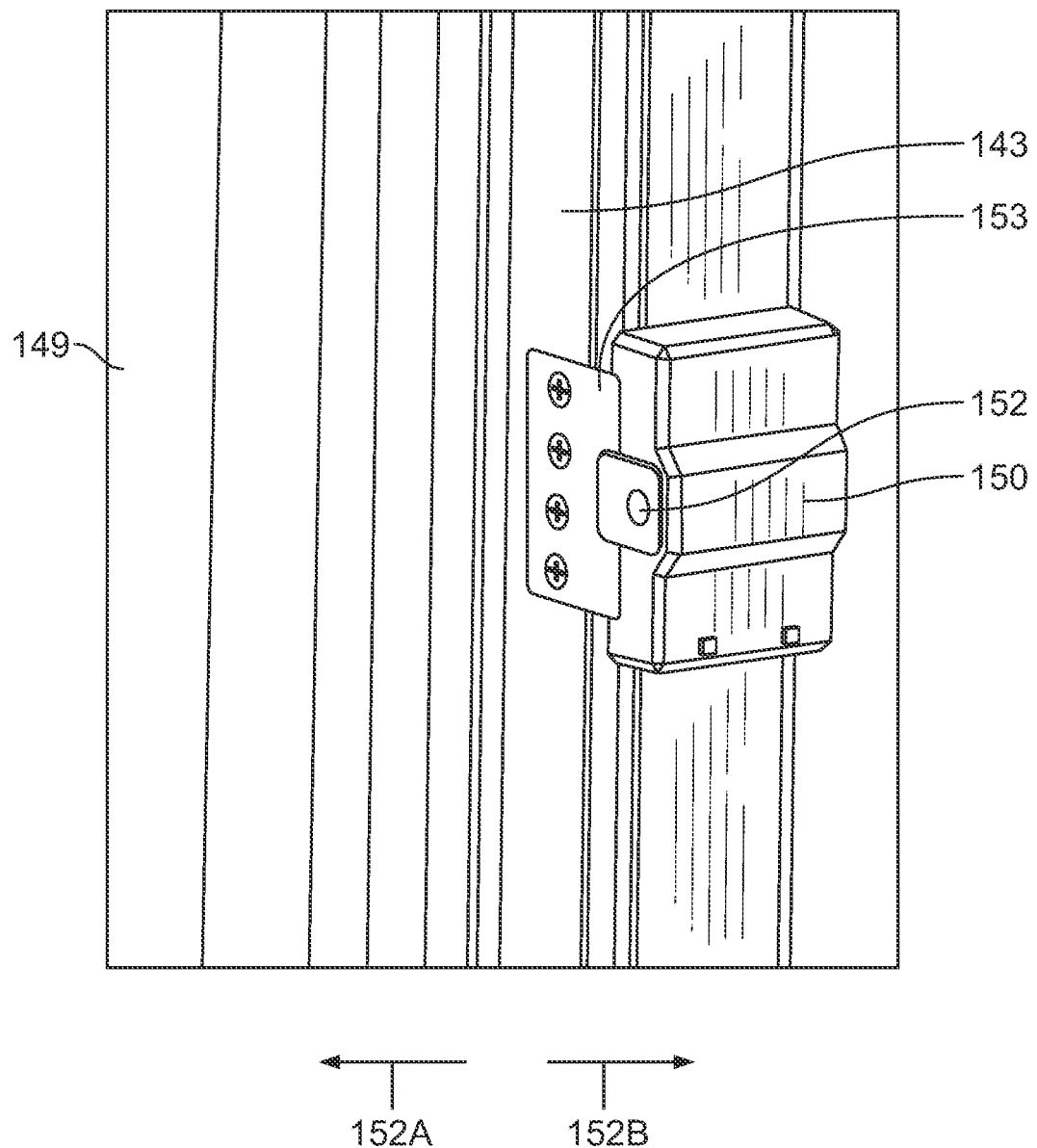
FIG. 4A is a perspective view of a passageway door lock.
Figure 4B:
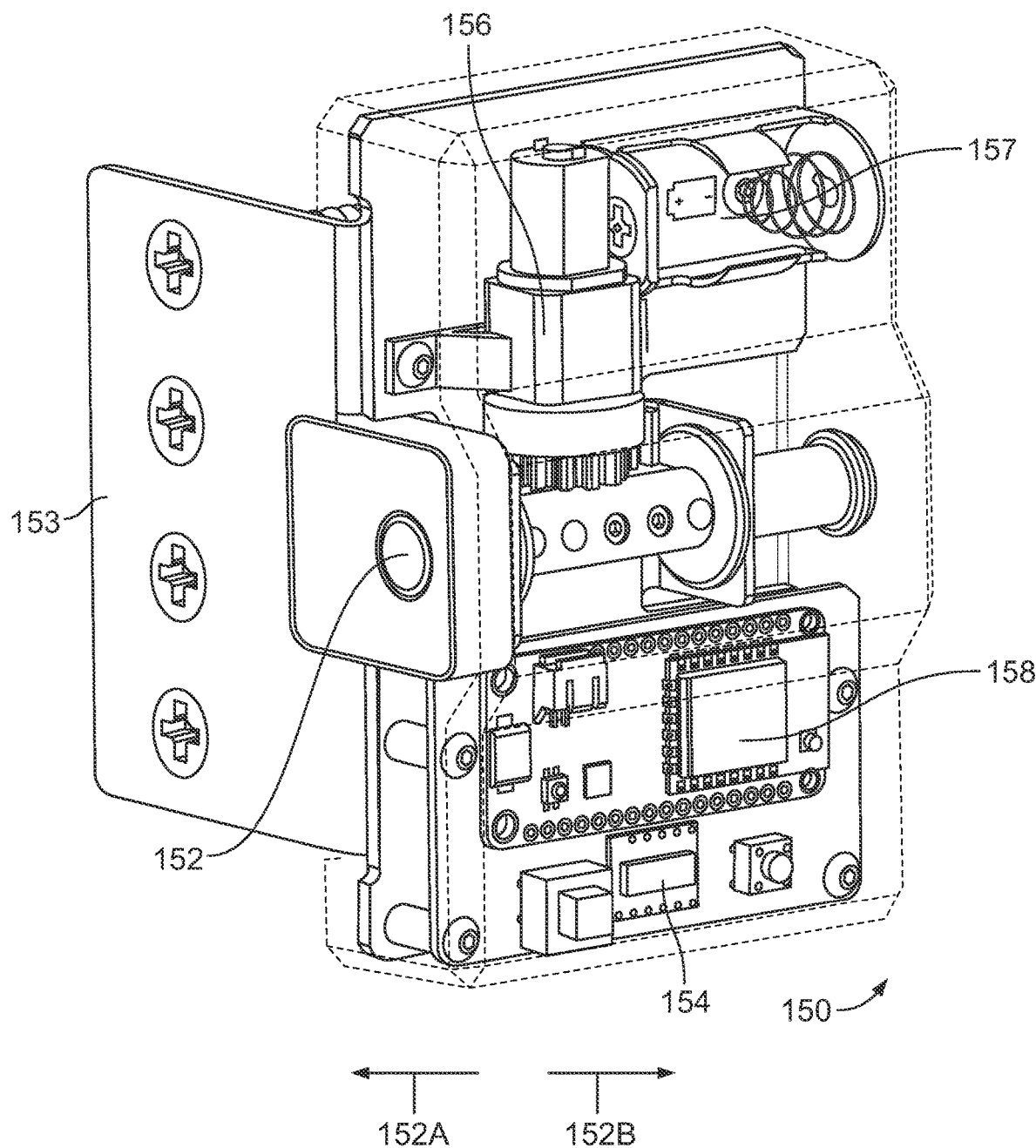
FIG. 4B is a perspective view of the lock of FIG. 4A with a housing of the lock transparent to show internal components of the lock.
Figure 4C:
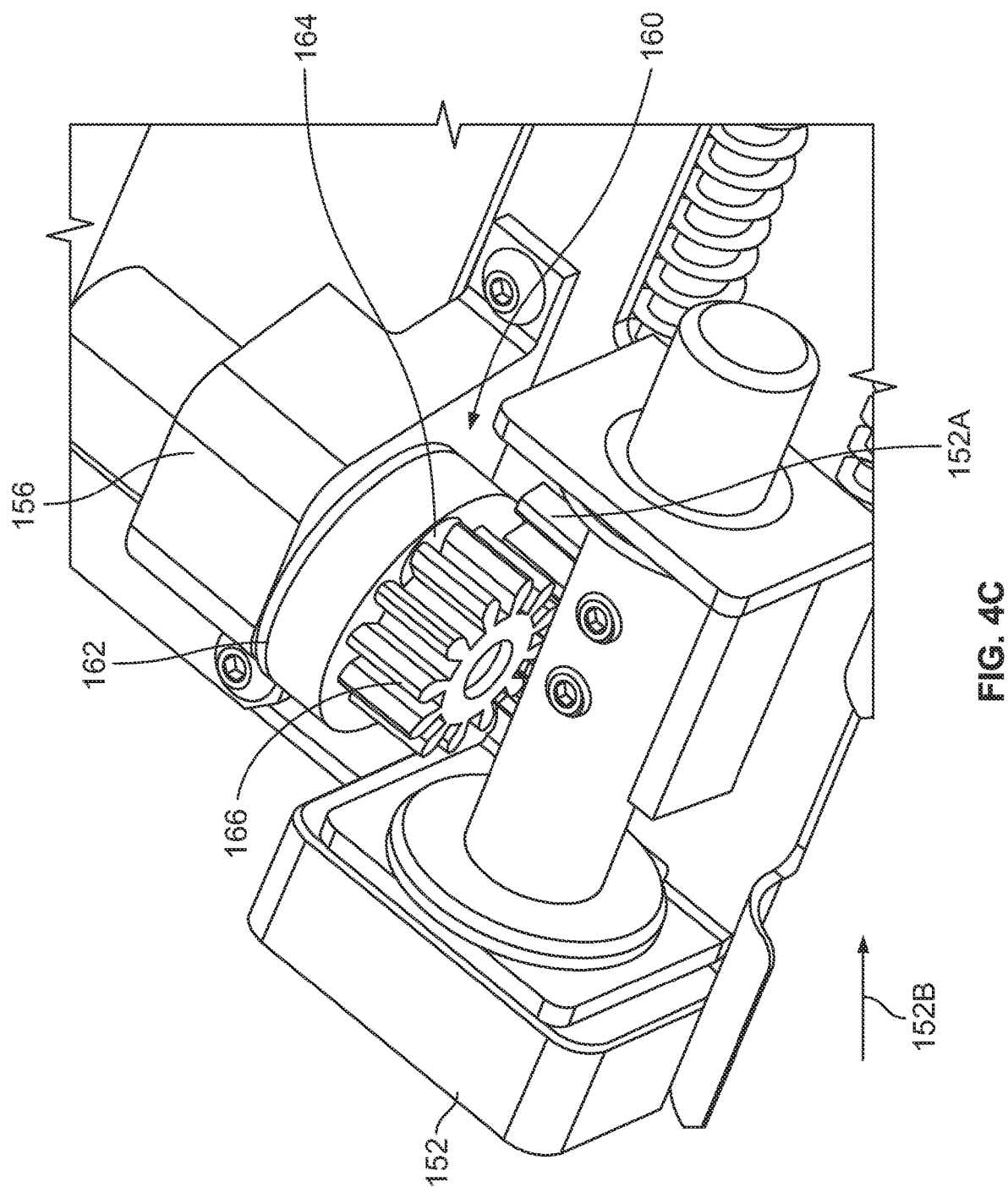
FIG. 4C is a perspective view of drive elements of the lock of FIGS. 4A and 4B.

FIGS. 4A-4C illustrate a passageway door lock 150 configured to secure a passageway door 149. The lock 150 includes a bolt 152 shiftable in direction 152A to an extended position to obstruct opening of the door 149 when the door 140 is closed. The lock 150 is mounted adjacent the door 149 by a mounting plate 153 secured to a door jamb 143. In one form, the mounting plate 153 is secured to the jamb 143 by a plurality of fasteners such as screws or nails long enough to extend into a structural or supporting member (e.g., a metal or wood stud) adjacent to the door 149. The bolt 152, mounting plate 153, and other components of the lock 150 may be made of steel, alloy or other material having high tensile strength.

With reference to FIG. 4B, the lock 150 includes a rotary or linear actuator such as an electric motor 156 configured to drive or actuate the bolt 152. The electric motor 156 is operable to drive the bolt 152 in direction 152A to extended, locked position or in direction 152B to a retracted, unlocked position. The electric motor 156 is powered by a power source 157, such as a battery. In some forms, the lock 150 is additionally or alternatively wired to the electrical system of the house or associated structure. The motor 156 is controlled by a controller 158 and/or associated circuitry. A receiver 154 is communicatively coupled to the controller 158. In operation, the receiver 154 receives a signal from the moveable barrier operator 12 and/or the gateway 60 and transmits the received signal to the controller 158. The controller 158 analyzes the signal to determine whether to operate the motor 156. The controller 158 then connects the motor 156 to the power source 157 such that the electric motor 156 drives the bolt 152 to the locked or unlocked position.

In one form, the lock 150 includes a slip clutch 160 as shown in FIG. 4C. The slip clutch 160 includes a metal plate 162 coupled to a drive shaft of the motor 156. When the motor 156 is powered, the motor 156 rotates the plate 162. A magnet 164 is mounted to the plate 162. The magnet 164 is coupled magnetically to a pinion gear or sprocket 166 that engages a toothed rack 166A fixed to the bolt 152. In standard operation, rotating the plate 162 causes the magnet 164 and, in turn, the sprocket 166 to rotate. Teeth of the rotating sprocket 166 mesh with complementary teeth of the rack 166A and cause the bolt 152 to be driven inwardly in direction 152B or outwardly in direction 152A. However, if force is applied to the bolt 152 in direction 152B, such as by a manual actuator (e.g., actuator 51 of FIG. 2), the bolt 152 imparts torque on the sprocket 166 causing the magnet 164 to rotate or slip relative to the plate 162. The slipping allows the bolt 152 to be moved without turning the driveshaft of the motor 156 and possibly damaging the motor 156. The slipping permits a person inside of the house to manually shift the bolt 152 to an unlocked position to open the door 149.

Figure 5A:
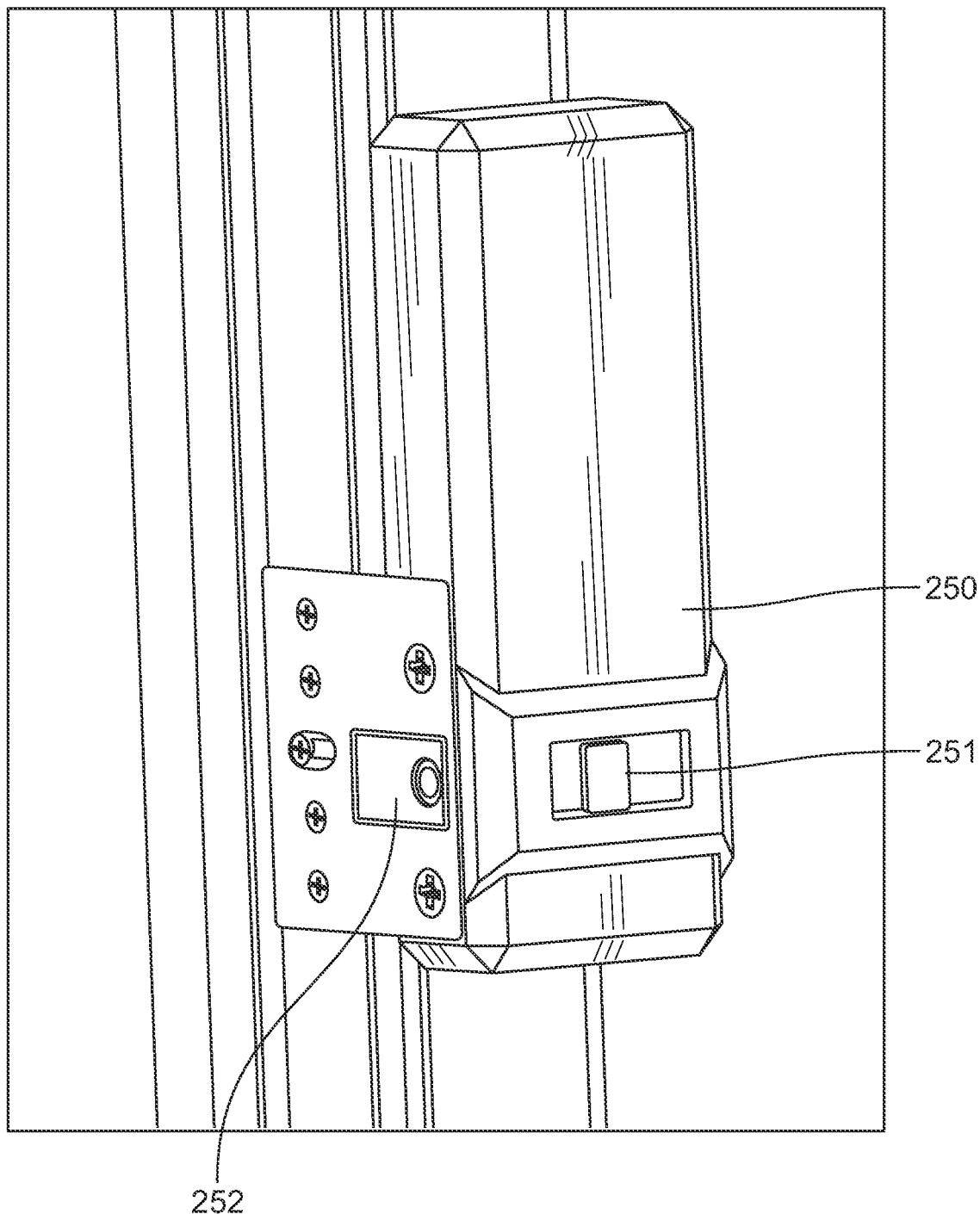
FIG. 5A is a perspective view of a passageway door lock.
Figure 5B:
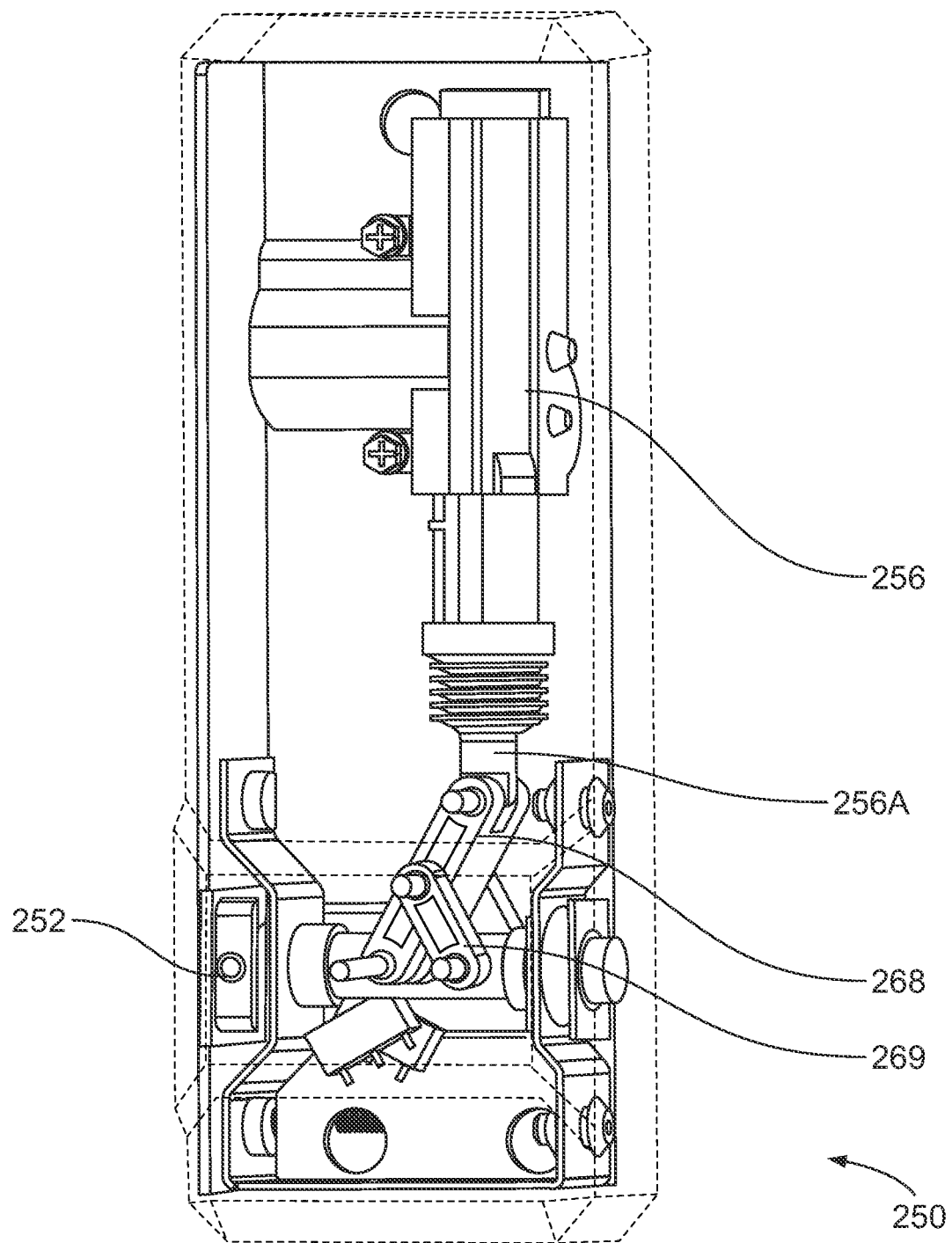
FIG. 5B is a perspective view of the lock of FIG. 5A with a housing of the lock transparent to show internal components of the lock.

Another lock 250 is illustrated in FIGS. 5A-5B. The lock 250 includes a linear actuator 256. The linear actuator 256 is operatively coupled to the bolt 252 by a linkage including links 268, 269. The links 268, 269 are pivotably connected such that they convert the vertical movement of a piston 256A of the actuator 256 into horizontal movement of the bolt 252. One end of the link 268 is coupled to the bolt 252, such that the vertical movement of the piston 256A actuates the bolt 252 between an extended locked position and a retracted unlocked position.

Figure 6:
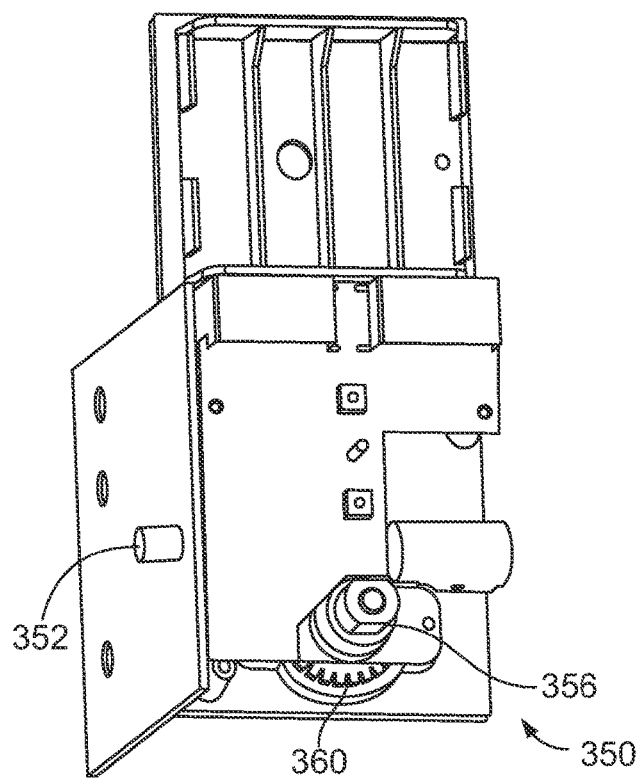
FIG. 6 is a perspective view of internal components of a passageway door lock.

The passageway door lock 350, as shown in FIG. 6, includes a motor 356 configured to rotate a slip clutch 360. The slip clutch 360 is operatively coupled to a bolt 352 such that rotation of the slip clutch 360 moves the bolt 352 between locked and unlocked positions. The bolt 352 has a cylindrical shape with rounded edges. The rounded shape of the bolt 352 decreases the likelihood of scratching the paint or finish of a door.

Figure 7:
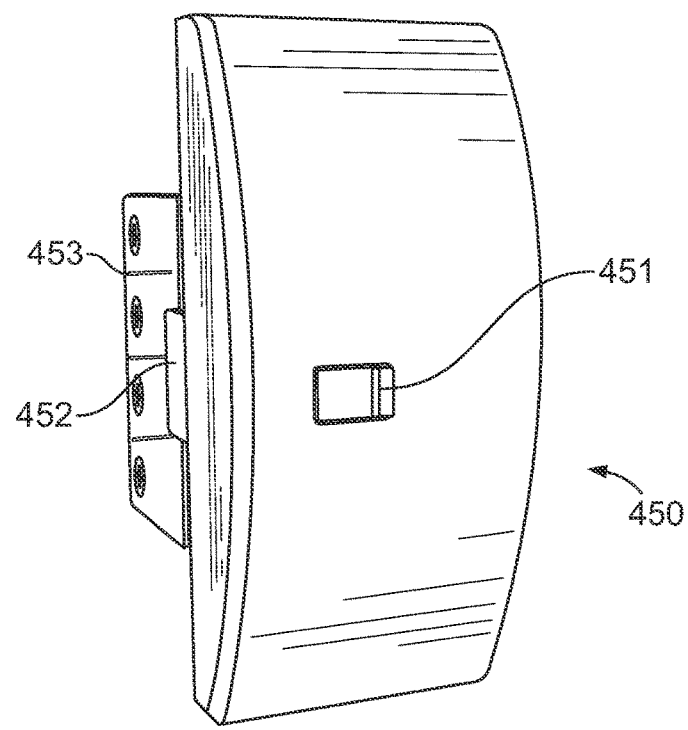
FIG. 7 is a perspective view of a passageway door lock.

FIG. 7 illustrates a passageway door lock 450 having a bolt 452 operatively coupled to a manual actuator 451. The lock 450 includes a slip clutch, such as the magnetic slip clutch 160 described above, allowing the bolt 452 to be manually actuated without damaging a drive motor of the lock 450. The lock 450 includes a mounting plate 453 having predetermined locations for receiving screws for mounting the lock 450 adjacent to a door.

Figure 8:
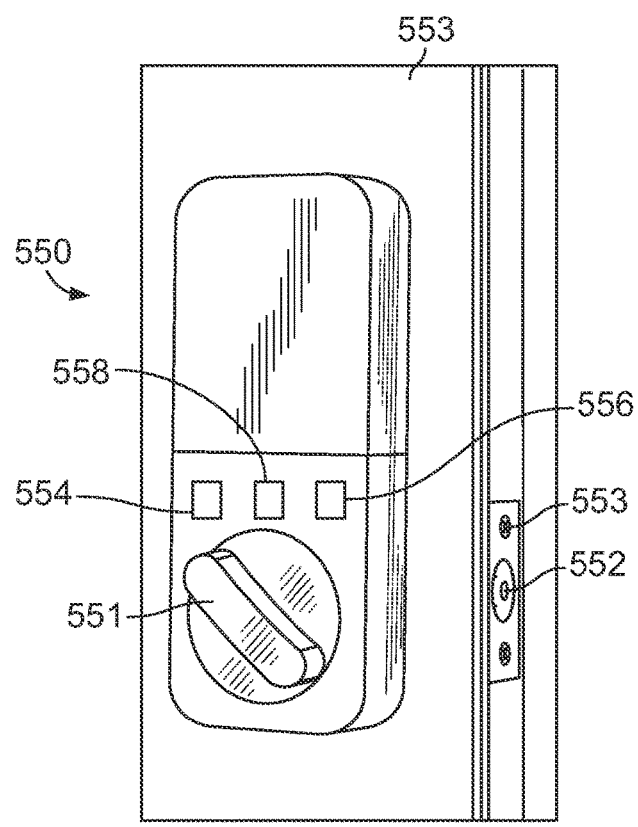
FIG. 8 is a perspective view of a passageway door lock of a passageway door with a bolt of the passageway door lock located within the door.

FIG. 8 illustrates a passageway door lock 550 of a door 553. As shown, the door lock 550 is configured to adapt or augment an existing deadbolt-type lock by coupling with or replacing a portion of the deadbolt-type lock, particularly an indoor mechanism. For instance, an indoor-accessible mechanism of a deadbolt lock such as a thumbturn or a keyed cylinder (of a double cylinder deadbolt) may be removed and replaced with the door lock 550 such that the remaining portions of the existing deadbolt lock (e.g., the keyed outdoor cylinder and the latch/bolt) couple and function with the door lock 550. Installation of the door lock 550 may entail replacement of a bolt 552, however the bolt 552 may be a portion of the existing deadbolt-type lock that remains independent of installation of the door lock 550. Bolt 552 is operatively coupled to a manual actuator 551 illustrated as a thumbturn. The bolt 552 is located within the door when in a retracted state. When actuated, the bolt 552 extends from the door and enters a cavity in the door frame, as in traditional deadbolt locks. The passageway door lock 550 includes a wireless communication circuit 554 for receiving signals to control the actuation of the bolt 552. When the wireless communication circuit 554 receives a signal, the signal is transmitted to a controller 558 which operates a motor 556 to move the bolt 552. The passageway door lock 550 further includes a power source, such as one or more batteries. The bolt 552 extends through an opening of a plate 553. Passageway door locks 150, 250, 350, 450, and 550 operate in a manner similar to the passageway door lock 50 and may be utilized in the system 100.

Figure 9:
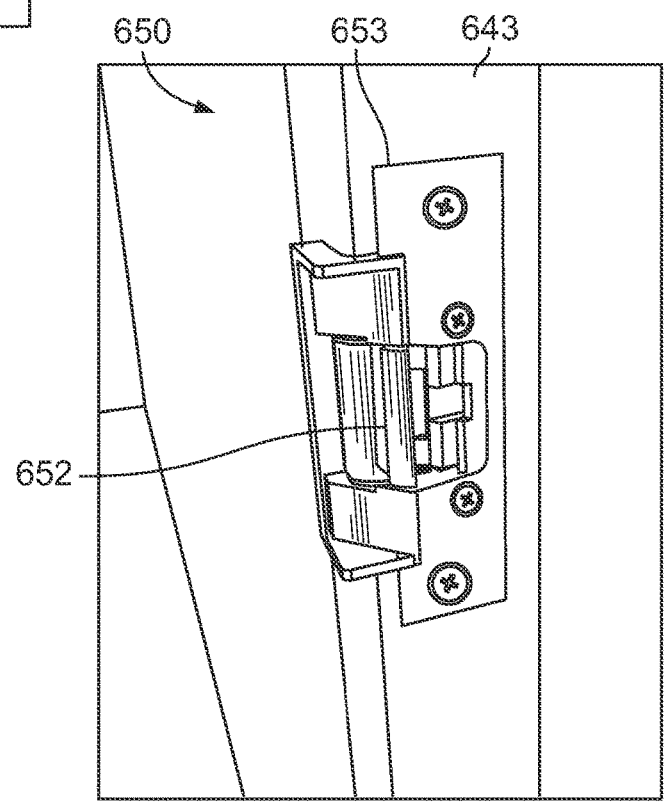
FIG. 9 is a perspective view of an electric strike for a passageway door.

In some forms, locks other than deadbolts may be used in the system 100 to secure the passageway door. FIG. 9 illustrates an electric strike 650 for securing a passageway door, such as the passageway door 49 of FIG. 1. The electric strike 650 includes a mounting plate or strike plate 653 for mounting the electric strike 650 to the door jamb 643. A movable keeper or latchbar 652 is configured to releasably secure the passageway door in a closed position. The latchbar 652 is actuated to move from the secured position, as shown in FIG. 9, to an unsecured position in order to release the passageway door. The electric strike contains an internal power source, motor or actuator, and wireless receiver similar to those described in the embodiments above.

As with the locks described above, the electric strike 650 is remotely controlled by at least one of the movable barrier operator 12 or a remote device, such as a server computer or a wireless device via the internet. In operation, a control signal is transmitted to the electric strike 650 which causes the electric strike 650 to move the latchbar 652 into the secured or unsecured position.

Other types of locks may be used in the system 100. For example, a lock that fits over a thumb turn of an existing, conventional deadbolt lock to operate the deadbolt may be utilized. As another example, a lock that replaces an interior-side thumb turn of a conventional deadbolt lock while keeping the internal deadbolt mechanism and exterior keyed cylinder may be utilized.

A user or administrator grants access to the garage 14 by giving out temporary or limited access codes. In some forms, the limited access code is in the form of a code to be entered into the keypad 34. In another form, the limited access code is programmed into a portable transmitter 30, 31 or the wireless device 61. In yet another form, the limited access code is programmed into the movable barrier operator 12 in addition to programming the limited access code (or a complementary code) into a portable transmitter 30, 31 or the wireless device 61. In other instances a remote resource 62 (e.g., server computer) transmits or otherwise communicates the limited access code to a portable transmitter 30, 31 or the wireless device 61 upon request after performance of a security measure such as at least one of verification, authorization, and authentication of the requester. The wireless device 61 communicates with the remote resource 62, which may be a server computer or a plurality of server computers forming a cloud, which in turn communicates with the moveable barrier operator 12 via the local gateway 60. A limited access code may be one or more codes output from a rolling code encryption process used by the moveable barrier operator 12. Accordingly, the movable barrier operator 12 may provide the remote resource 62 with a rolling code that is generated or output based on a query or request such that the rolling code can be relayed to a portable transmitter 30, 31 or the wireless device 61 for example after performance of a security measure.

The moveable barrier operator 12 includes memory (e.g., integral/unitary or otherwise onboard the controller 13 in FIG. 3 or separate/distinct from the controller 13) storing the limited access codes and associating them with specific permissions. In some forms, the permissions limit the temporal periods, e.g., times of day and/or days during which the moveable barrier operator 12 will open the garage door 24 in response to receiving the limited access codes. The permissions also indicate whether or not the code grants access to the attached home or structure via the passageway door 49. The operation of the lock 50 and permission to open the door 49 can differ from whether a guest has permission to open the garage door 24. For example, some codes used to enter the garage door 24 can have stored permissions to permit entry into both the garage and the house, in which case the garage door 24 will open and the lock 50 will unlock. Other codes will have stored permissions limited to the garage, in which case the garage door 24 will open and the lock 50 will lock. In operation, a user having administrator rights may establish and/or provide access codes granting only garage access permission to delivery associates such that they can leave packages in the garage 14. Different access codes may be established and/or given to maids, contractors, guests, or others to control when such individuals are permitted to enter the garage 14 and whether the guest can open the door 49 to the adjacent area.

As described above, the moveable barrier operator 12 receives a signal and checks a code of the signal against a stored table of permissions. If the code grants permission to enter the garage 14 and the home, the movable barrier operator 12 or remote resource 62 transmits an unlock signal to the lock 50 at the passageway door 49 and the movable barrier operator 12 opens the garage door 22. If permission to enter the home is not granted but the guest can access the garage 14, the movable barrier operator 12 or remote resource 62 transmits a lock signal to the lock 50 and the movable barrier operator 12 opens the garage 14.

In addition to the limited access codes, the administrator or another user can create primary codes, such as permanent or resident access codes. The resident access codes can be used at any time and any number of times. When the moveable barrier operator 12 receives a resident access code, the movable barrier operator 12 transmits an unlock signal or causes remote resource 62 to transmit the unlock signal to the lock 50. These resident access codes can later be changed or revoked by the administrator.

The moveable barrier operator 12 may use additional data when determining whether or not to transmit a lock signal (or cause the lock signal to be transmitted e.g., from the remote resource 62) to the lock 50. In one example, the moveable barrier operator 12 transmits a lock signal to the lock 50 if no users are at home, if only a single resident is at home, or if only children are at home, but not if adults are at home. The system 100 detects who is at home by, for example, tracking codes entered at the keypad 34, detecting vehicles in the garage 14, and/or identifying wireless devices communicatively coupled to the gateway 60 and/or the movable barrier operator 12. For example, the system 100 may store identifying information of the smartphones of the adults that live in the home. If those smartphones are connected to the gateway 60, they are identified by the movable barrier operator 12 and/or the remote resource 62, and the movable barrier operator 12 does not lock the passageway door lock 50. In alternative forms, the administrator or another user enters schedule information into an application running on her smartphone which is provided to a home automation system associated with the garage 14 and/or the movable barrier operator 12. The schedule information indicates the standard schedule of the users. The movable barrier operator 12 or the remote resource 62 will operate the lock 50 based on whether or not the adults should be home according to the preprogrammed schedule.

In some embodiments, the lock 50 includes one or more sensors configured to detect the position of the bolt 52. The position of the bolt 52 is transmitted to the moveable barrier operator 12 or the remote resource 62 by the lock 50. If the bolt 52 is already in the locked position, the movable barrier operator 12 or the remote resource 62 may not transmit a lock command. The sensor detects when the bolt 52 is actuated. In some forms, the moveable barrier operator 12 creates a log storing times at which the bolt 52 is actuated. This log can be accessed by the administrator or another user. Alternatively or additionally, a signal is transmitted to the wireless device 61 of the administrator when the bolt 52 is actuated. The moveable barrier operator 12 may store a log of received signals from transmitters 30, 31. The log includes identifying information associated with the transmitters 30, 31 and/or access codes and the time at which signals were received. In some forms, the log further includes the time at which a close signal was received at the moveable barrier operator 12 and/or the amount of time between the open and close signal.

The administrator or another user can associate the system 100 with a variety of shipping/delivery companies and/or retailers. In one form, the user inputs a package tracking number associated with a package into an application on her wireless device 61. The remote resource 62 automatically generates an access code for the delivery associate handling the package, and transmits the access code to a server computer of the delivery company and to the moveable barrier operator 12. In some forms, the access code is temporally limited to the estimated expected day and/or time window for delivery provided by a partner cloud 610 (FIG. 10A) described below. Additionally or alternatively, the access code is a one-time code that expires after the access code is used to operate the movable barrier operator 12.

In another form, information identifying the system 100 is input into a retailer account by an administrator or another user. When the administrator or another user makes a purchase from the retailer, the retailer's software automatically generates a temporary access code and transmits the code to the delivery associate and to the moveable barrier operator 12.

Figure 10A:
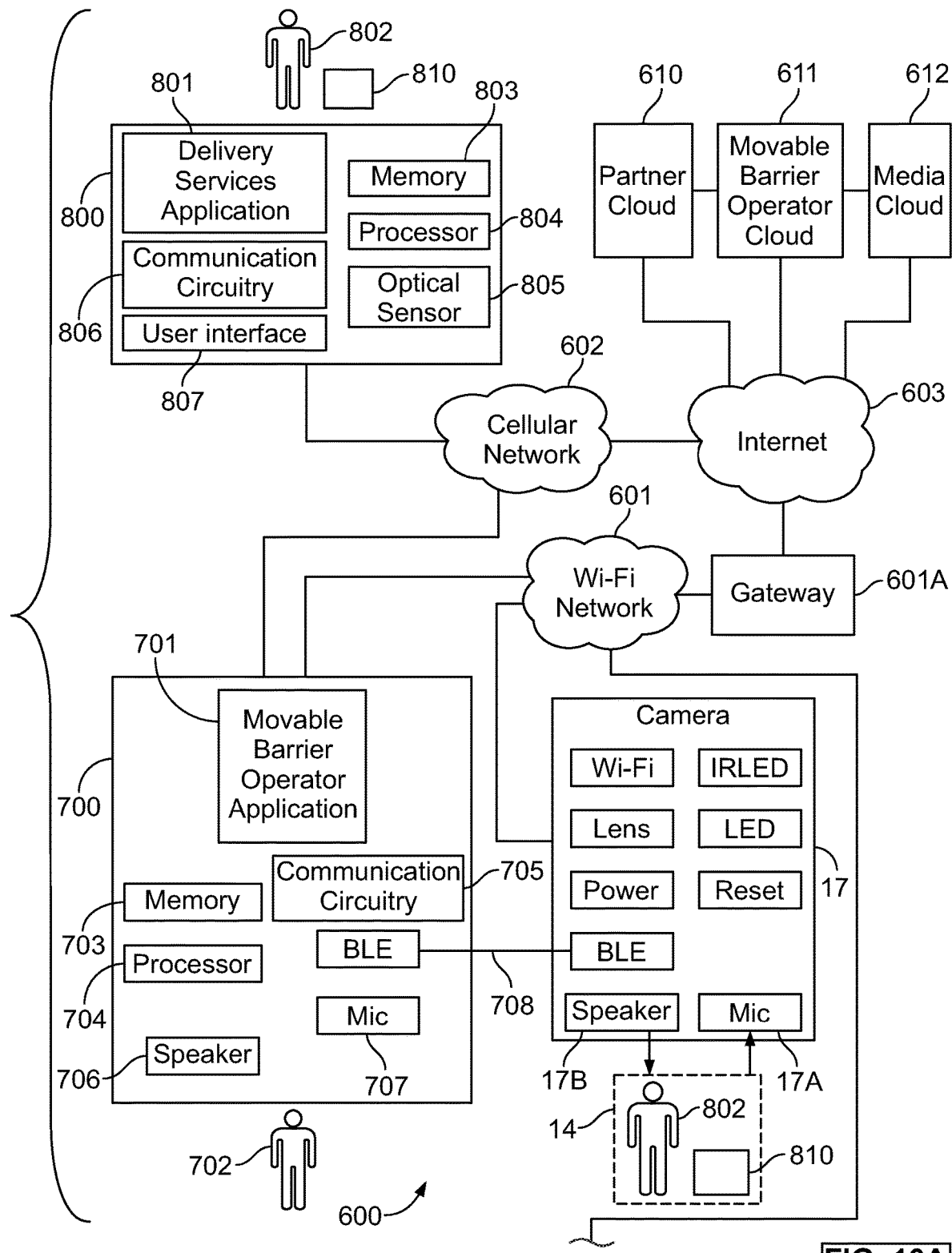
FIGS. 10A-10B are a schematic diagram of a delivery services system for facilitating delivery of a package to a garage.
Figure 10B:
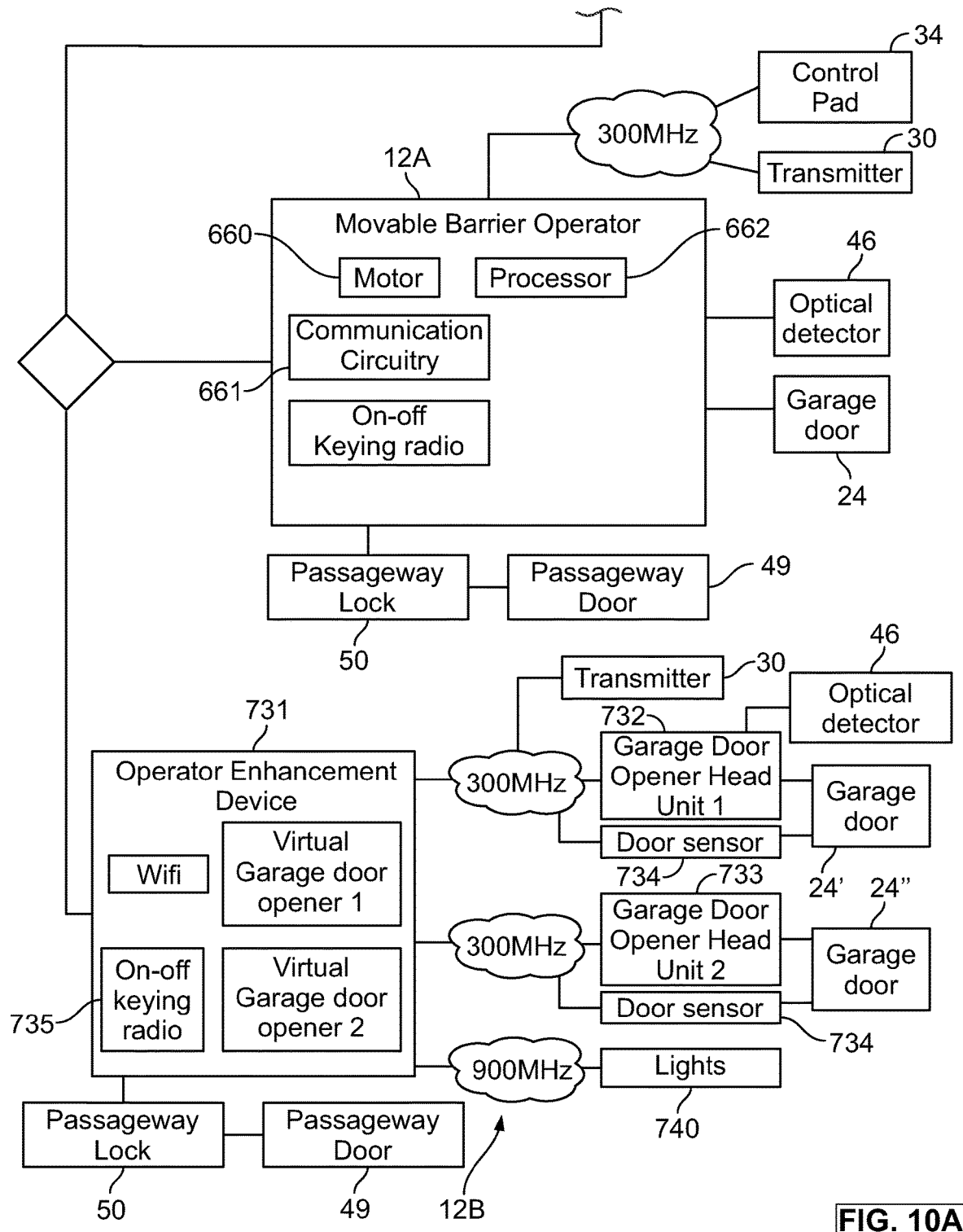

With reference to FIGS. 10A-10B, a delivery services system 600 is provided that includes one or more components of the system 100. The system 600 includes the movable barrier operator 12, such as moveable barrier operator systems 12A, 12B, that are communicatively coupled to the internet 603, such as via Wi-Fi connection 601. The system 100 includes the gateway 60 in the form of a gateway 601A, such as a router, access point, or modem, for connecting the Wi-Fi network 601 to the internet 603. Via the internet 603, the moveable barrier operator systems 12A, 12B communicate with the wireless device 60, which may include a first wireless device 700, such as a smartphone, and a second wireless device 800, such as a smartphone, tablet computing device or personal computer. The first and second wireless devices 700, 800 are connected to the internet 603 by the Wi-Fi network 601 or by a cellular network 602. The first wireless device 700 is operated by a user 702, such as the homeowner or a resident, of a structure associated with the garage 14 such as an attached home. The second wireless device 800 is operated by a delivery associate 802. As illustrated, the first wireless device 700 includes a memory 703 and a processor 704 for storing and running a moveable barrier operator application 701. The first wireless device 700 may also include communication circuitry 705, a speaker 706, and a microphone 707. Example screenshots from the moveable barrier operator application 701 are shown in FIGS. 11A-11G and described below. The second wireless device 800 includes a memory 803 and a processor 804 for storing and running a delivery services application 801. The second wireless device 800 may further include a sensor, such as an optical sensor 805 (e.g. camera), communication circuitry 806, and a user interface 807 for receiving a user input. The communication circuitry 806 may include a cellular network interface, a Bluetooth® interface, and/or a GPS receiver as some examples. FIGS. 12A-12H provide example screenshots of the delivery services application 801. In one form, the moveable barrier operator application 701 and delivery services application 801 are the same application, and the screens displayed by the application (and the features/functionality thereof) depend on whether an individual signs in with access credentials as the user 702 or the delivery associate 802.

The moveable barrier operator systems 12A, 12B are operatively coupled to garage doors 24', 24" as well as passageway locks 50 of passageway doors 49 as described above. The movable barrier operator systems 12A, 12B may take a variety of forms. For example, the movable barrier operator system 12A in FIG. 10B includes a garage door opener head unit with wireless capability. The movable barrier operator system 12A may include a motor 660, communication circuitry 661 and a processor 662. The movable barrier operator system 12B in FIG. 10B includes a communication hub or operator enhancement device 731 communicatively coupled to one or more movable barrier operators, such as garage door opener head units 732, 733, wherein each garage door opener head unit 732, 733 is coupled to a garage door 24', 24" respectively. One example of the operator enhancement device 731 is the MyQ® Smart Garage Hub sold by the Chamberlain Group, Inc. The garage door head units 732, 733 do not, by themselves, have the ability to communicate over a network. The operator enhancement device 731 permits the garage door head units 732, 733 to be monitored and controlled over a network, such as the internet, using a smartphone application or computer internet browser. To this end, the operator enhancement device 731 includes a virtual garage door opener (virtual garage door opener 1 and virtual garage door opener 2) for each of the garage door head units 732, 733. The operator enhancement device 731 also includes a door sensor (DS) 734 associated with each garage door 24', 24" which permits the operator enhancement device 731 to keep track of the status of the garage doors 24', 24". The status of each garage door 24', 24" may include at least one of closed, open, closing, opening, partially open, obstructed, stopped, and reversed. To operate either one of the garage door opener head units 732, 733, the operator enhancement device 731 sends a 300 MHz on-off keying (OOK) signal via the OOK radio 735 of the operator enhancement device 731. The garage door opener head unit 732, 733 to which the OOK signal is directed then operates to change the position of the garage door 24', 24". To operate a light 740 (e.g., a controllable/switched bulb or fixture within the residence to which the garage is attached, or a worklight associated with or integral to either one of the garage door opener head units 732, 733,) the operator enhancement device 731 may send a 900 MHz signal.

The passageway locks 50 may be in the form of or more of the passageway locks 150, 250, 350, 450, 550 discussed above. The moveable barrier operators 12A, 12B are communicatively coupled to the passageway locks 50 to both transmit control signals to the passageway locks 50 as well as receive status signals from the passageway locks 50. Additionally or alternatively, the passageway locks 50 may be in communication with a remote resource 62 such as a server computer (e.g., movable barrier operator cloud 611) via the internet 603 through one or more networks including a wired (e.g., POTS, Ethernet, etc.) network, wireless short-range (e.g., Wi-Fi 601) network, and wireless long-range (e.g., cellular 602) network. The moveable barrier operators 12A, 12B include additional control inputs such as from the obstruction detection components (constituted by optical emitter 42 and optical detector 46), transmitters 30, and the keypad 34.

Regarding FIGS. 10A and 10B, the movable barrier operator system 12A is associated with the garage 14 and the system 600 includes the camera 17 located within the garage 14. The following discussion describes the delivery associate 802 delivering a package 810 to the garage 14 associated with the movable barrier operator system 12A, but it will be appreciated that the user 702 could specify delivery to the garage associated with the movable barrier operator system 12B if so desired. Further, when both movable barrier operator systems 12A, 12B are installed in a common garage 14 but control different garage doors of the garage, the user 702 can utilize the movable barrier operator application 701 to select which movable barrier operator systems 12A, 12B with which the delivery associate 802 interacts.

When the delivery associate 802 is in the garage 14 as shown in FIG. 10A, the camera 17 is communicatively coupled to the first wireless device 700 (e.g., a mobile phone, tablet, etc. of the homeowner, resident or delivery recipient). The camera 17 communicates with the first wireless device 700 either via the internet 603 or, when the first wireless device 700 is local, via the Wi-Fi network 601 or a short range wireless communication protocol, such as Bluetooth® or BLE (Bluetooth low energy) connection 708. The camera 17 includes a microphone 17A and speaker 17B to facilitate verbal communication between the delivery associate 802 and the user 702. As described above, the camera 17 may be adjustable, by means of a motor configured to pan and/or tilt the camera and/or a second motor configured to adjust the lens and zoom level of the camera, and the adjustment can be controlled by the user 702 using the application 701.

The network 600 includes one or more cloud-based computing systems such as a partner cloud 610, a movable barrier operator cloud 611, and a media cloud 612. The partner cloud 610 is a cloud-based computing system used by a partner retailer 905 (see FIG. 11B) to store and transmit order information. The partner retailer 905 is a retailer, such as a brick and mortar store, an online retailer, or a peer-to-peer purchasing platform as some examples. The partner retailer 905 sells items to the user 702. The items may be perishable, e.g., groceries or a prepared meal, or non-perishable. The items are packaged in a parcel or package 810 with an identifier. Example identifiers include non-human readable identifiers such as barcodes, QR codes, RFID tags, or NFC tags. The delivery associate 802 retrieves the package 810 from the partner retailer (or from a third-party entity), the delivery associate 802 may then scan the identifier on the package 810 via the optical sensor 805 of the second wireless device 800, and delivers the package 810 to the user's garage 14. The second wireless device 800 is communicatively coupled to the partner cloud 610. The delivery associate 802 acquires information about deliveries, such as the products to be delivered, the pickup location, and the delivery location, via the partner cloud 610 and/or movable barrier operator cloud 611. The moveable barrier operator cloud 611 facilitates communication between moveable barrier operator systems 12A, 12B and the first and second wireless devices 700, 800. The movable barrier operator cloud 611 may also facilitate communication between camera 17, passageway lock 50, and barrier operator systems 12A, 12B as well as the first and second wireless devices 700, 800. The moveable barrier operator cloud 611 may include a server computer or memory device that stores information related to the operation of moveable barrier operator systems 12A, 12B, such as operator status, temporary access codes, authorized transmitter IDs, operation logs, etc. The moveable barrier operator cloud 611 further enables the moveable barrier operator systems 12A, 12B to be operated remotely such as by the first wireless device 700. The media cloud 612 is communicatively coupled to the camera 17. The media cloud 612 stores security data captured by the camera 17 such as images, videos, and/or audio, such as videos captured during deliveries. The media cloud 612 may be configured with instructions to perform media processing and/or analysis including one or more of facial recognition, two- or three-dimensional object recognition, and the like. In some forms, the information described above as being stored on two or more of the clouds can be combined onto a single cloud-based computing system, such as the data stored on the moveable barrier operator cloud 611 and the media cloud 612. In still other examples, the information stored on one or more of the clouds 610, 611, 612 may be stored on a single designated server.

Figure 11B:
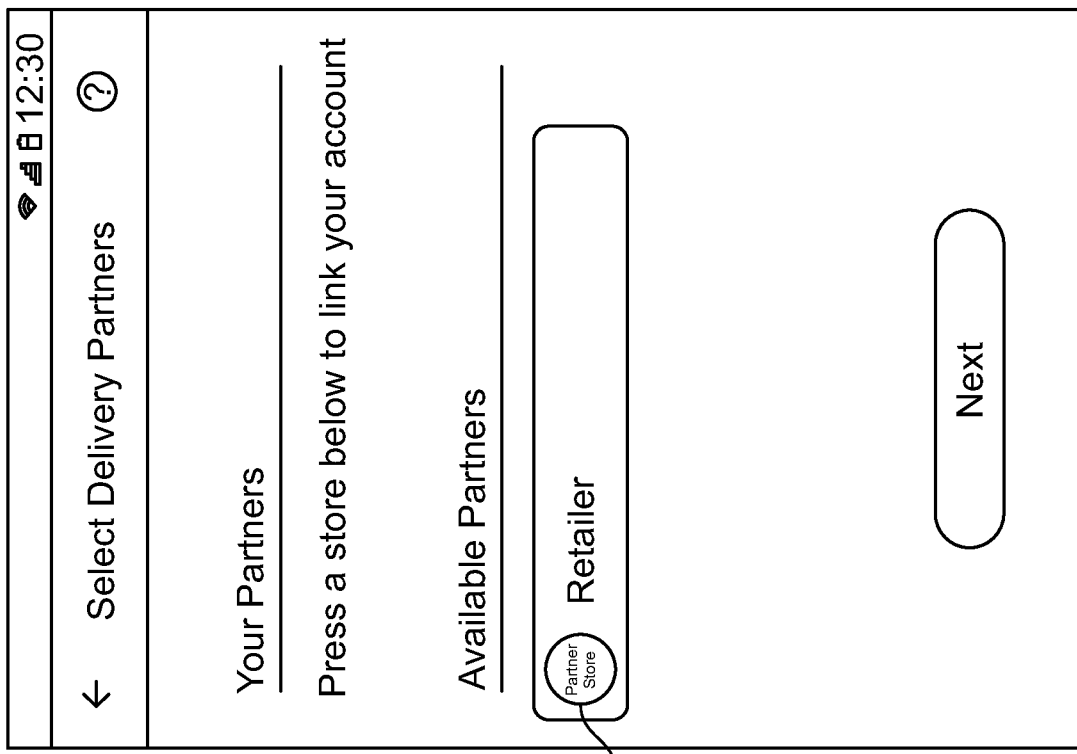
Figure 11A:
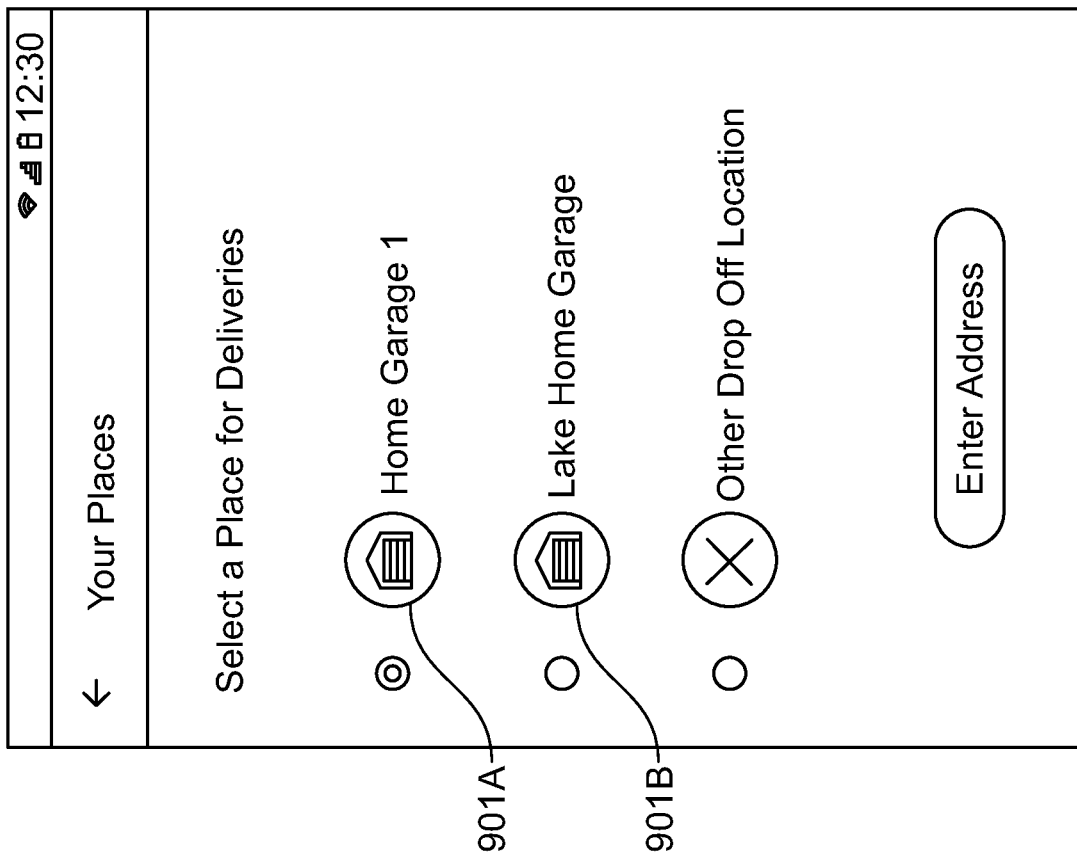

Turning to FIGS. 11A-11G, a method is provided for the user 702 to employ the system 600 and the application 701 to schedule a delivery. Although the following method is described with respect to sequential actions or operations, the method may be performed with one or more actions/operations combined, omitted and/or ordered otherwise. As shown in FIG. 11A, the user 702 first selects a desired delivery location 901A, 901B. The user 702 can store multiple locations 901A, 901B in the application 701, such as a primary residence 901A, vacation residence 901B, workplace, or other drop off location. The first time the user 702 uses the application 701, the application 701 enters a setup or configuration mode. In setup, the user 702 can login with an existing user account stored on the moveable barrier operator cloud 611 and associated with the movable barrier operator systems 12A, 12B. Alternatively, the user 702 can create a new account and associate the new account with the barrier operator systems 12A, 12B. The user 702 authorizes delivery associates to remotely actuate one or more of the moveable barrier operator systems 12A, 12B using the moveable barrier operator cloud 611. The setup may be performed through a user interface other than the application 701, such as through a webpage accessed on a personal computer. During setup, the user 702 pairs her account with accounts of partner retailers 905, see FIG. 11B.

By pairing the accounts, the moveable barrier operator cloud 611 may automatically retrieve or receive delivery information from the partner cloud 610 in order to facilitate deliveries. For example, if the user 702 places an order on the web site of the partner retailer 905, a system of the partner retailer 905 provides information regarding the order to the moveable barrier operator cloud 611. The provided information includes one or more of item(s) purchased, pick-up location, pick-up time, order status information, and identification information associated with the package 810. The moveable barrier operator cloud 611 stores delivery preferences of the user 702, as well as access information for the user's garage and uses the delivery preferences and access information to schedule a delivery. Information regarding a delivery is provided to the user 702 via the moveable barrier operator application 701 as well as the delivery person 802 via the delivery services application 801.

Once one or more partner accounts are paired to the account of the user 702, the user 702 may view orders 906 made through the partner 905 on the application 701, as shown in FIG. 11C. Each order 906 can be selected to alter or input delivery instructions. To input delivery instructions, the user taps on the order 906 which opens a menu 910 allowing the user 702 to input delivery instructions as shown in FIG. 11D. For example, the delivery instructions may include primary instructions describing a specific location within the garage 14 to place the package 810. The instructions may also include alternative instructions for when the barrier operator systems 12A, 12B will not open for the delivery person 802. Potential reasons for the barrier operator systems 12A, 12B not opening include technical issues, such as a power outage or network connectivity failure. Alternatively or additionally, the moveable barrier operator systems 12A, 12B may refuse to open under certain circumstances such as based on a lock-out feature wherein actuation of the movable barrier operator is disallowed by a resident of the premises. For example, the moveable barrier operator system 12A monitors the status of the associated passageway door 49. If the passageway door 49 is unlocked, the moveable barrier operator system 12A transmits a control signal to the passageway lock 50 to lock the passageway door 49. If the passageway door 49 cannot be locked, e.g., if the passageway door 49 is determined to be open or if the lock 50 is determined to have experienced a power or communication failure, the moveable barrier operator system 12A transmits data to the moveable barrier operator cloud 611 indicating the passageway door 49 cannot be locked, and the moveable barrier operator cloud 611 provides alternative instructions to the second wireless device 800 of the delivery associate 802. For example, the delivery services application 801 may display an error screen 991 as shown in FIG. 12G.

As another example, the moveable barrier operator system 12A, 12B tracks whether or not the user 702 is home by using access logs and/or a sensor to detect the presence of a car or vehicle of the user 702 in the garage 14. In this example, access to the garage 14 is only granted when the user 702 is not home. When the user 702 is home, the delivery associate 802 is instructed to deliver to a front door of the user's home.

As yet another example, the movable barrier operator system 12A or a sensor associated therewith can detect whether the indicated delivery location within the garage 14 becomes obstructed and the delivery associate will be directed to deliver the package according to the alternative instructions. For example, if a spouse parks a vehicle in the previously designated parcel drop location a user could be notified (e.g., via text message or application push notification of the parked vehicle, including a photo) and update the movable barrier operator system 12A with a secondary parcel drop location on the fly.

Figure 11E:
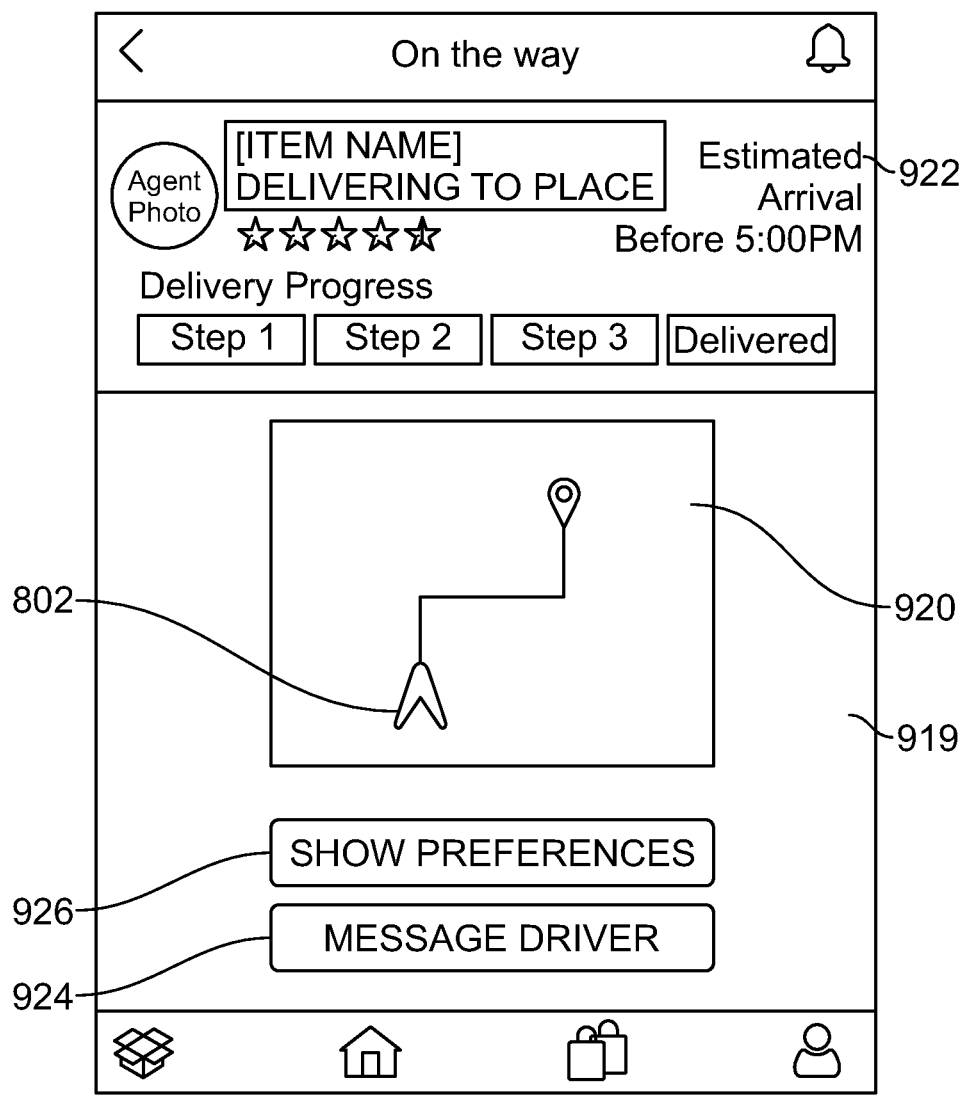

After setting up the application 701 and pairing the account of the user 702 with the account of the partner 905, the application 701 may be used to track the status of deliveries. When the package 810 is picked up by the delivery associate 802 from a location associated with the partner 905, e.g., store or distribution center, the user 702 is notified via the application 701. When the delivery associate is en route to the garage 14 with the package 810, the application 701 displays a tracking screen 919 that includes a map 920 displaying the location of the delivery associate 802 as shown in FIG. 11E. The location of the delivery associate 802 is continuously updated using location data from the second wireless device 800 such as GPS data and/or other location data, such as location data from cell phone towers. The tracking screen 919 of FIG. 11E also displays an estimated delivery time 922. In some forms, the application 701 utilizes an existing navigation application such as an application that is native to the first wireless (user) device 700 to track the delivery as well as estimate the delivery time based on current traffic conditions. The user 702 can alter delivery instructions while the delivery is en route by using a message driver option 924 or editing delivery preferences 926. In one embodiment, the delivery services application 801 includes text-to-voice software such that the user 702 can send a human-readable message to the driver using the message driver option 924, and the second wireless device 800 reads the message to the delivery associate 802 while they are driving.

Figure 11F:
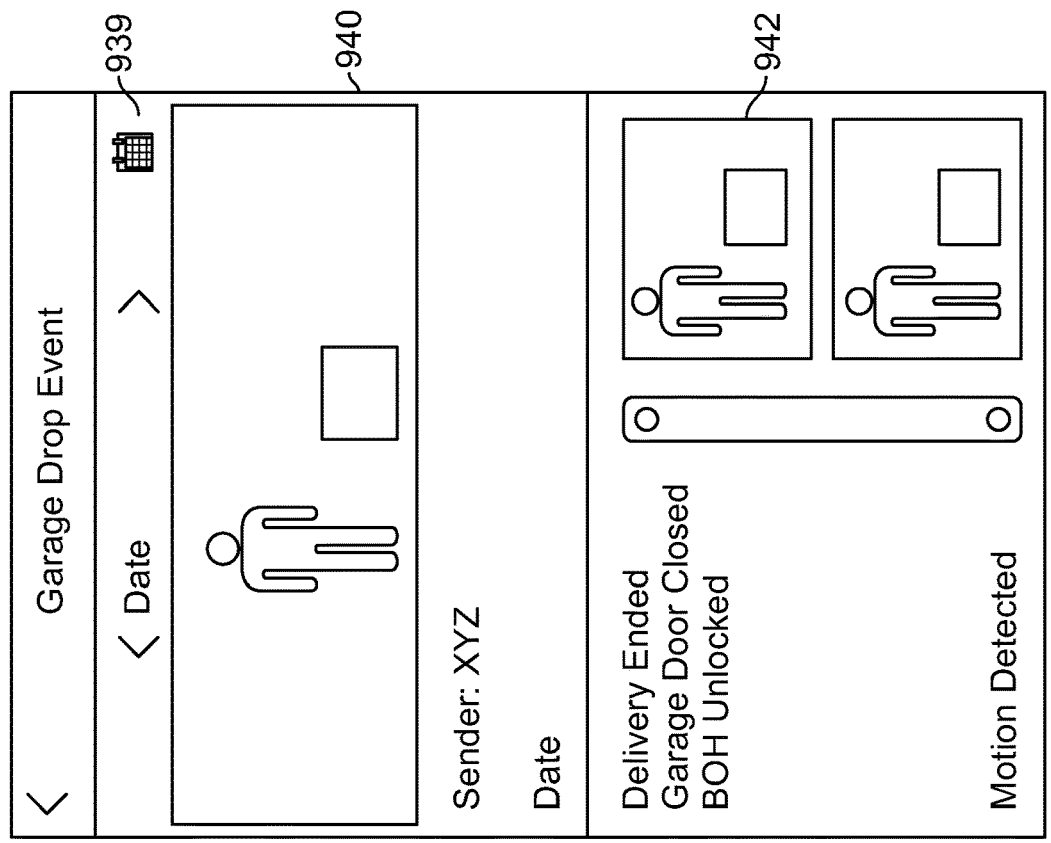

When the delivery associate 802 arrives at the garage, the user 702 is notified by the application 701 via the delivery notification screen 929 of FIG. 11F. The delivery notification screen 929 indicates that the delivery associate 802 has arrived, the time of arrival, and the name of the delivery associate 802. The screen of FIG. 11F also allows the user 702 to provide feedback 932 on (and/or a gratuity to) the delivery associate 802. The delivery notification screen 929 of FIG. 11F further provides information about the delivery. For example, the delivery associate 802 may take a picture 934 of the delivered package 810 using an optical sensor 805 of the second wireless device 800 to indicate where the package 810 is located. The captured image of the delivered package 810 may be transmitted from the delivery associate application 801 executing on the second wireless device 800 to the media cloud 612 for storage in a memory device or computer-readable medium in communication with or otherwise associated with the media cloud 612. The second wireless device 800 communicates the picture 934 to the first wireless device 700 directly or indirectly (e.g., facilitated by at least one of media cloud 612 and movable barrier operator cloud 611) for viewing by the user 702, such as via the cellular network 602, moveable barrier operator cloud 611, and internet 603. Alternatively or additionally, the user 702 may watch 936 a video of the delivery as recorded by the camera 17. In some instances, the user 702 may receive a message, alert, or notification that indicates an imminent delivery and which prompts the user to view a substantially real-time video of the delivery associate 802 entering the user's garage and depositing the delivery 810 therein. The screen of FIG. 11F may further indicate whether alternative delivery instructions were followed if the primary delivery option was not available.

Figure 11G:
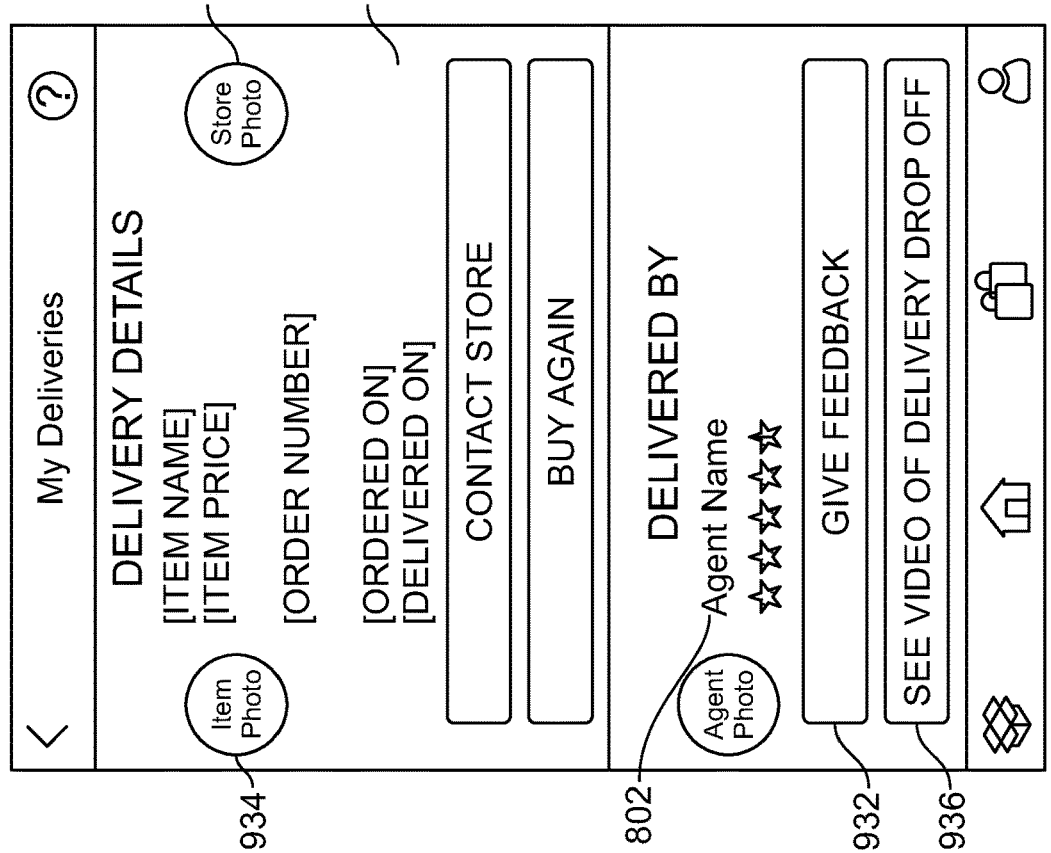

In one embodiment, the user 702 is notified when the delivery is in process as shown in the delivery viewing screen 939 of FIG. 11G. The user 702 can watch live streaming video 940 of the delivery while it is happening. As described above, the user 702 can use the indicator 19 and/or the speaker and microphone 17B, 17A to communicate with the delivery associate 802. Once the delivery associate 802 leaves the garage, the user 702 can use the first wireless device 700 to transmit a command to the moveable barrier operator 12 to close the door 24. For example, the delivery notification screen 929 may include a button for transmitting the close command to the moveable barrier operator 12. Alternatively, the movable barrier operator 12A may close the garage door 24 automatically and without intervention by the user 702 after the delivery associate 802 has exited the garage 14 as discussed below. The application 701 may also display the recorded videos 942 of previous deliveries.

Figure 12B:
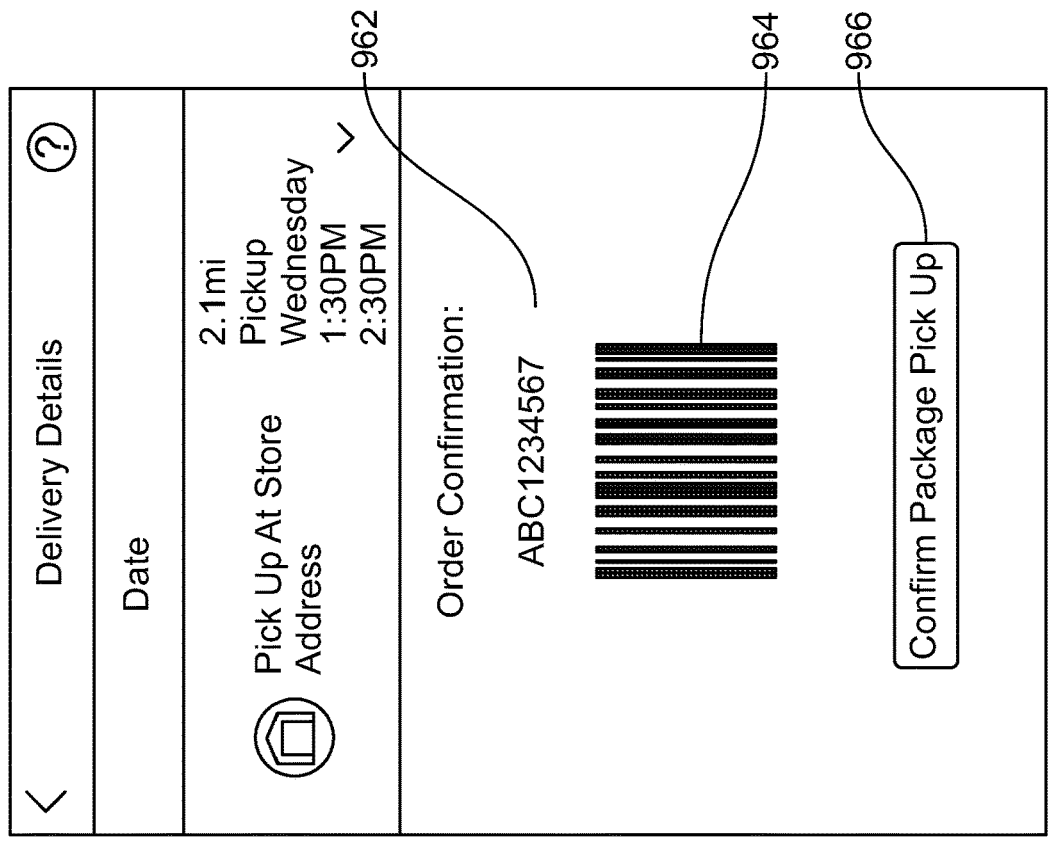
Figure 12A:
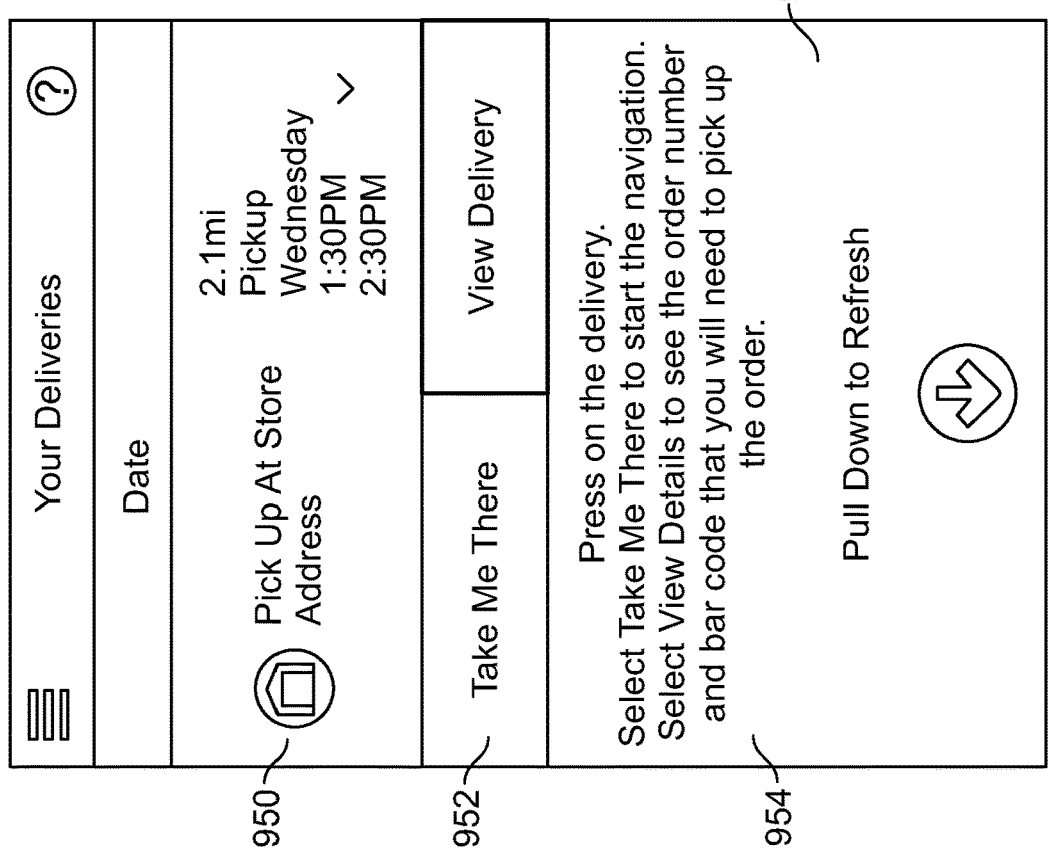

Regarding FIGS. 12A-12H, a method is provided for the delivery associate 802 to employ the system 600 and the delivery services application 801 to schedule a pickup and delivery of the package 810. Although the following method is described with respect to sequential actions or operations, the method may be performed with one or more actions/operations combined, omitted and/or ordered otherwise. For example, in some forms the delivery associate 802 may not need to schedule a pickup or otherwise use the pickup functionality of the delivery services application 801 to perform a delivery and that step may be omitted. In FIG. 12A, the application 801 displays a deliveries screen 949 including a pickup location 950 (e.g., street address, GPS coordinates, etc.) of the package 810 to be delivered. The delivery associate 802 can select the "Take Me There" option 952 to be navigated to the pickup location 950. The navigation utilizes the GPS receiver, or other position-tracking hardware, and navigation software of the second wireless device 800 to provide directions for the delivery associate 802 to reach the pickup location 950. The directions may be the most efficient route as determined by factoring in one or more of minimizing travel distance, minimizing travel time, and minimizing tolls. The pickup location 950 is the current location of the package to be delivered, such as at a storefront or distribution center of the partner retailer 905. The deliveries screen 949 further displays deliveries 954 such that a queue of deliveries to be made by or opportunities available to (but not yet confirmed or accepted by) the delivery associate 802 can be viewed. The application 801 monitors the pick-up locations and the delivery locations of each delivery queued for a delivery associate 802, and calculates the most efficient route. The most efficient route may be determined by finding a path that visits each delivery location while minimizing one or more of travel distance, travel time, and tolls. In some forms, the application 801 further uses delivery preferences, such as preferred time of delivery, and preferred starting and ending locations of the delivery associate 802 to further modify the order in which the queued deliveries 954 are made.

When the delivery associate 802 arrives at the pickup location 950, the delivery services application 801 displays information identifying the package 810 as shown in FIG. 12B. The information identifying the package 810 includes an ID number 962, a description and/or an indicium such as a barcode 964 or other identifying feature, that can be scanned via the optical detector 805 of the second wireless device 800 executing the delivery associate application 801 at the pickup location. For example, the barcode 964 may be scanned by a barcode reader operated by an associate at the pick-up location 950 and authenticated before the delivery associate 802 receives the package 810.

When the package 810 is retrieved or located at the pick-up location 950, for example the package 810 is given to the delivery associate 802 by an associate of the partner retailer 905 or retrieved by the delivery associate 802 from a designated pick-up area, the delivery associate 802 selects confirm pick up button or option 966. In one embodiment, the delivery associate 802 presses a "scan package" button of the package scanning screen 968 (see FIG. 12C) to cause an optical sensor 805 of the second wireless device 800 to capture, for example, a barcode (e.g., barcode 971 in FIG. 12D) of the package 810. The package pick-up scanning screen 968 shows an image 969 of the package 810 as the delivery associate frames the barcode 971 in the field of view of the camera of the second wireless device 800.

The second wireless device 800 sends a signal to the movable barrier operator cloud 611 (and/or the partner cloud 610) indicating the delivery associate 802 has picked up the package. The signal includes data regarding the barcode 971 captured by the camera of the second wireless device 800. The movable barrier operator cloud 611 (and/or the partner cloud 610) confirms that the ID number 962 and/or barcode 964 correspond to the product ordered by the user 702. If the correct package 810 has been picked up, the movable barrier operator cloud 611 sends a signal to the first wireless device 700 alerting the user 702 of successful pickup. The movable barrier operator cloud 611 may also send a confirmation signal to the second wireless device 800 confirming the correct package 810 has been picked up which permits the delivery services application 801 to advance to a navigation screen substantially similar to the navigation screen 919 shown in FIG. 11E. If the correct package has not been picked up, the movable barrier operator cloud 611 may send a signal to the first wireless device 700 notifying the user 702 and may send an error signal to the second wireless device 800. The error signal may prevent the delivery services application 801 from advancing to the navigation screen until the correct package 810 has been picked up.

Figure 12D:
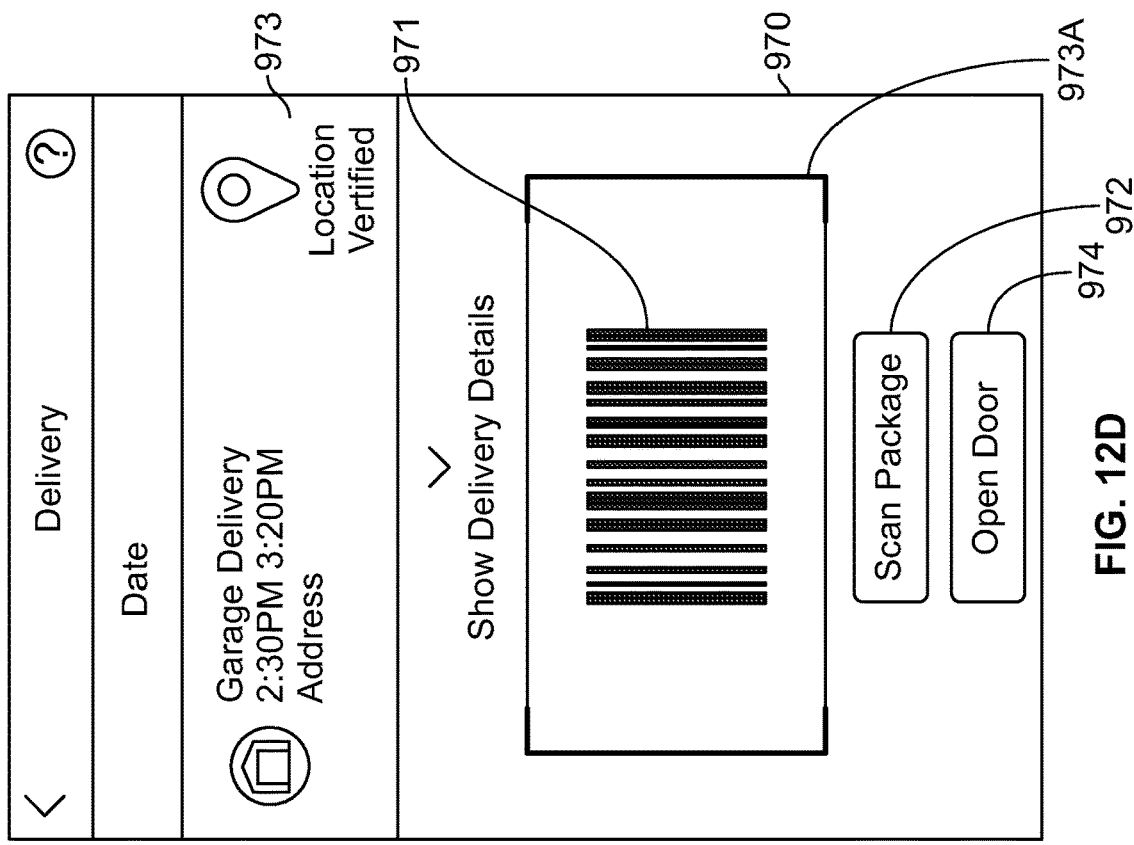
Figure 12C:
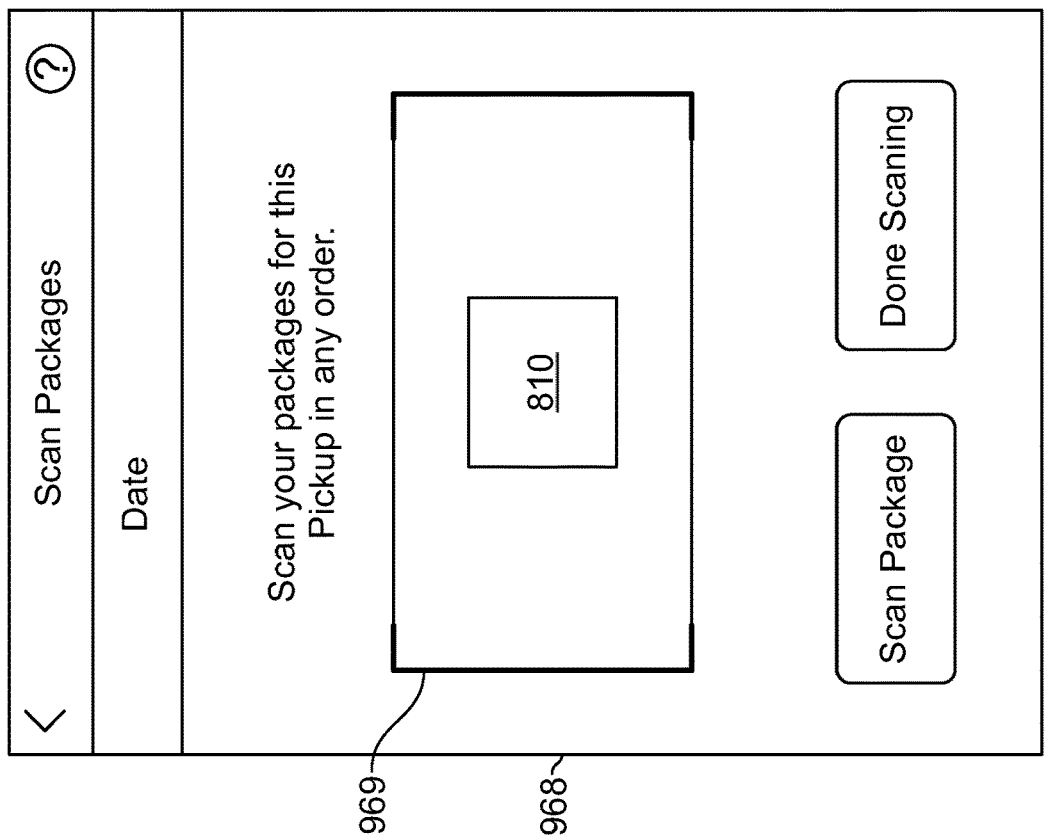
Figure 12F:
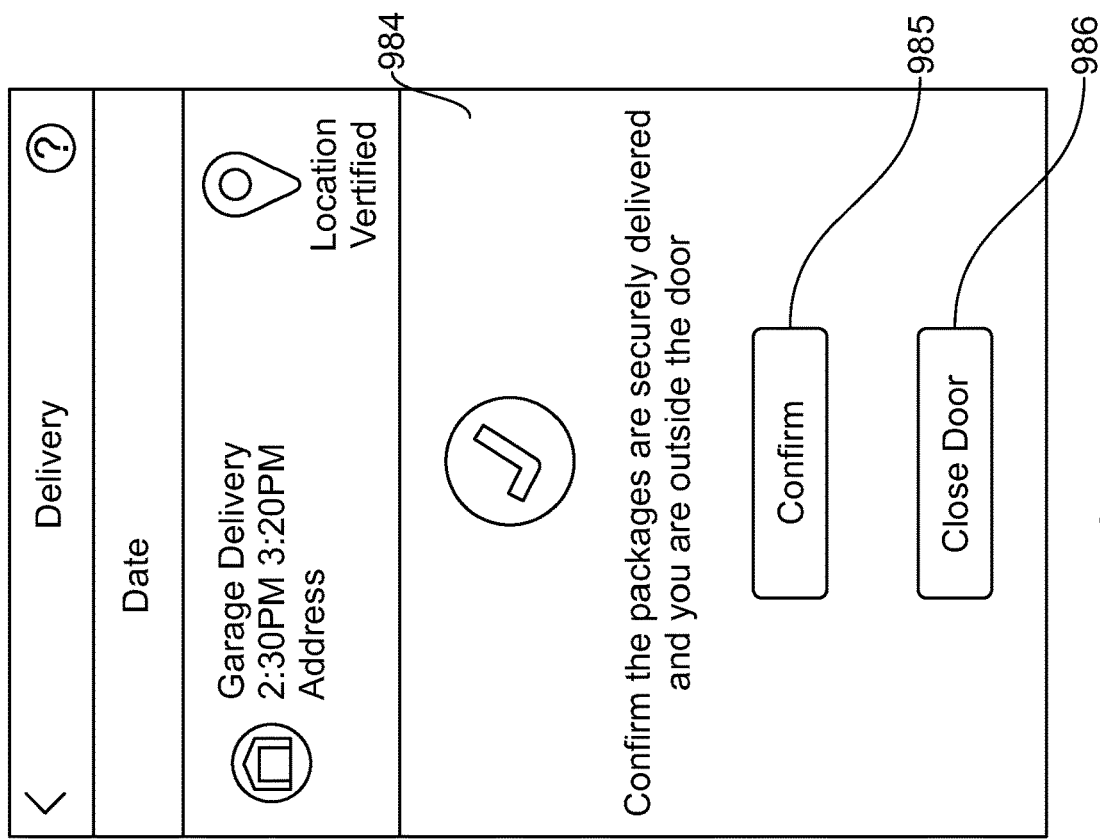

Once the delivery associate 802 has picked up the correct package 810, the application 801 navigates the delivery associate 802 to the delivery location 973. When the delivery associate 802 arrives at the delivery location 973, he once again scans the package 810 using a package delivery scanning screen 970 as shown in FIG. 12D. Once the optical sensor 805, such as a camera, has framed barcode 971 in the field of view of the second wireless device optical sensor 805, as shown by display 973A, the delivery associate 802 presses a scan package button or option 972. The application 801 captures the image shown in the display 973A and transmits data regarding the barcode in the captured image to the moveable barrier operator cloud 611 (and/or partner cloud 610) which carries out a validation process involving comparing the received data to stored data associated with the package 810 to be delivered to that location. The validation process may be a multi-factor validation process that further includes confirming the delivery associate 802 is located at the delivery location 973. The location can be determined using the GPS location (or otherwise determined/triangulated location via e.g., time-delay-of-arrival) of the second wireless device 800. Additionally, to prevent location spoofing, location of the delivery associate 802 may be validated, double-checked, authenticated or otherwise verified by broadcasting or otherwise transmitting a short range wireless signal for reception by the second wireless device 800 and which the second wireless device 800 relays to the moveable barrier operator cloud 611. In one aspect, the moveable barrier operator system 12A is configured to broadcast or output a short-range signal for reception by the second wireless device 800. Example short range wireless signals include beacon signals, such as Bluetooth or BLE from the moveable barrier operator systems 12A, 12B, the exterior keypad 34, or the switch module 39. Alternatively, a Wi-Fi access point within the premises associated with the movable barrier operator systems 12A, 12B could be employed as a beacon. The second wireless device 800 receives the service set identifier (SSID) of the wireless network instantiated by the Wi-Fi access point and the second wireless device 800 communicates the SSID to the movable barrier operator cloud 611 for validation.

The multi-factor validation process further includes confirming that the passageway lock 50 is locked. If the passageway lock 50 is unlocked, the moveable barrier operator system 12A or the moveable barrier operator cloud 611 transmits a signal to the passageway lock 50 causing the passageway lock 50 to lock. If is the scanned package is determined to be the correct package for the verified location, the delivery associate 802 is enabled to open 974 the garage door via the application 801. Alternatively, once the package is confirmed as being correct, the application 801 displays a one-time access code to the delivery associate 802 to enter into the keypad 34. After the validation process is complete, the camera 17 is activated to record the actions of the delivery associate 802 as the delivery is made. That is, the camera 17 may be configured or otherwise activated to capture images and/or video of the garage door opening, the delivery person entering the garage, the delivery person depositing the package, the delivery person exiting the garage, and the garage door closing completely. In this way the user 702, homeowner, resident or package recipient is provided with a sense of security that the unattended delivery was successfully completed, that the garage (or belongings therein) was not disturbed, and that the adjacent area (e.g., attached residence) remained secure.

Figure 12E:
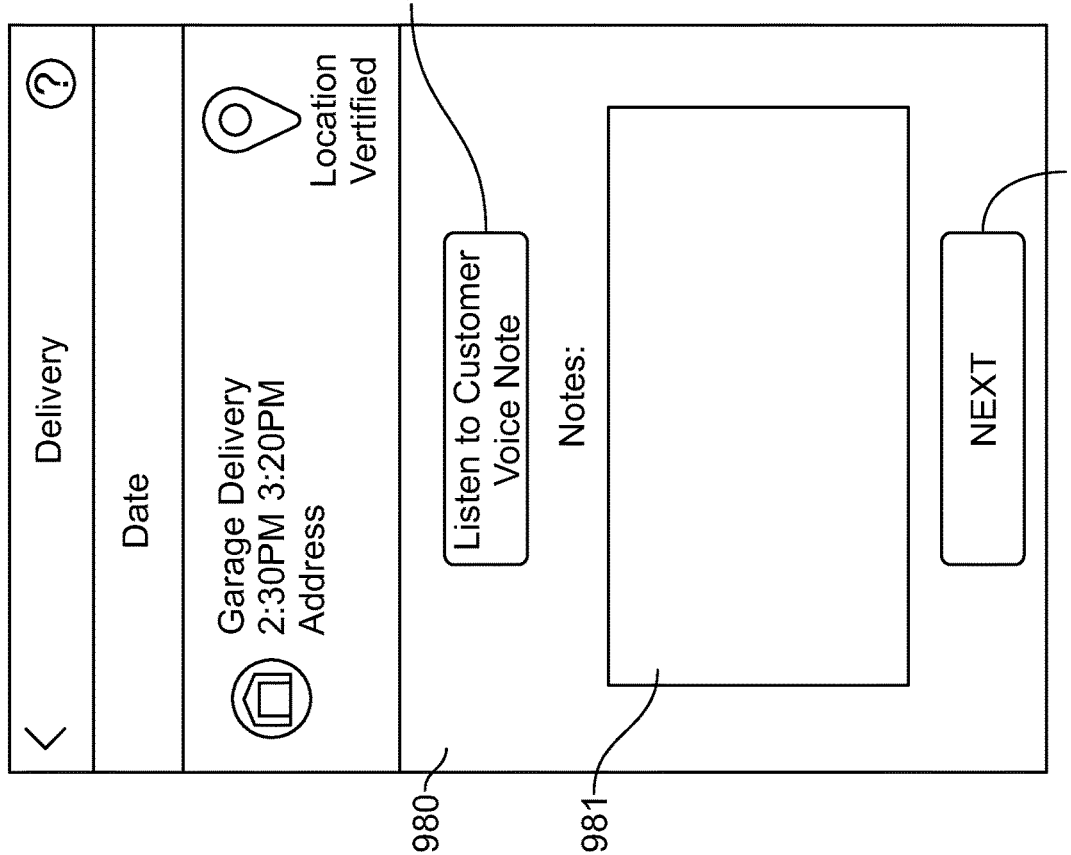
Figures 12G, 12H:
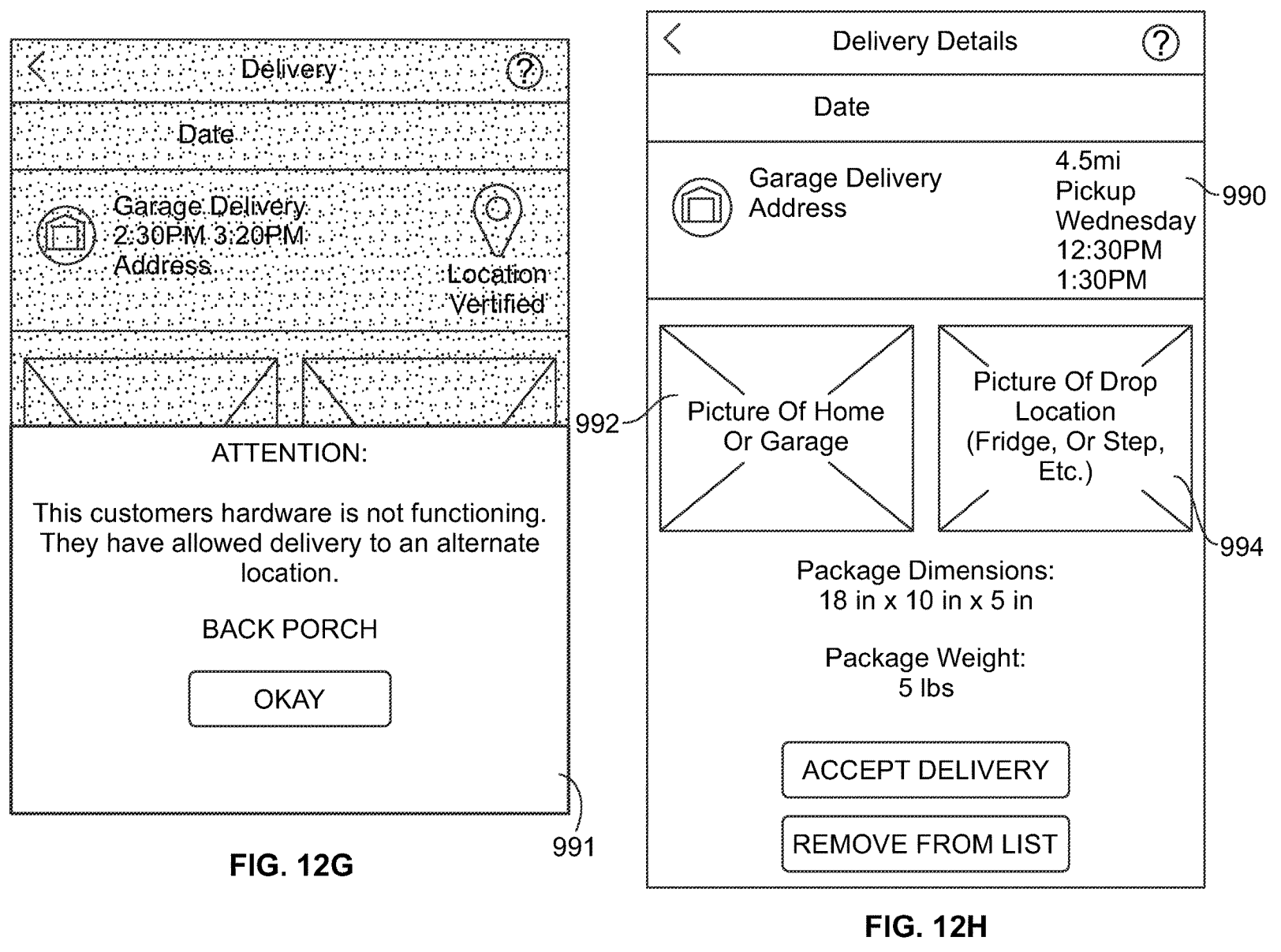

When the garage door 24 is opened, the application 801 displays a delivery information screen 980 to the delivery associate 802 as shown in FIG. 12E. The delivery information screen 980 may include human-readable notes, comments or instructions 981. This text note 981 may be the same as the text note 910 input by the user in the delivery note screen 909 FIG. 11D. Alternatively or additionally, the user 702 can record audible instructions 982, which are played by the application 801. As described above, instructions can also be conveyed by the speaker of camera 17, by the moveable barrier operator system 12A using the indicator 19 and/or a speaker of for example a home security/alarm system. Alternatively, the application 801 displays visual information regarding the location to place the package 810, such as on the delivery figure screen 990 of FIG. 12H. The delivery figure screen 990 includes a photograph 992 of the house or garage to aid in locating or identifying the correct address or delivery location (e.g., a specific apartment or condominium of a multi-tenant building). The delivery figure screen 990 further includes an image 994 of the position to place the package 810. The image 994 may be a photograph of a particular location within the garage 14, such as a table or step. Alternatively, the image 994 is a map or floorplan layout of the garage 14 with the preferred delivery location indicated. The user 702 may use the moveable barrier operator application 701 to create a map of the interior of the garage as well as indicate in the garage where the package 810 is to be placed. The movable barrier operator 12 may also operate the indicator 19 to indicate the desired package delivery location as discussed above.

When the delivery associate 802 gains access to the garage 14 of the user 702, the systems 10, 600 may be configured to prevent the delivery associate 802 from tampering with the movable barrier operator system 10 in order to gain unauthorized subsequent access. In an example, the movable barrier operator 12 is configured to inhibit, disregard or otherwise disable programming or learning of a new portable transmitter 30, 31 or vehicle-installed trainable transceiver (e.g., Homelink®) during a delivery. To this end, the movable barrier operator 12 may ignore actuations of a programming/learn button of the movable barrier operator 12 by the delivery associate 802 such that new transmitters cannot be added to the movable barrier operator system 10. In another example, the movable barrier operator 12 may be configured with a master credential (e.g., a numeric code, alphanumeric password, a particular handheld transmitter) which, upon entry or actuation enables programming/learning of a new transmitter to the movable barrier operator 12 despite a delivery occurring.

Additionally or alternatively, the movable barrier operator 12 may notify the user 702 of actuation of a learn/program button (or other attempt to tamper with the movable barrier operator system 10 by a delivery associate). Upon receipt of such a notification, the owner 702 may provide a user input to the first wireless device 700 to cause a remedial action such as, including but not limited to one or more of: notifying law enforcement; notifying a security company; notifying the partner retailer 905; arming a home security system; outputting an alarm; and setting a vacation mode or other lock-out mode to prevent actuation of the movable barrier operator 12 by one or more transmitters. The movable barrier operator 12 may additionally query the user 702 to confirm that actuation of the learn/program button was not performed by the user 702. For example, the movable barrier operator 12 or an operator enhancement device 731 may query the user 702 via the movable barrier operator application 701 with a prompt such as "a new transmitter was recently learned to your movable barrier operator; was this you?" The user 702 may then respond to the query via the application 701.

In other embodiments, the first wireless device 700 and/or the movable barrier operator cloud 611 may be able to query the moveable barrier operator 12 or the operator enhancement device 731 connected thereto via the movable barrier operator application 701 after a delivery has occurred to determine how many transmitters were listed as "learned" before the delivery and how may transmitters were listed as "learned" after the delivery to determine if a new transmitter has been learned to the movable barrier operator 12. When the query indicates that a new transmitter has been learned, the first wireless device 700 may notify the user 702 accordingly via the movable barrier operator application 701.

Having received the unauthorized learn/program notification or response to the query, the user 702 may be prompted to return the movable barrier operator 12 to factory-reset conditions by: erasing all learned/programmed transmitters (including the unauthorized, newly-learned transmitter) from the movable barrier operator 12 by pressing and holding the learn/program button. Additionally or alternatively, in embodiments where the moveable barrier operator 12 is operatively connected to an operator enhancement device 731, the user 702 may cause the operator enhancement device 731 to erase information or data of only the transmitter learned last in time (i.e., the unauthorized, newly-learned transmitter) stored in a last-in-first-out (LIFO) memory or data structure. Furthermore, one or more of the foregoing-mentioned remedial actions and/or factory-reset may be taken automatically (i.e., without intervention by the owner 702) via one or more entities of the movable barrier operator system 10.

In one aspect, the movable barrier operator 12 may be configured during deliveries to enter a polite block mode and decline a delivery associate's attempt to program/learn a new unauthorized transmitter. That is, during the polite block mode the movable barrier operator 12 appears (to the delivery associate) to perform a successful learning/programming operation such that the new unauthorized transmitter is recognized. However, after the delivery associate 802 has exited the garage, the movable barrier operator 12 ignores the seemingly-learned/programmed new unauthorized transmitter. Security data such as pictures, video, and/or audio captured by camera 17 within the garage 14 may additionally provide evidence or proof to law enforcement or the partner retailer 905 of unauthorized tampering by the delivery associate 802.

In some embodiments, the movable barrier operator 12 may not, by itself, be able to communicate over a network. For example, some older moveable barrier operators 12 that have been coupled to an operator enhancement device 731 may not be able to communicate to the operator enhancement device 731 that a delivery associate has caused the movable barrier operator 12 to enter a learn mode or that a new transmitter has been learned. Additionally, the operator enhancement device 731 may not be able to disable a learning mode of the movable barrier operator 12 during a delivery by the delivery associate 802. In order to inhibit learning of a new transmitter during a delivery operation in older systems such as those described above, a different method described in more detail below may be applied.

Figure 13:
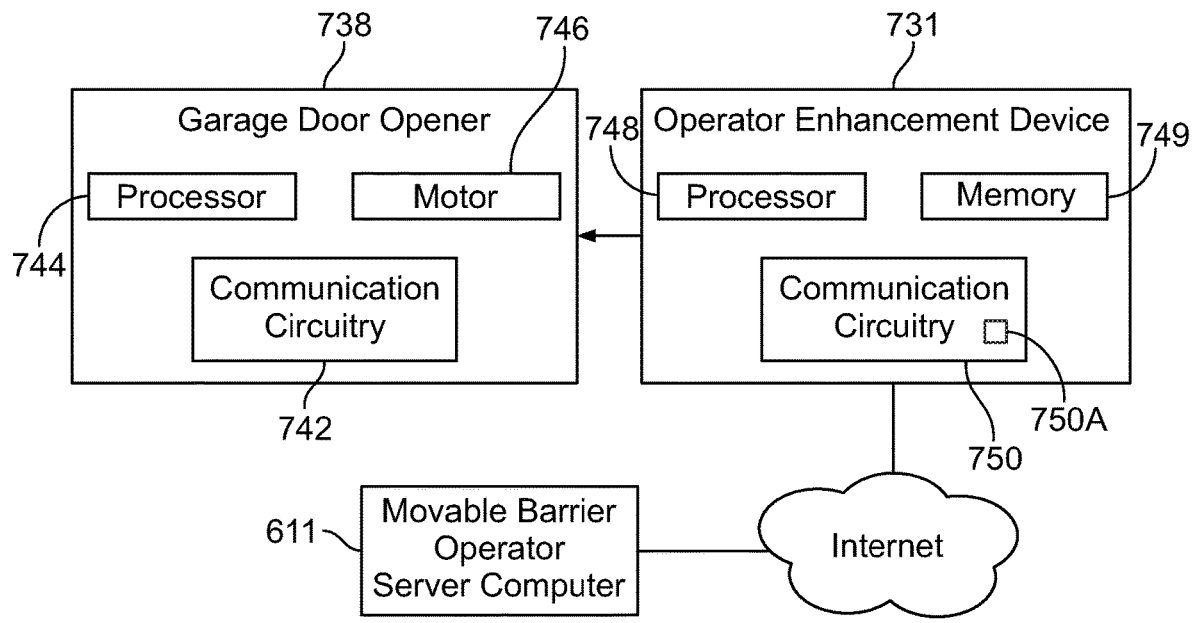
FIG. 13 is a schematic diagram of an operator enhancement device communicatively coupled to a garage door opener to control operation of the garage door opener.

FIG. 13 shows a garage door opener 738 including communication circuitry 742, a processor 744, and a motor 746, the garage door opener 738 is communicatively coupled to an operator enhancement device 731. As described above, a delivery associate 802 may attempt to learn a new transmitter to the garage door opener 738 during a package delivery, and garage door opener 738 may not be able to communicate to the operator enhancement device 731 to indicate that a new learning operation has occurred, nor can the operator enhancement device 731 disable the learning mode of the garage door operator 738. In such embodiments, the operator enhancement device 731 may be configured to listen for radio frequency transmissions from nearby transmitters, such as a transmitter of the delivery associate 802. Upon detecting a radio frequency transmission from an unknown or unlisted transmitter, the operator enhancement device 731 may take a remedial action such as, for example, transmitting one or more radio frequency signals to the garage door operator 738 to provide radio frequency noise to effectively jam or overwhelm the communication circuitry 742 and prevent the garage door opener 738 learning of a new transmitter. The radio frequency noise signal causes the transmitter's signal to be obscured or otherwise indistinguishable. Additionally or alternatively, the operator enhancement device 731 may notify the user 702 upon detecting a radio frequency transmission from an unknown transmitter via the movable barrier operator cloud 611.

Before a remedial action is taken, the operator enhancement device 731 may first determine whether the transmitter that transmitted the radio frequency signal during the delivery event is close enough to learn the transmitter to the garage door operator 738. This proximity determination may be performed via received signal strength indication (RSSI) thresholding. The operator enhancement device 731 may include communication circuitry 750 including a transmitter 750A configured to wirelessly communicate with one or more movable barrier operator types using different communication protocols. The communication circuitry 750 of the operator enhancement device 731 may further include a receiver to detect a radio frequency transmission having a signal strength, and a processor 748 of the operator enhancement device 731 may compare the signal strength to a signal strength threshold to determine whether the transmitter sending the radio frequency transmission is close enough to perform a learning operation. For example, the operator enhancement device 731 may detect a radio frequency transmission with a low signal strength (e.g., a transmitter for opening a movable barrier in a neighboring house) that presents little to no risk of learning to the garage door operator 738 and the operator enhancement device 731 may not take a remedial action. However, if the signal strength of the radio frequency transmission indicates that the transmitter is close enough for learning to the garage door opener, such as a transmitter within a garage associated with the garage door opener 738, the operator enhancement device 731 may take a remedial action such as communicating a radio frequency signal or a burst of radio frequency signals to create noise and interfere with or otherwise inhibit the communication circuitry 742 of the garage door operator 738 from learning a new transmitter.

Additionally or alternatively, the operator enhancement device 731 may also classify and store different lists of transmitters in a memory 749 thereof. For example, known transmitters that have been learned to the operator enhancement device 731 may be stored in a data array such as a "white" or "safe" list such that they present no concern of learning during a delivery operation. Other transmitters with radio frequency signals that are detected often, such as transmitters for opening movable barriers of neighboring houses, may be categorized on a "grey" list. The white and grey lists may be stored in a memory 749 of the operator enhancement device 731 or the movable barrier operator cloud 611. If the operator enhancement device 731 detects a radio frequency signal for the first time during a delivery operation (e.g. a transmitter ID portion of the transmitter signal is not listed on the "white" or "grey" lists), and the signal is determined to be close enough to perform a learning operation, the operator enhancement device 731 may be configured to communicate one or more radio frequency signals to the garage door operator 738 to create interference and inhibit learning of the new transmitter. Although the operator enhancement device 731 may not be able to directly disable a learning mode of the garage door operator 738, learning of a new transmitter may be inhibited via the radio frequency noise caused by the radio frequency signal sent therefrom.

Figure 14:
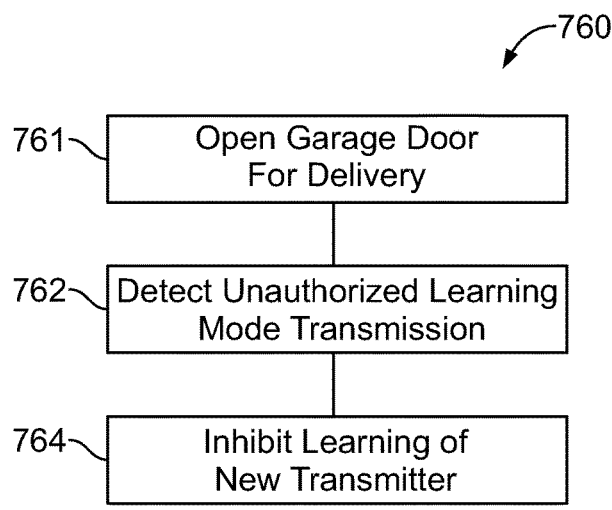
FIG. 14 is a flow chart of a process to inhibit learning of a new transmitter to a garage door operator.

FIG. 14 shows a flowchart of a process for inhibiting learning of a new transmitter in an embodiment where the garage door opener 738 is not configured to communicate with the operator enhancement device 731. In step 761, the operator enhancement device 731 causes the garage door opener 738 to open the associated garage door in response to the operator enhancement device 731 receiving a delivery open command from the movable barrier operator cloud 611. In step 762, the operator enhancement device 731 listens for and detects a radio frequency transmission from a transmitter and determines proximity to the garage door opener 738. The operator enhancement device 731 may determine proximity to the garage door opener 738 based on, for example, received signal strength indication thresholding. The step 762 may also include determining whether the transmitter is authorized, such as by comparing the transmitter ID of the radio frequency transmission to the white and grey lists. Then, in step 764, the operator enhancement device 731 may inhibit learning of the new transmitter by causing the communication circuitry 750 of the operator enhancement device 731 to communicate one or more radio frequency signals to inhibit learning of the transmitter when the transmitter is determined to be within a threshold proximity.

As described above, learning of a new transmitter may be inhibited in embodiments where the movable barrier operator 12 is able to communicate over a wireless network to either disable a learning mode thereof or erase one or more learned transmitters as well as in embodiments where garage door opener 738 may not be able to communicate over a wireless network by itself, but is communicatively connected to the operator enhancement device 731.

Once the package is placed in the indicated location, the delivery associate 802 presses the next button/option 983 (see FIG. 12E) in order to display a delivery confirmation screen 984 as shown in FIG. 11F. The delivery associate 802 confirms 985 he delivered the package and he is outside of the garage door. The delivery associate 802 has the option to close 986 the garage door. In some forms, the door closure is automatic. The movable barrier operator 12A or the second wireless device 800 may close the garage door 24 when the second wireless device 800 is a predetermined distance away (e.g., defined by a predetermined physical or logical boundary) from the moveable barrier operator 12A by using the location data of the second wireless device 800, by using a short range wireless signal (such as a Bluetooth® or BLE signal), by geofencing, after a predetermined amount of time of the delivery associate 802 confirming delivery, and/or when the optical obstruction detection components (constituted by optical emitter 42 and optical detector 46) or infrared motion detectors (e.g. of camera 17) indicate that the delivery associate 802 has left the garage 14. Once it is confirmed that the delivery associate 802 has left the garage 14 and the garage door 24 is closed, the camera 17 ceases capturing security data. If the passageway lock 50 was locked upon the arrival of the delivery associate 802, the moveable barrier operator 12 or the moveable barrier operator cloud 611 transmits a signal to the passageway lock 50 causing the passageway lock 50 to unlock.

In one embodiment, the camera 17 captures an image of the package 810. The image is transmitted to the moveable barrier operator cloud 611 (and/or media cloud 612) which compares the image to stored data representing the size and shape of the package to confirm that the package 810 is in the image. Image analysis of the garage interior as captured by the camera 17 could be performed by media cloud 612 and/or moveable barrier operator cloud 611 to determine whether or not the contents of the garage have changed— e.g., a new object has unexpectedly been left in the garage by the delivery agent, or a previously-existing object has been altered—damaged, moved or removed altogether. Such image analysis could prove useful for loss or damage prevention by demonstrating or supporting a contention that the delivery associate stole property from or damaged property within the garage. The image analysis can further be used to confirm the package 810 was delivered to the correct location or position/point within the garage 14. If the moveable barrier operator cloud 611 determines that the package 810 was placed in the wrong location within the garage 14, such as within a parking area, an alert is provided. The alert may notify the user 702 to prevent or substantially reduce the risk of the package 810 being damaged by the user's car during parking.

In one example, the alert is local (e.g., within or adjacent to the garage 14) and may be a visual and/or audible notification. Indeed, the alert may be one or more of a flashing light, a specific-colored light, a sound (e.g., buzzer), and a human-readable message provided by at least one of the movable barrier operator 12, the keypad 34 and the switch module 39. The alert may be one-time, periodic, recurring or persistent. That is, the alert may continue while the garage door 24 is opening, until the door is again closed. Alternatively, the alert may repeat multiple times (e.g., each time the garage door 24 is opened) until the user 702 stops or otherwise clears the alert such as by actuating in-garage hardware or a graphical user interface element displayed via the moveable barrier operator application 701 on the first wireless device 700. In an aspect, the switch module 39 may be adapted (or replaced) to provide delivery alerts. For example, a specific delivery-alert button on switch module 39 may: be actuated by a delivery associate 802 to confirm delivery, to close the garage door 24 (e.g., after a delay that permits the delivery associate to exit the garage), and to cause output of the alert; be actuated by the user 702 after delivery to clear the alert. The alert can be transmitted remotely, for example to the first wireless device 700 of the user 702 as well as to additional users with moveable barrier accounts and/or wireless devices associated with the garage 14 such as via messaging including SMS, email, push notifications and the like. Alternatively, the moveable barrier operator 12A, 12B will not open the associated garage door 24 while the package 810 is in a location that will interfere with parking. In still further embodiments, the moveable barrier operator 12A, 12B uses partial opening of the garage door 24 (e.g., providing the vehicle driver a peek inside) along with visual and/or auditory indicators (such as flashing lights and an alarm) to indicate to the vehicle driver that there is an object (i.e., the delivered package or parcel) in the driver's parking space.

Once the delivery is completed, the application 801 displays information about the next delivery, such as the pickup location 950 in FIG. 12A. Additionally, the moveable barrier operator cloud 611 transmits confirmation to at least one of the user 702 and the partner cloud 610 confirming delivery.

As described above, in some situations the moveable barrier operator 12 cannot open the garage door for the delivery associate 802. In these instances, the screen 991 of FIG. 12G is displayed instructing the delivery associate 802 to follow the alternate delivery instructions. The alternate instructions are those provided by the user in the screen 909 of FIG. 11D. Such instructions may include: depositing the package in a different location (e.g., back porch); retrying delivery at a later time or different day; leaving the package with a next-door neighbor; and the like.

The delivery associate 802 described above may be a person using the second wireless device 800. In alternative embodiments, the delivery associate 802 is a robotic associate, such as a delivery drone. The robotic associate runs software that communicates with the moveable barrier operator cloud 611 to facilitate deliveries in a way similar to the application 801. The robotic associate may be an unmanned aerial vehicle/device, an unmanned land-based vehicle/device, an unmanned water-based vehicle/device, or combinations of the foregoing.

In the method described above, the delivery services system 600 is utilized to facilitate delivery of the package 810 to the garage 14. In an alternative method, the system 600 grants temporary access to the garage 14 to a delivery associate 802 to pick up a package. The application could be used, for example, for the delivery associate 802 to return the package 810 to the storefront or distribution center of the partner retailer 906. The descriptions, indicators, and validation described above to aid the pickup of package 810 from pickup location 950, is used to identify the package 810 to the delivery associate 802 for pickup from the garage 14.

As another example, the delivery services application 801 may run on an infotainment system of the vehicle of the delivery associate 802.

Although method steps may be presented and described herein in a sequential fashion, one or more of the steps shown and described may be omitted, repeated, performed concurrently, and/or performed in a different order than the order shown in the figures and/or described herein. It will be appreciated that computer-readable instructions for facilitating the methods described above may be stored in various non-transitory computer readable mediums as is known in the art. Those skilled in the art will recognize that a wide variety of modifications, alterations, and combinations can be made with respect to the above described examples without departing from the scope of the invention, and that such modifications, alterations, and combinations are to be viewed as being within the ambit of the inventive concept.

What is claimed is:

1. A method of monitoring a delivery of an object into a garage with a garage door, the method comprising:

capturing, via a camera in the garage, an image of an interior of the garage upon a delivery associate causing movement of the garage door as part of positioning of the object in the garage by the delivery associate;

detecting, based on the image, a position of the object relative to a delivery location in the garage;

determining the delivery of the object is unsuccessful in response to detecting the position of the object outside of the delivery location; and limiting opening of the garage door in response to determining the delivery is unsuccessful.

2. The method of claim 1 wherein determining whether the delivery of the object is successful comprises determining the delivery is successful in response to detecting the position of the object in the delivery location.

3. The method of claim 1 further comprising providing an alert upon determining the delivery is unsuccessful.

4. The method of claim 3 wherein providing the alert includes:

causing a notification to be transmitted to a user device; and/or providing an audible and/or visual alert at the garage.

5. The method of claim 1 wherein limiting opening of the garage door comprises:

preventing opening of the garage door; or inhibiting opening of the garage door beyond a predetermined partially open position.

6. The method of claim 1 wherein detecting the position of the object relative to the delivery location includes detecting the object in a vehicle parking area of the garage outside of the delivery location;

wherein determining whether the delivery is successful comprises determining the delivery is unsuccessful upon detecting the object in the vehicle parking area; and providing an alert to a user device upon determining the delivery is unsuccessful.

7. The method of claim 1 further comprising comparing the object in the image to an expected object to determine a correspondence between the object and the expected object; and wherein determining whether the delivery is successful is based upon:

the position of the object relative to the delivery location of the garage; and the correspondence between the object in the image and the expected object.

8. The method of claim 1 further comprising detecting alteration by the delivery associate of a second object in the garage; and wherein determining whether the delivery is successful comprises determining the delivery is unsuccessful in response to detection of the alteration of the second object in the garage.

9. The method of claim 1 wherein capturing the image comprises capturing the image when the garage door is at least partially open.

10. The method of claim 1 wherein capturing the image comprises capturing the image when the garage door is closed.

11. The method of claim 1 further comprising opening the garage door in response to a request, from a user device of the delivery associate, to open the garage door.

12. A non-transitory computer readable medium having instructions stored thereon for monitoring a delivery of an object into a garage with a garage door, the instructions when executed by a processor cause performance of operations comprising:

causing a camera, to initiate capture of an image of an interior of the garage upon receiving a secondary control signal from a delivery associate to move the garage door as part of positioning of the object in the garage by the delivery associate, the secondary control signal different than a primary control signal associated with a resident, wherein the camera remains inactive in response to receiving the primary control signal to move the garage door;

detecting, based on the image, a position of the object relative to a delivery location in the garage; and determining whether delivery of the object is successful based upon the position of the object relative to the delivery location.

13. The non-transitory computer readable medium of claim 12 wherein determining whether the delivery is successful comprises determining the delivery is successful in response to detecting the position of the object in the delivery location.

14. The non-transitory computer readable medium of claim 12 wherein determining whether the delivery is successful comprises determining the delivery is unsuccessful in response to detecting the position of the object outside of the delivery location.

15. The non-transitory computer readable medium of claim 14, the operations further comprising providing an alert upon determining the delivery is unsuccessful.

16. The non-transitory computer readable medium of claim 15 wherein providing the alert includes:

causing a notification to be transmitted to a user device; and/or providing an audible and/or visual alert at the garage.

17. The non-transitory computer readable medium of claim 14, the operations further comprising limiting opening of the garage door in response to determining the delivery is unsuccessful.

18. The non-transitory computer readable medium of claim 17 wherein limiting opening of the garage door comprises:

preventing opening of the garage door; or inhibiting opening of the garage door beyond a predetermined partially open position.

19. The non-transitory computer readable medium of claim 12 wherein detecting the position of the object relative to the delivery location includes detecting the object is positioned in a vehicle parking area of the garage outside of the delivery location;

wherein determining whether the delivery is successful comprises determining the delivery is unsuccessful upon detecting the object in the vehicle parking area; and the operations further comprising providing an alert to a user device upon determining the delivery is unsuccessful.

20. The non-transitory computer readable medium of claim 12, the operations further comprising comparing the object in the image to an expected object to determine a correspondence between the object and the expected object; and wherein determining whether the delivery is successful is based upon:

the position of the object relative to the delivery location of the garage; and the correspondence between the object in the image and the expected object.

21. The non-transitory computer readable medium of claim 12 further comprising detecting alteration by the delivery associate of a second object in the garage; and
wherein determining whether the delivery is successful comprises determining the delivery is unsuccessful in response to detection of the alteration of the second object in the garage.

22. The non-transitory computer readable medium of claim 12 wherein causing capture of the image comprises causing capture of the image when the garage door is at least partially open.

23. The non-transitory computer readable medium of claim 12 wherein causing capture of the image comprises causing capture of the image when the garage door is closed.

24. The non-transitory computer readable medium of claim 12, the operations further comprising opening the garage door in response to a request, from a user device of the delivery associate, to open the garage door.

25. An apparatus for monitoring a delivery of an object into a secured area, the apparatus comprising:
communication circuitry configured to communicate with a camera; and
a processor operatively connected to the communication circuitry, the processor configured to:
cause the camera to initiate capture of a security data associated with the secured area upon receiving a secondary control signal from a delivery associate to move a movable barrier as part of positioning of the object in the secured area by the delivery associate, the secondary signal different from a primary control signal associated with a resident, wherein the processor does not cause capture of the security data in response to receiving the primary control signal to move the movable barrier;
receive, via the communication circuitry, the security data captured by the camera;
detect, based on the security data, a position of the object relative to a delivery location in the secured area; and
determine whether delivery of the object is successful based upon the position of the object relative to the delivery location.

26. The apparatus of claim 25 wherein the processor is configured to determine whether the delivery is successful in response to the processor detecting the position of the object in the delivery location.

27. The apparatus of claim 25 wherein the processor is configured to determine the delivery is unsuccessful in response to the processor detecting the position of the object outside of the delivery location.

28. The apparatus of claim 27 wherein the processor is further configured to provide an alert upon determining the delivery is unsuccessful.

29. The apparatus of claim 28 wherein to provide the alert includes one or more of:
causing a notification to be transmitted to a user device; and/or
providing an audible and/or visual alert at the secured area.

30. The apparatus of claim 27 wherein the processor is configured to limit opening of the movable barrier in response to determining the delivery is unsuccessful.

31. The apparatus of claim 30 wherein the processor is configured to limit opening of the movable barrier by:
preventing opening of the movable barrier; or
inhibiting opening of the movable barrier beyond a predetermined partially open position.

32. The apparatus of claim 25 wherein the processor is configured to detect the object is positioned outside of the delivery location and in a vehicle parking area of the secured area;
wherein the processor is configured to determine the delivery is unsuccessful in response to detecting the object in the vehicle parking area; and
wherein the processor is configured to provide an alert to a user device upon determining the delivery is unsuccessful.

33. The apparatus of claim 25 wherein the processor is configured to compare the object in the image to an expected object to determine a correspondence between the object and the expected object; and
wherein the processor is configured to determine whether the delivery is successful based upon:
the position of the object relative to the delivery location in the secured area; and
the correspondence between the object in the image and the expected object.

34. The apparatus of claim 25 wherein the processor is further configured to detect alteration by the delivery associate of a second object in the secured area; and
wherein the processor is configured to determine the delivery is unsuccessful in response to detection of the alteration of the second object in the secured area.

35. The apparatus of claim 25 wherein the communication circuitry is configured to communicate with the camera via the internet.

36. The apparatus of claim 25 wherein the communication circuitry is configured to communicate with a movable barrier operator of the secured area, the processor configured to cause the communication circuitry to communicate an open command to the movable barrier operator in response to the communication circuitry receiving a request from the delivery associate to open the movable barrier.

* * * * *